(12) United States Patent (10) Patent No.: US 12,609,809 B2

Lablans (45) Date of Patent: Apr. 21, 2026

(54) METHOD AND APPARATUS FOR ACTIVATING A REMOTE DEVICE

(71) Applicant: Peter Lablans, Morris Township, NJ (US)

(72) Inventor: Peter Lablans, Morris Township, NJ (US)

( * ) Notice: Subject to any disclaimer, the term of this patent is extended or adjusted under 35 U.S.C. 154(b) by 41 days.

(21) Appl. No.: 18/750,970

(22) Filed: Jun. 21, 2024

(65) Prior Publication Data

US 2024/0356727 A1 Oct. 24, 2024

Related U.S. Application Data

(63) Continuation-in-part of application No. 18/741,663, filed on Jun. 12, 2024.

(60) Provisional application No. 63/524,125, filed on Jun. 29, 2023, provisional application No. 63/573,331, filed on Apr. 2, 2024.

(51) Int. Cl.
*H04L 9/06* (2006.01)
*G16Y 40/30* (2020.01)

(52) U.S. Cl.
CPC ............ *H04L 9/0631* (2013.01); *G16Y 40/30* (2020.01)

(58) Field of Classification Search
CPC ...................................................... H04L 9/0631
See application file for complete search history.

(56) References Cited

U.S. PATENT DOCUMENTS

| | | | | |
|---|---|---|---|---|
| 3,818,452 A | * | 6/1974 | Greer | ............... H03K 19/17712 |
| | | | | 326/38 |
| 3,958,081 A | * | 5/1976 | Ehrsam | ................. H04L 9/0625 |
| | | | | 380/37 |
| 3,962,539 A | * | 6/1976 | Ehrsam | ................. H04L 9/0625 |
| | | | | 380/37 |
| 4,165,444 A | * | 8/1979 | Gordon | ................. H04L 9/0662 |
| | | | | 380/265 |
| 4,747,105 A | | 5/1988 | Wilson et al. | |
| 4,987,324 A | * | 1/1991 | Wong | ............... H03K 19/09429 |
| | | | | 326/27 |

(Continued)

OTHER PUBLICATIONS

Chhotaray et al; Encryption by hill cipher and by a novel method using Chinese remainder theorem in Galois field, January 2013, International Journal of Signal and Imaging Systems Engineering 6(1):38-45.

(Continued)

*Primary Examiner* — Jason Chiang

(57) ABSTRACT

A system includes a first device to select and transmit a first code from a plurality of codes by a transmitter to a remote device controlling access. The remote device implements a switching device based on the received first code and generates a local sequence of data. The first device generates and transmits to the remote device a first sequence of signals based on the first code; the remote device processes the first sequence of signals and activates the mechanism based on the first sequence of signals and the local sequence of data. An n-state switching function with n=2^k commutative involution is used in the switching device, the n-state commutative involution is not based on a XORing of 2 words of 2 bits with n and k being integers greater than 2. The first device may be a smartphone, a fob, an access card, or any other computing device.

20 Claims, 15 Drawing Sheets

(56)                References Cited

U.S. PATENT DOCUMENTS

| | | | |
|---|---|---|---|
| 5,054,066 A * | 10/1991 | Riek | H04L 9/304 |
| | | | 713/170 |
| 5,073,909 A | 12/1991 | Kotzin et al. | |
| 5,245,661 A | 9/1993 | Lee et al. | |
| 5,420,925 A | 5/1995 | Michaels | |
| 5,517,187 A | 5/1996 | Bruwer et al. | |
| 5,633,813 A | 5/1997 | Srinivasan | |
| 5,754,603 A | 5/1998 | Thomas et al. | |
| 5,799,010 A | 8/1998 | Lomp et al. | |
| 5,811,885 A | 9/1998 | Griessbach | |
| 5,872,513 A | 2/1999 | Fitzgibbon et al. | |
| 5,987,056 A | 11/1999 | Banister | |
| 5,995,539 A * | 11/1999 | Miller | H04L 25/03343 |
| | | | 375/222 |
| 6,052,704 A * | 4/2000 | Wei | G06F 7/724 |
| | | | 708/492 |
| 6,067,028 A | 5/2000 | Takamatsu | |
| 6,111,952 A * | 8/2000 | Patarin | H04L 9/3247 |
| | | | 380/259 |
| 6,212,174 B1 | 4/2001 | Lomp | |
| 6,567,012 B1 | 5/2003 | Matsubara et al. | |
| 6,567,017 B2 | 5/2003 | Medlock et al. | |
| 6,606,342 B1 | 8/2003 | Banister | |
| 6,611,193 B1 | 8/2003 | Weigl et al. | |
| 6,785,401 B2 | 8/2004 | Walker et al. | |
| 6,788,668 B1 | 9/2004 | Shah et al. | |
| 6,788,708 B1 | 9/2004 | Rainish et al. | |
| 6,810,123 B2 | 10/2004 | Farris et al. | |
| 7,050,580 B1 | 5/2006 | Ferre Herrero | |
| 7,135,957 B2 | 11/2006 | Wilson | |
| 7,398,287 B2 | 7/2008 | An | |
| 7,580,472 B2 | 8/2009 | Lablans | |
| 7,589,613 B2 | 9/2009 | Kraft | |
| 7,617,397 B2 | 11/2009 | Jao et al. | |
| 7,623,663 B2 | 11/2009 | Farris et al. | |
| 7,646,283 B2 | 1/2010 | Wilcox | |
| 8,332,727 B2 * | 12/2012 | Kim | G06F 11/1068 |
| | | | 714/763 |
| 8,422,667 B2 | 4/2013 | Fitzgibbon et al. | |
| 8,666,062 B2 * | 3/2014 | Lambert | G06F 7/726 |
| | | | 713/169 |
| 8,712,601 B2 | 4/2014 | Matsubara | |
| 9,026,171 B2 | 5/2015 | Vasudevan | |
| 10,218,504 B1 | 2/2019 | Kalach et al. | |
| 10,515,567 B2 * | 12/2019 | Lablans | G06F 5/012 |
| 10,673,631 B2 | 6/2020 | Soukharev | |
| 10,749,680 B1 | 8/2020 | Troia et al. | |
| 10,880,278 B1 | 12/2020 | de Quehen | |
| 11,093,213 B1 * | 8/2021 | Lablans | G06F 5/012 |
| 11,336,425 B1 * | 5/2022 | Lablans | H04J 13/0029 |
| 12,056,549 B1 * | 8/2024 | Lablans | H04L 9/3066 |
| 2002/0021686 A1 | 2/2002 | Ozluturk | |
| 2002/0038420 A1 * | 3/2002 | Collins | H04L 9/3249 |
| | | | 713/156 |
| 2005/0094806 A1 * | 5/2005 | Jao | G06F 7/725 |
| | | | 380/30 |
| 2005/0265430 A1 | 12/2005 | Ozlurturk | |
| 2005/0267926 A1 * | 12/2005 | Al-Khoraidly | G06F 7/724 |
| | | | 708/492 |
| 2006/0149962 A1 * | 7/2006 | Fountain | H04L 9/0897 |
| | | | 713/151 |
| 2007/0011453 A1 * | 1/2007 | Tarkkala | H04L 9/3247 |
| | | | 713/168 |
| 2007/0152710 A1 * | 7/2007 | Lablans | H03K 19/20 |
| | | | 326/59 |
| 2008/0013716 A1 * | 1/2008 | Ding | H04L 9/3093 |
| | | | 380/30 |
| 2008/0054944 A1 * | 3/2008 | Kwon | H03K 19/094 |
| | | | 326/83 |
| 2008/0069345 A1 * | 3/2008 | Rubin | H04L 9/0841 |
| | | | 380/44 |
| 2008/0143561 A1 * | 6/2008 | Miyato | H04L 9/0618 |
| | | | 341/79 |
| 2008/0180987 A1 * | 7/2008 | Lablans | G06F 7/49 |
| | | | 365/189.08 |
| 2008/0244274 A1 * | 10/2008 | Lablans | H04L 9/0662 |
| | | | 708/492 |
| 2008/0273695 A1 * | 11/2008 | Al-Gahtani | G06F 16/13 |
| | | | 380/30 |
| 2009/0010431 A1 | 1/2009 | De Vries et al. | |
| 2009/0092250 A1 * | 4/2009 | Lablans | G06F 7/582 |
| | | | 380/255 |
| 2009/0220083 A1 * | 9/2009 | Schneider | H04L 9/0662 |
| | | | 380/42 |
| 2009/0310775 A1 * | 12/2009 | Gueron | H04L 9/0643 |
| | | | 380/28 |
| 2010/0052845 A1 | 3/2010 | Yamamoto et al. | |
| 2010/0086132 A1 * | 4/2010 | Tavernier | H04L 9/304 |
| | | | 380/255 |
| 2010/0115017 A1 * | 5/2010 | Yen | G06F 7/724 |
| | | | 708/492 |
| 2010/0208885 A1 * | 8/2010 | Murphy | H04L 9/004 |
| | | | 380/28 |
| 2010/0271100 A1 * | 10/2010 | Le | G05F 1/46 |
| | | | 327/269 |
| 2010/0299579 A1 * | 11/2010 | Lablans | H03M 13/3983 |
| | | | 714/781 |
| 2010/0306525 A1 * | 12/2010 | Ferguson | H04L 63/06 |
| | | | 713/151 |
| 2011/0016321 A1 * | 1/2011 | Sundaram | H04L 67/34 |
| | | | 713/171 |
| 2011/0033046 A1 * | 2/2011 | Nonaka | H04L 9/3093 |
| | | | 380/46 |
| 2011/0211691 A1 * | 9/2011 | Minematsu | H04L 9/0618 |
| | | | 380/46 |
| 2011/0213982 A1 * | 9/2011 | Brown | H04L 9/3252 |
| | | | 713/176 |
| 2011/0243320 A1 * | 10/2011 | Halevi | H04L 9/0861 |
| | | | 380/30 |
| 2012/0023336 A1 * | 1/2012 | Natarajan | H04L 9/0841 |
| | | | 713/179 |
| 2012/0027198 A1 * | 2/2012 | He | H04L 9/06 |
| | | | 380/28 |
| 2012/0027210 A1 * | 2/2012 | Takeuchi | H04L 9/3263 |
| | | | 380/255 |
| 2012/0121084 A1 * | 5/2012 | Tomlinson | H04L 9/304 |
| | | | 380/30 |
| 2012/0166715 A1 | 6/2012 | Frost | |
| 2013/0043973 A1 | 2/2013 | Greisen et al. | |
| 2013/0127593 A1 | 5/2013 | Kuenzi et al. | |
| 2014/0082707 A1 | 3/2014 | Egan et al. | |
| 2014/0340193 A1 | 11/2014 | Zivkovic et al. | |
| 2015/0139423 A1 | 5/2015 | Hildebrandt et al. | |
| 2017/0230509 A1 * | 8/2017 | Lablans | H04J 13/0033 |
| 2020/0014534 A1 | 1/2020 | Garcia Morchon et al. | |
| 2021/0405518 A1 * | 12/2021 | Lablans | H04N 13/243 |
| 2023/0125560 A1 * | 4/2023 | Lablans | H03M 7/00 |
| | | | 380/28 |

OTHER PUBLICATIONS

David Gardner, Applications of the Galois Model LFSR in Cryptography, A Doctoral Thesis, Loughborough University, 2015, 116 pages.

Karnik et al., On Vehicular Security for RKE and Cryptographic Algorithms: A Survey, International Journal of Engineering Research & Technology (IJERT), vol. 9 Issue 05, May 2020., 911-915.

Garcia et al. , Lock It and Still Lose It-On the (In)Security of Automotive Remote Keyless Entry Systems, Proceedings of the 25th USENIX Security Symposium Aug. 10-12, 2016 • Austin, TX, 17 pages.

Nyakomitta et al., Security Investigation on Remote Access Methods of Virtual Private Network, Global Journal of Computer Science and Technology • Dec. 2020.

Billy B. Brumley, Secure and Fast Implementations of Two Involution Ciphers, 2010, downloaded from https://eprint.iacr.org/2010/152.

Gaabouri et al., A Survey on Lightweight Cryptography Approach For IoT Devices Security, 2022 5th International Conference on

(56)                    References Cited

OTHER PUBLICATIONS

Networking, Information Systems and Security: Envisage Intelligent Systems in 5g//6G-based Interconnected Digital Worlds (NISS).

Sim et al., Lightweight MDS Involution Matrices (Full version), 2015, downloaded from https://eprint.iacr.org/2015/258.pdf.

* cited by examiner

| 0 | 1 | 2 | 3 | 4 | 5 | 6 | 7 |
|---|---|---|---|---|---|---|---|
| 1 | 0 | 3 | 2 | 5 | 4 | 7 | 6 |
| 2 | 3 | 0 | 1 | 6 | 7 | 4 | 5 |
| 3 | 2 | 1 | 0 | 7 | 6 | 5 | 4 |
| 4 | 5 | 6 | 7 | 0 | 1 | 2 | 3 |
| 5 | 4 | 7 | 6 | 1 | 0 | 3 | 2 |
| 6 | 7 | 4 | 5 | 2 | 3 | 0 | 1 |
| 7 | 6 | 5 | 4 | 3 | 2 | 1 | 0 |

301

| 0 | 0 | 0 | 0 | 0 | 0 | 0 | 0 |
|---|---|---|---|---|---|---|---|
| 0 | 1 | 2 | 3 | 4 | 5 | 6 | 7 |
| 0 | 2 | 4 | 6 | 3 | 1 | 7 | 5 |
| 0 | 3 | 6 | 5 | 7 | 4 | 1 | 2 |
| 0 | 4 | 3 | 7 | 6 | 2 | 5 | 1 |
| 0 | 5 | 1 | 4 | 2 | 7 | 3 | 6 |
| 0 | 6 | 7 | 1 | 5 | 3 | 2 | 4 |
| 0 | 7 | 5 | 2 | 1 | 6 | 4 | 3 |

302

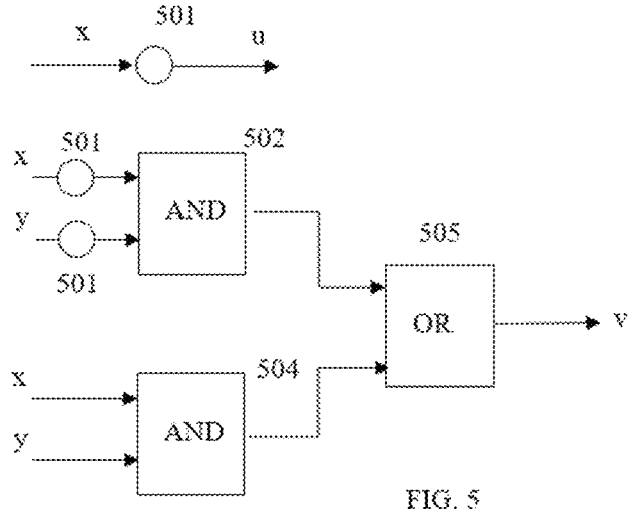
FIG. 5
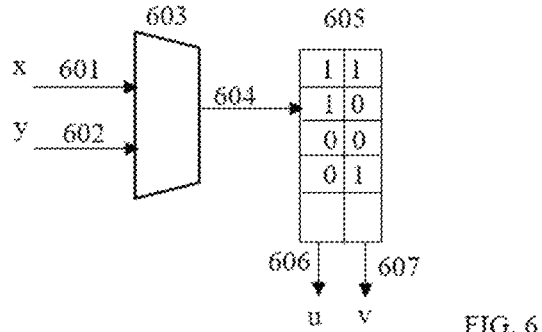
FIG. 6
700
```
1    function y=inv4(x);
2    % 4-state inverter [3 2 0 1] in origin 0
3    % © 2019, Ternarylogic LLC All Rights Reserved
4  - inverter4=[3 2 0 1]+1;
5  - x=x+1;
6  - y=inverter4(x)-1;
```
FIG. 7

800

```
1       function y=rinv(x);
2       % make reversing inverter from inverter x
3       % © 2019, Ternarylogic LLC All Rights Reserved
4  ~    lent=size(x);
5  ~    len=lent(2);    % determine n of n-state
6  ~    x=x+1 % origin 1
7  ~    y=ones(1,len); % initiate reversing inverter y
8  ~    for i=1:len
9  ~        ind=x(i);
10 ~        y(ind)=i;
11 ~    end
12 ~    y=y-1; % back to origin 0
```

1000

```
1    function y=labtransform(table,invert)
2    % lab-transform or finite lab-transform or FLT
3    % inverts n-state switching table 'table' with
4    % n-state inverter 'invert' at inputs and
5    % reversing inverter 'rinvert' at output
6    % the table and inverter are in origin 1
7    % Copyright 2017 Ternarylogic LLC. All right reserved
8
9    % determine size of 'table'
10 -  lent=size(table);
11 -  len=lent(2); % len is n
12
13   % initialize 'tableinv' and 'rinvert'
14 -  rinvert=ones(1,len);
15 -  tableinv=zeros(len,len);
16
17   % determine 'rinvert' from 'invert'
18 -  for i=1:len
19 -      ind=invert(i);
20 -      rinvert(ind)=i;
21 -  end
22
23   % determine modified table 'tableinv'
24 -  for i1=1:len
25 -      for i2=1:len
26 -          k1=invert(i1); % invert input 1
27 -          k2=invert(i2); % invert input 2
28 -          aa=table(k1,k2);
29 -          tableinv(i1,i2)=rinvert(aa);% invert output
30 -      end
31 -  end
32 -  y=tableinv; % the lab-transformed switching table
```

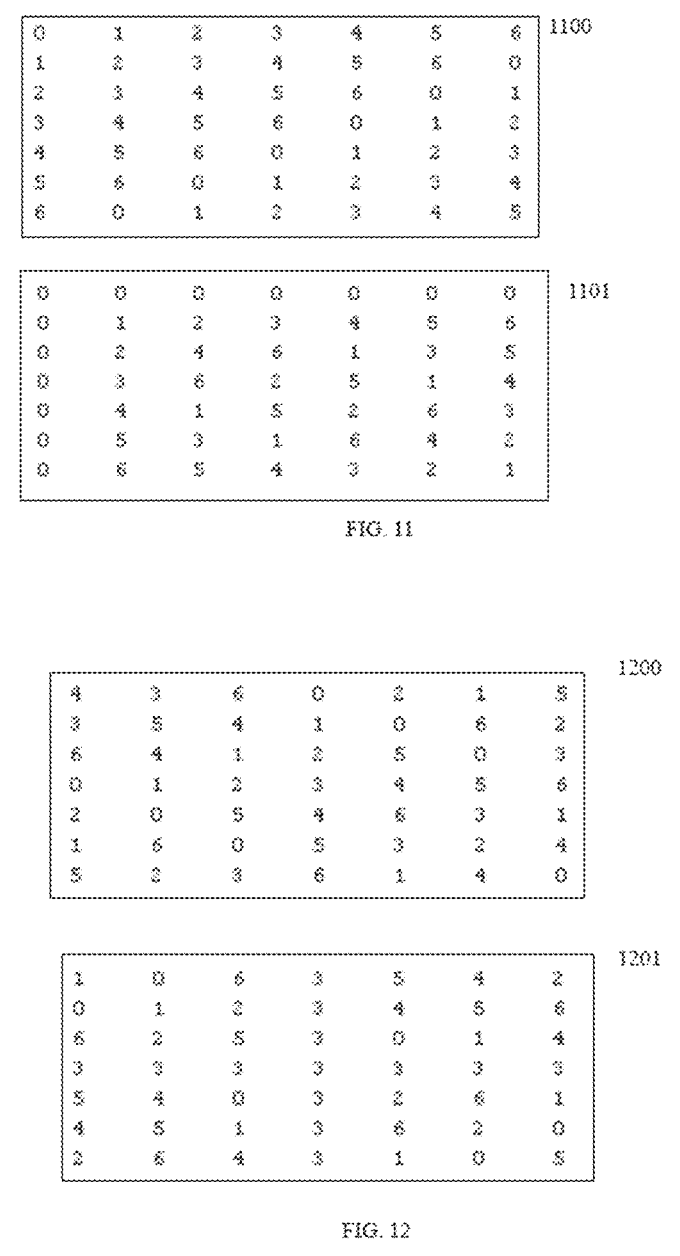

| 0 | 1 | 2 | 3 | 4 | 5 | 6 |
|---|---|---|---|---|---|---|
| 1 | 2 | 3 | 4 | 5 | 6 | 0 |
| 2 | 3 | 4 | 5 | 6 | 0 | 1 |
| 3 | 4 | 5 | 6 | 0 | 1 | 2 |
| 4 | 5 | 6 | 0 | 1 | 2 | 3 |
| 5 | 6 | 0 | 1 | 2 | 3 | 4 |
| 6 | 0 | 1 | 2 | 3 | 4 | 5 |

1101

| 0 | 0 | 0 | 0 | 0 | 0 | 0 |
|---|---|---|---|---|---|---|
| 0 | 1 | 2 | 3 | 4 | 5 | 6 |
| 0 | 2 | 4 | 6 | 1 | 3 | 5 |
| 0 | 3 | 6 | 2 | 5 | 1 | 4 |
| 0 | 4 | 1 | 5 | 2 | 6 | 3 |
| 0 | 5 | 3 | 1 | 6 | 4 | 2 |
| 0 | 6 | 5 | 4 | 3 | 2 | 1 |

| 4 | 3 | 6 | 0 | 2 | 1 | 5 |
|---|---|---|---|---|---|---|
| 3 | 5 | 4 | 1 | 0 | 6 | 2 |
| 6 | 4 | 1 | 2 | 5 | 0 | 3 |
| 0 | 1 | 2 | 3 | 4 | 5 | 6 |
| 2 | 0 | 5 | 4 | 6 | 3 | 1 |
| 1 | 6 | 0 | 5 | 3 | 2 | 4 |
| 5 | 2 | 3 | 6 | 1 | 4 | 0 |

1201

| 1 | 0 | 6 | 3 | 5 | 4 | 2 |
|---|---|---|---|---|---|---|
| 0 | 1 | 2 | 3 | 4 | 5 | 6 |
| 6 | 2 | 5 | 3 | 0 | 1 | 4 |
| 3 | 3 | 3 | 3 | 3 | 3 | 3 |
| 5 | 4 | 0 | 3 | 2 | 6 | 1 |
| 4 | 5 | 1 | 3 | 6 | 2 | 0 |
| 2 | 6 | 4 | 3 | 1 | 0 | 5 |

FIG. 12

| 0 | 1 | 2 | 3 | 4 | 5 | 6 | 7 |
|---|---|---|---|---|---|---|---|
| 1 | 0 | 3 | 2 | 5 | 4 | 7 | 6 |
| 2 | 3 | 0 | 1 | 6 | 7 | 4 | 5 |
| 3 | 2 | 1 | 0 | 7 | 6 | 5 | 4 |
| 4 | 5 | 6 | 7 | 0 | 1 | 2 | 3 |
| 5 | 4 | 7 | 6 | 1 | 0 | 3 | 2 |
| 6 | 7 | 4 | 5 | 2 | 3 | 0 | 1 |
| 7 | 6 | 5 | 4 | 3 | 2 | 1 | 0 |

1301

| 0 | 0 | 0 | 0 | 0 | 0 | 0 | 0 |
|---|---|---|---|---|---|---|---|
| 0 | 1 | 2 | 3 | 4 | 5 | 6 | 7 |
| 0 | 2 | 4 | 6 | 3 | 1 | 7 | 5 |
| 0 | 3 | 6 | 5 | 7 | 4 | 1 | 2 |
| 0 | 4 | 3 | 7 | 6 | 2 | 5 | 1 |
| 0 | 5 | 1 | 4 | 2 | 7 | 3 | 6 |
| 0 | 6 | 7 | 1 | 5 | 3 | 2 | 4 |
| 0 | 7 | 5 | 2 | 1 | 6 | 4 | 3 |

1302

| 0 | 0 | 0 | 0 | 0 | 0 | 0 | 0 |
|---|---|---|---|---|---|---|---|
| 0 | 1 | 2 | 3 | 4 | 5 | 6 | 7 |
| 0 | 2 | 4 | 6 | 5 | 7 | 1 | 3 |
| 0 | 3 | 6 | 5 | 1 | 2 | 7 | 4 |
| 0 | 4 | 5 | 1 | 7 | 3 | 2 | 6 |
| 0 | 5 | 7 | 2 | 3 | 6 | 4 | 1 |
| 0 | 6 | 1 | 7 | 2 | 4 | 3 | 5 |
| 0 | 7 | 3 | 4 | 6 | 1 | 5 | 2 |

| shift register | assign | decimal |
|---|---|---|
| 0001 | 1 | 1 |
| 1001 | 2 | 9 |
| 1101 | 3 | 13 |
| 1111 | 4 | 15 |
| 1110 | 5 | 14 |
| 0111 | 6 | 7 |
| 1010 | 7 | 10 |
| 0101 | 8 | 5 |
| 1011 | 9 | 11 |
| 1100 | 10 | 12 |
| 0110 | 11 | 6 |
| 0011 | 12 | 3 |
| 1000 | 13 | 8 |
| 0100 | 14 | 4 |
| 0010 | 15 | 2 |
| 0001 | 1 | repeat |

2300

```
>> scl6-3 xxxx x 0   1   2   3   4   5   6   7   8   9  10  11  12  13  14  15
  1   0  13  10   5   4  11   9  14   7   3   6  15   2   8  12
  2  13   0  14  11   6   5  12  10  15   8   4   7   1   3   9
  3  10  14   0  15  12   7   8  13  11   1   5   9   8   8   4
  4   5  11  15   0   1  13   8   7  14  13   2  10   6   3   3
  5   8   6  12   1   0   2  14   9   8  15  13   3  11   7  10
  6  11   5   7  13   2   8   1  15  10   9   1  14   4  12   8
  7   9  12   6   8  14   3   0   4   1  11  10   2  15   5  13
  8  14  10  13   7   9  15   4   0   5   2  12  11   3   1   6
  9   7  15  11  14   8  10   1   5   0   3  13  12   4   2   8
 10   3   8   1  12  15   9  11   2   6   0   7   4  14  13   5
 11   6   4   9   2  13   1  10  12   3   7   0   8   5  15  14
 12  15   7   8  10   3  14   2  11  13   4   8   0   9   6   1
 13   2   1   8   6  11   4  15   3  12  14   5   9   0  10   7
 14   8   3   2   8   7  12   5   1   4  13  15   8  10   0  11
 15  12   9   4   3  10   6  13   8   2   5  14   1   7  11   0
```

| x | y |   | x1+y1 | 2500 |
|---|---|---|-------|------|
| 5  | 2  | 0 | 6 | 0  |
| 13 | 4  | 0 | 6 | 0  |
| 11 | 13 | 0 | 6 | 3  |
| 2  | 9  | 0 | 6 | 4  |
| 8  | 16 | 0 | 6 | 5  |
| 7  | 5  | 0 | 6 | 6  |
| 14 | 2  | 0 | 6 | 7  |
| 1  | 2  | 0 | 6 | 8  |
| 14 | 3  | 0 | 6 | 9  |
| 7  | 14 | 0 | 6 | 10 |
| 8  | 14 | 0 | 6 | 11 |
| 2  | 15 | 0 | 6 | 12 |
| 11 | 5  | 0 | 6 | 13 |
| 12 | 10 | 0 | 6 | 14 |
| 5  | 6  | 0 | 6 | 15 |

```
36     % make multiplicative inverse of m16: minv16
37  -  minv16=zeros(1,16);
38  -  minv16(1:2)=[1 2];
39  -  for i=3:16
40  -      minv16(i)=16-i+3;
41  -  end
```

FIG. 26

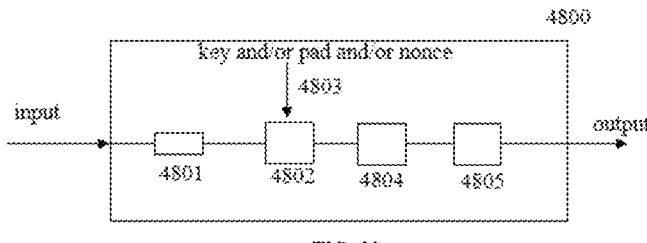
FIG. 29
FIG. 30
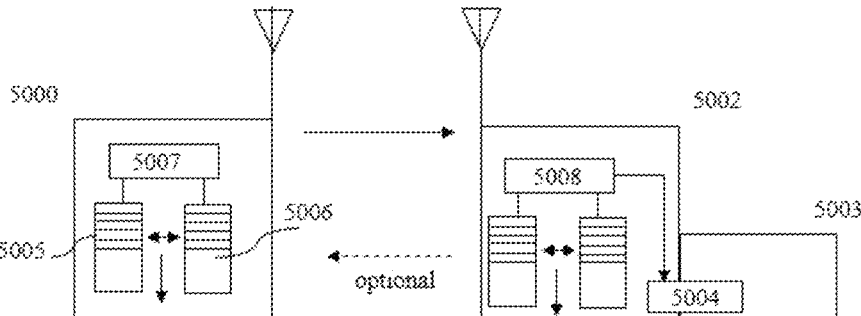
FIG. 31

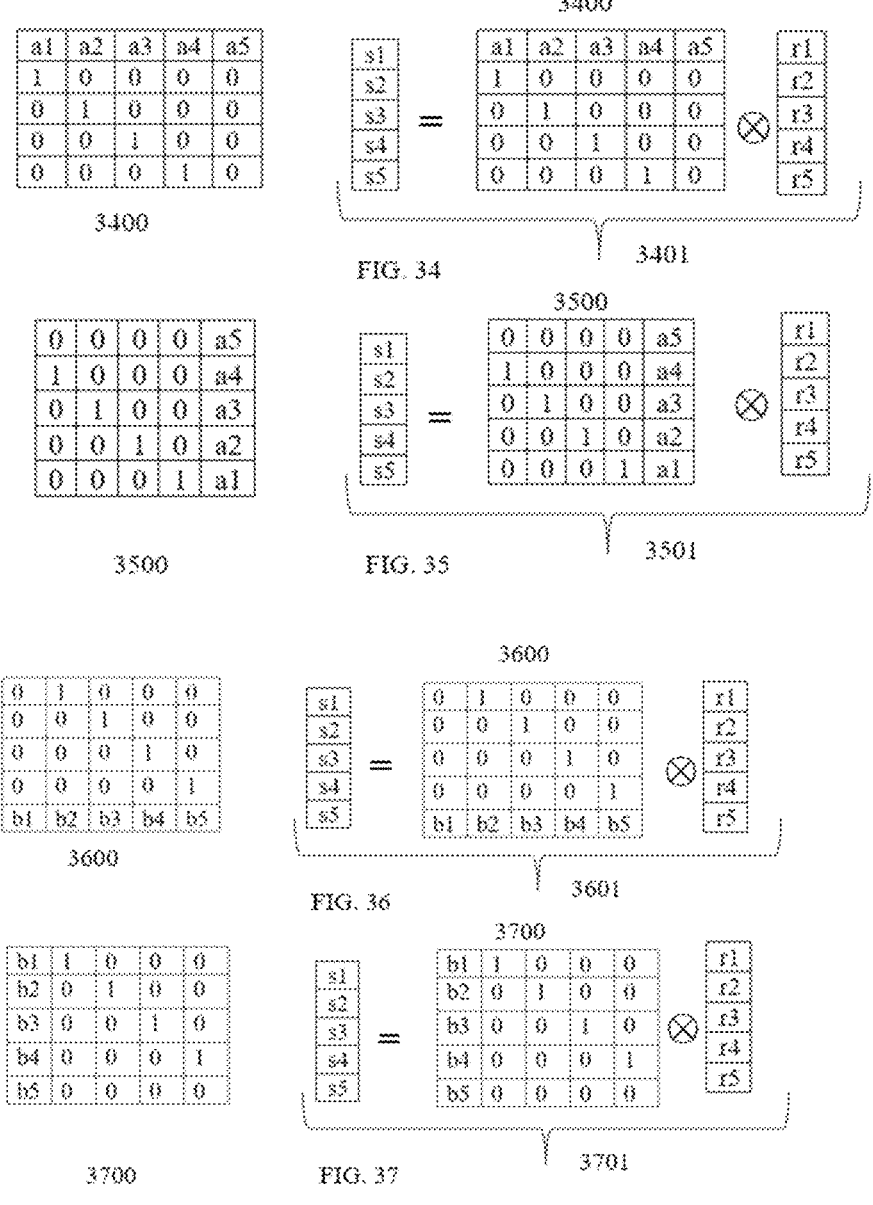

METHOD AND APPARATUS FOR ACTIVATING A REMOTE DEVICE

CROSS-REFERENCES TO RELATED PATENTS

The current application claims the benefit of U.S. Provisional Application No. 63/524,125 filed on Jun. 29, 2023 and of U.S. Provisional Application No. 63/573,331 filed on Apr. 2, 2024. The current application claims the benefit and is a continuation-in-part of U.S. patent application Ser. No. 18/741,663 filed on Jun. 12, 2024. All of the above cases and applications mentioned above are incorporated herein by reference. The following US Patent Applications are incorporated herein by reference: U.S. patent application Ser. No. 17/240,635 filed on Apr. 26, 2021, U.S. patent application Ser. No. 16/532,489 filed on Aug. 6, 2019, U.S. patent application Ser. No. 16/172,584 filed on Oct. 26 2018, now U.S. Pat. No. 11,093,213 issued on Aug. 17, 2021, U.S. patent application Ser. No. 15/499,849 filed on Apr. 27, 2017, now U.S. Pat. No. 10,375,252 issued on Aug. 6 2019, U.S. patent application Ser. No. 14/752,997 filed on Jun. 28, 2015, abandoned, U.S. patent application Ser. No. 15/442, 556 filed on Feb. 24, 2017 now U.S. Pat. No. 10,515,567 issued on Dec. 24, 2019.

BACKGROUND OF THE INVENTION

The present invention relates to activating a remote device by a sequence of signals which may be represented or characterized by n-state symbols with n being greater than 2. In general a sequence of signals is detected by a preprogrammed detector which is fixed in structure. However, this renders the detector being predictable to a certain extent, thus negatively affecting security of an activation. It would be beneficial if the working of a transmitter and/or the detector is unpredictable making it uncertain how the system works for an uninformed attacker.

Accordingly novel and improved devices that are unpredictable in their working to an unauthorized attacker to improve security are required to activate a mechanism.

SUMMARY OF THE INVENTION

In accordance with an aspect of the present invention at least two devices are provided that compute data in accordance with a common set of parameters that define a processing method, allowing a second device to agree on data generated by a first device. Each device stores and has access to a plurality of different sets of parameter, each parameter set defining a processing device or a method to generate an output.

In accordance with an aspect of the present invention, two devices processing the same input data.

In accordance with an aspect of the present invention a method is provided for activating a mechanism by one or more signals representing one or more symbols, comprising activating a first device containing a transmitter to retrieve a first code from a plurality of codes in a memory on the first device, the first code determining a first configuration of a device to generate a cryptographic signal, generating the cryptographic signal by the first device, transmitting the first code and the cryptographic signal by a transmitter in the first device to a receiver in a second device that is spatially separated from the first device, the receiver in the second device receiving the first code and retrieving from a memory a configuration of a cryptographic device and configuring on a processor in the second device the cryptographic device in a first configuration, the second device processing the cryptographic message received from the first device and activating the mechanism based on the received message.

In accordance with an aspect of the present invention an apparatus is provided with a memory and a processor to activate a device of a remote apparatus, comprising: the processor of the apparatus configured to retrieve a first code from a plurality of codes, each code being represented by a set of symbols stored in the memory of the apparatus, the first code representing a configuration of a first processing circuit and wherein each of the plurality of codes determines one of a plurality of processing circuits, and the first code represents a first processing circuit of the remote apparatus that corresponds to the first processing circuit of the apparatus; a transmitter in the apparatus configured to transmit the first code and signals generated by the first processing circuit of the apparatus; the device of the remote apparatus is enabled to be activated based on the processing by the first processing circuit of the remote apparatus of signals generated by the first processing circuit of the first processing circuit of the apparatus; and the apparatus is configured to disable the first code and to disable the first processing circuit on the apparatus after transmission of the first code and the apparatus is configured to activate a next code in the plurality of codes for retrieval and to enable a next processing circuit in the plurality of processing circuits associated with the next code after transmission of the first code.

In accordance with another aspect of the present invention an apparatus is provided, wherein the next code becomes the first code and the next processing circuit becomes the first processing circuit.

In accordance with yet another aspect of the present invention an apparatus is provided, wherein each code in the plurality of codes determines a different sequence of signals.

In accordance with yet another aspect of the present invention an apparatus is provided, wherein each code in the plurality of codes corresponds to a different configuration of a cryptographic circuit of the apparatus.

In accordance with yet another aspect of the present invention an apparatus is provided, wherein the cryptographic circuit is selected from a processing circuit performing an encryption, a decryption, a message digest generator, a signature generator, an authentication generator, a generator of a private key/public key.

In accordance with yet another aspect of the present invention an apparatus is provided, wherein each code in the plurality of codes is at least 5 bytes long.

In accordance with yet another aspect of the present invention an apparatus is provided, wherein the memory contains at least 25,000 (twenty-five thousand) different configurations.

In accordance with yet another aspect of the present invention an apparatus is provided, wherein the memory contains at least 1,000,000 (one million) different configurations.

In accordance with yet another aspect of the present invention an apparatus is provided, further comprising: a receiver of the remote apparatus enabled to receive signals transmitted by the transmitter of the apparatus; a processor of the remote apparatus configured to retrieve from a memory of the remote apparatus based on the first code received by the receiver of the remote apparatus from the transmitter of the apparatus, a configuration of a first processing circuit corresponding to the first processing circuit of the apparatus to execute instructions to process at least part of the received signals; and the processor of the remote apparatus is configured to activate the device of the remote apparatus based on an output of the first processing circuit on the remote apparatus.

In accordance with yet another aspect of the present invention an apparatus is provided, wherein signals are generated by a processing circuit in accordance with a Finite Lab-transform (FLT) modified Secure Hash Standard (SHS) message digest.

In accordance with yet another aspect of the present invention an apparatus is provided, wherein signals are generated by a processing circuit in accordance with a Finite Lab-transform (FLT) modified Advanced Encryption Standard (AES) or any of its defined modes.

In accordance with yet another aspect of the present invention an apparatus is provided, wherein signals are generated by a processing circuit in accordance with a Finite Lab-transform (FLT) modified published Federal Information Processing Standards (FIPS) cryptographic operation.

In accordance with yet another aspect of the present invention an apparatus is provided, wherein the apparatus is selected from the group consisting of: a computer, a mobile phone, a smart phone, a fob, a car door opener, a garage door opener, an access card, a chip card, an Automatic Teller Machine (ATM) card, a credit card, a camera.

In accordance with yet another aspect of the present invention an apparatus is provided, wherein the remote apparatus is selected from the group consisting of: a computer, a car door controller, a garage door controller, an access controller, a server, an Automatic Teller Machine (ATM), a credit card server, a database server, an order management server, a transaction server, a camera, an application server. Many applications are being hosted remotely or are accessed remotely. For instance one may install a computer program on a first computer and access it via a second computing device. One may protect access to a computer or part of a computer or computer functionality, including even access to folders on a computer, by a simple password or PIN. For high security applications and/or data one may require a higher level of protection as described herein. In that case activating a computer expressly includes activating part of a computer or computer functionality or computer application. One may call that part of a computer. One may also apply aspects of the disclosure in a Virtual Private Network (VPN) server.

In accordance with yet another aspect of the present invention an apparatus is provided, wherein the processor of the remote apparatus is configured to disable the configuration of the first signal sequence detector after the first code has been received by the receiver.

In accordance with yet a further aspect of the present invention a method is provided, wherein the first code determines an n-state feedback shift register with k shift register elements, each enabled to hold an n-state symbol, with k>2 and n>1, a location of a feedback tap and a number of symbols in the first sequence of symbols.

In accordance with yet a further aspect of the present invention a method is provided, wherein the first code determines an n1-state feedback shift register and the second code determines an n2-state feedback shift register, with n1 and n2 being different integers greater than 1.

In accordance with yet a further aspect of the present invention a method is provided, wherein n>3 and an n-state symbol is represented by a plurality of bits.

In accordance with yet a further aspect of the present invention a method is provided, wherein the mechanism is a lock and activating the mechanism unlocks the lock.

In accordance with yet a further aspect of the present invention a method is provided, wherein the mechanism is a lock in a car and activating the mechanism unlocks the lock.

In accordance with yet a further aspect of the present invention a method is provided, wherein the mechanism is a motor.

In accordance with yet a further aspect of the present invention a method is provided, wherein the mechanism is a motor that opens a door.

In accordance with yet a further aspect of the present invention a method is provided, wherein the first device is a smartphone.

In accordance with yet a further aspect of the present invention a method is provided, wherein the plurality of codes is ordered and the processor in the second device disables use of any unused codes in the plurality of codes that precedes a received code.

In accordance with yet a further aspect of the present invention a method is provided, further comprising: the processor in the first device determining on at least two different moments validation data from a sensor that is part of the first device and storing the validation data on the memory in the first device, a second transmitter in the first device transmitting on at least two different moments validation data to a remote server and the processor on the second device comparing the validation data received from the first device and the validation received from the remote server to validate the first device.

BRIEF DESCRIPTION OF DRAWINGS

FIG. 5 illustrates a realization of a binary circuit;

FIG. 6 illustrates in diagram an addressable memory;

FIG. 7 is a screenshot of a program implementing a 4-state inverter;

FIG. 10 is a screenshot of a program that performs the Finite Lab-transform;

FIGS. 11, 12, 13 and 14 are screenshots of computer generated n-state switching tables;

FIG. 15 is a diagram of a cryptographic system;

FIGS. 16 and 17 are screenshots of programs to implement an operation over GF(32);

FIG. 18 is a partial screenshot of a computer generated 32-state switching table;

FIG. 19 is a screenshot of a computer generated 6-state switching table;

FIG. 20 is screenshot of a computer program to generate an n-state switching table;

FIG. 21 is a diagram of a shift register based sequence generator;

FIG. 22 is a table of shift register states of a shift register based n-state sequence generator;

FIGS. 23 and 24 are screenshots of computer generated n-state switching tables;

FIG. 25 is a screenshot of a computer generated table of states according to an Elliptic Curve;

FIG. 26 is a screenshot of a computer program to determine an n-state multiplicative inverse;

FIG. 29 illustrates in diagram a cryptographic device;

FIG. 30 illustrates in diagram a modified cryptographic device;

FIG. 31 illustrates in diagram 2 cryptographic devices in communication with each other;

FIG. 34 and FIG. 35 illustrate a transition array of an n-state feedback shift register in forward mode; and FIG. 36 and FIG. 37 illustrate a transition array of an n-state feedback shift register in reversing mode.

DETAILED DESCRIPTION

Figure 1:
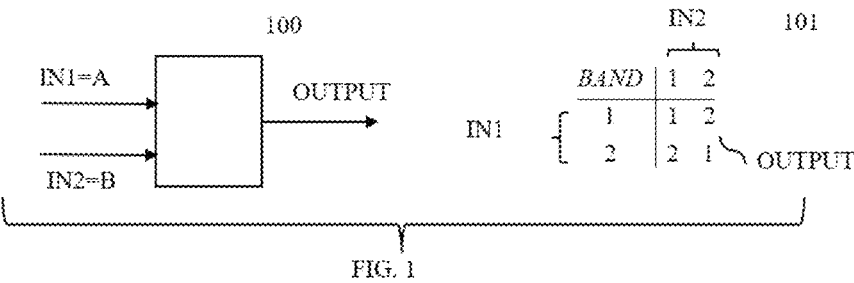
FIG. 1 and FIG. 2 illustrate switching devices and related switching tables.

Previous patent applications, as incorporated herein by reference, teach a modification of a discrete computer switching functions, which is called herein a primitive computer switching function, a primitive switching function, a primitive function, an n-state primitive computer switching function, an n-state primitive switching function or an n-state primitive function. It is believed that one of ordinary skill knows directly or from the context of this disclosure what is meant by these terms. It will be explained again and superfluously, it is believed, next.

Computer devices apply components that operate on discrete signals and that have at least one input and often two or more inputs and at least one output. A discrete signal is a physical phenomenon, such as a voltage or a current, a resistance, a potential, a light intensity or light frequency, a quantum-mechanical, a mechanical, a magnetic, an electromagnetic or any other physical phenomenon that is detected by and/or in a device. The appearance of a physical phenomenon has a particular value (a measurable value or an absence thereof) or falls in a range of values. In describing a working of a discrete switching device, commonly a representative state is used to represent the actual physical value of the signal. The state of the signal also may represent the physical state of the device.

For instance, a computer device may work in a binary or 2-state mode. Signals in such a device fall in a range of two values, wherein a first range is designated as for instance state HIGH and a second range as state LOW. In CMOS, a binary XOR device, such as cd74hc86 of Texas Instruments operates is a range of HIGH and LOW values, wherein in operational conditions these ranges do not overlap. For instance the HIGH value is not higher than the DC supply value and never lower than 3.15V at a Vcc of 4.5V and LOW is never higher than 1.35 V at a Vcc of 4.5 V. These and other conditions are explained in the cd74hc86 datasheet, published by Texas Instruments on September 2003, which is incorporated herein by reference. The switching behavior of the XOR device is provided in a switching or truth table on page 2 in the datasheet. One can see that the datasheet refers to states L (=low) and H (=high.) According to the datasheet, these binary states L and H represent 2 ranges of Voltages.

Another way to represent the input and output voltages is by assigning a numerical value to the states Land H. For instance, the state L is called 0 and the state H is called 1. This changes nothing in the device itself. It only changes how the physical state is interpreted. It should be clear that the state 0 is not 0 Volt and the state 1 is not 1 Volt in this case. For presentation and input devices may be included to assign these states to a voltage. For instance a computer may have as input a keyboard with keys representing digits. Hitting a key with label 1, may cause a signal of 3.5 Volt (representing state 1) to be provided on an input. A signal of 3.5 Volt may be generated on an output of a device such as an XOR device. This signal may be provided to a display. A character generator of the display may recognize the 3.5 Volt as a discrete binary signal that represents 1 and generate pixels of a character 1 that is activated on the display. This demonstrates that the XOR device merely switches signals in accordance with a physical structure of the device and that the signals are represented by states, in one case the binary states 0 and 1. One may give any name to the signals like COLD and WARM. However, the representation by states 0 and 1, provides the impression that the XOR device performs a mathematical operation, being the modulo-2 addition. It is strongly emphasized that no addition is performed by the XOR device. For instance assume state 0 represents 0.9 Volt. The inputs 0.9V and 3.5V in accordance with the datasheet will generate 3.5V. An addition of these voltages would be 4.4V. But the XOR device does not generate 4.4V, but 3.5V. Accordingly, an XOR device is a 2-state switching device. The device may be called a Mod-2 Adder, but that is not what physically takes place. An AND switching device is often described as a modulo-2 multiplication, using representation by states 0 and 1.

This is subject matter of what is called Machine Arithmetic or Computer Arithmetic which teaches arithmetical machines based on logic components, which currently are mostly binary logic electronic components. The subject matter is disclosed in Kai Hwang, Computer Arithmetic, 1979, John Wiley and Sons, Inc. and Gerrit A. Blaauw (hereinafter "Blaauw"), Digital System Implementation, Prentice-Hall, Inc. 1976 which are both incorporated herein by reference.

There are 16 possible binary 2-input/1-output switching devices. These include the OR, AND, NAND, NOR, EQUALITY, ALWAY, NEVER, GREATER functions, as explained on pages 351 and 352 of Blaauw.

Blaauw explains on page xxvii that a digital machine can be viewed from 3 levels. The highest level is the architecture, which specifies the functional behavior of a system. The lowest level is the realization, which describes the physical components of the system and would include the earlier mentioned datasheet of the XOR device. The middle level is the implementation, which describes the logical structure of the components and may use switching algebra or switching tables. A logical structure (the switching tables) may be used in different forms of realization. For instance, a switching table may be stored in a memory such as a non-transitory storage device, wherein inputs generate an address that holds the representation of an output state. A switching device may also be realized in a combinational switching device.

Furthermore, components may be realized in different technologies such as electro-mechanical relays, TTL components or CMOS components for instance, which should not be considered to be limiting. The logical structure in different technologies may be identical while the components may apply substantially different components. Accordingly, even if one works with different switching technologies or even upfront not narrowly defined switching components, one can still design the logical structure of a device. This is not unlike defining an electronic device like an amplifier. Using realizable limitations, an amplifier can be defined as a generic device with a transfer function and relevant impedances, which can be realized with different types of components.

One can thus provide a logical structure of a switching device, described by for instance switching operations (like XOR and AND) and be sure that these operations or switching functions can be physically realized. Physically realized means a physically circuit is realized that operates in accordance with the required switching table. A device herein may be cited as a function. That is: a binary switching function and an n-state switching function are not only descriptions of a functional performance, but also represent a physical realization of the switching function herein. Much discussion takes place around the concept of an "abstract idea." An arithmetical operation is often considered to be an abstract idea. To prevent such confusion, any logical operation herein is a physical operation. For convenience physical signals are represented by states to facilitate understanding of the subject matter. However: all functions herein represent not only a logical structure but also the underlying realization.

A computer may execute the following statements (as represented in Matlab for instance):

(1) BAND=[1 2;2 1];
(2) bA=1;
(3) bB=1;
(4) A=bA+1;
(5) B=bB+1;
(6) OUTPUT=BAND(A,B);
(7) C=OUTPUT−1

The above Matlab instructions, indicated by line numbers, physically perform the following steps. In step (1) non-transitory memory (until overwritten) loads on identified addresses indicated by name BAND, 4 data elements, being addressable elements in a 2 by 2 array. The stored data elements are generally not in volts the value of the data elements. In general a data element is a fixed length binary word that is presented by a conversion on a display as stored values 1 and 2.

How data elements are stored and retrieved is well known in the art. In general an address coder/decoder is applied. Physical housekeeping procedures, such as assigning symbolic names as variables to memory addresses and so on are hidden from computer users by internal operating system and programming language features. However, it is understood that these housekeeping facilities are physical operations. The physical working of processors and memory management and communication protocols are well known to one of ordinary skill. The working of for instance microprocessors in that regard is explained in the book The Intel Microprocessors, Eight Edition, Barry B. Brey, Pearson Prentice Hall, Columbus, Ohio, 2009 which is incorporated herein by reference.

BAND is thus a representation of a binary switching function table, wherein the state of the output depends on two inputs, which may be called row number and column number. Matlab starts counting indices of arrays from origin 1, as row or column number 0 do not exist in Matlab. FIG. 1 illustrates the physical operation of the switching device represented by BAND. Device 100, which may be an addressable memory or a combinational circuit, has two inputs: IN1 and IN2 and an output providing signal OUTPUT. In case of 100 being an addressable memory, IN1 indicates an address that represents the row number of array BAND and IN2 represents the column number of switching table 101 indicated as BAND. One can see from 101 that input IN1=2 and IN2=2 generates output 1, as BAND(2,2)=1. Often multiple switching devices are used to create an application, like a binary adder or multiplier. That means that an output of a first device is used as an input for a next device. For that reason the output of a switching device should be in the same representation as the inputs, being states 1 and 2 in this case.

One can see that table 101 represents a switching table and not a true addition. Clearly 1+2 is not 2, but BAND(1, 2)=2. It is possible to design useful composite binary switching circuits, such as a ripple carry adder circuit, representing signals as having states 1 and 2. This is because no math is performed by individual binary devices.

For better understanding of a digital design it is beneficial to represent the switching states as 0 and 1, because this then looks like modulo-2 operations, even if the switching operations do not use the actual voltages of 0 and 1 Volt. This method of representing physical states by symbolic values 0 and 1 was introduced by Claude Shannon in 1936 in his Master of Science Thesis at MIT, entitled A Symbolic Analysis of Relay and Switching Circuits, which is incorporated herein by reference. An advantage of this representation, which has been adopted universally by digital system designers, is that digital circuits can be presented by Boolean Logic statements. Unfortunately, this sometimes leads to assertions that digital binary circuits perform Boolean Logic. This is of course not true, even if colloquially this is asserted. A circuit does not perform a Boolean logic statement, no more than a falling body performs the formula of Newton's gravitational law.

In the above Matlab statement, it appears that one is stuck with the 1 and 2 state. The representation of signals as state 0 and 1 is only for human convenience. To the circuit and the operation thereof, it does not matter what the actual signals are called. To make the Matlab program better to understand for humans, the following statements are included. A first input signal bA=1 is provided in (2) and a second input signal bB=1 in (3). To comply with the origin 1 requirement of Matlab, A=bA+1 is performed in (4) and B=bB+1 in (5). This allows Matlab operations in origin 1, for instance on XOR device 100 represented by table 101.

The output of device 100 is generated by OUTPUT=BAND(A,B) in (6). For presentation on a display in origin 0, Matlab prints on a screen in (7) C=OUTPUT−1. Matlab does not display an output of a statement when a line is ended with the ";" symbol. Line/statement (7) does not end with ";" and thus the value of C is displayed on a screen. While it seems that a modulo-2 arithmetical operation is performed, the naming of states as 1 and 2 demonstrates that this is purely a switching operation.

Arithmetic and logic functions are performed by physical switching devices in computers. They are often created in an Arithmetic Logic Unit (ALU) of a processor or they may be separate functional units. In general arithmetic on computers (both floating point and integer) is a combination of instruction sets operating on hardwired instructions and operations. It is to be understood that all operations on a computer, even when designated as mathematical operations are in effect hardware switching operations.

Most processing steps on a computer relate to operations on data representing non-binary variables. These may be ASCII characters or other non-binary data. It is possible to create non-binary physical switching devices. However, currently processors mainly operate with binary switching devices. Characters are represented by binary words of 2 or more bits which are processed by binary circuitry. Floating point arithmetic operations are an example of that.

Most arithmetical and logical operations on a computer, if not all, apply standard representations and reflect standard logic and arithmetic. This includes binary and decimal arithmetic and radix-n arithmetic or modulo-n arithmetic. The standard capability of computers include possibility to perform addition and multiplication over a finite field GF(n) with n being a prime number. Also possible is performing addition and multiplication over extension finite field GF(n=$p^k$) wherein p is a prime greater than 1 and k is an integer greater than 1. In some cases general modulo-n multiplication and/or addition is used. These operations apply switching functions that are represented by known binary and/or non-binary switching tables or switching function tables.

Figure 2:
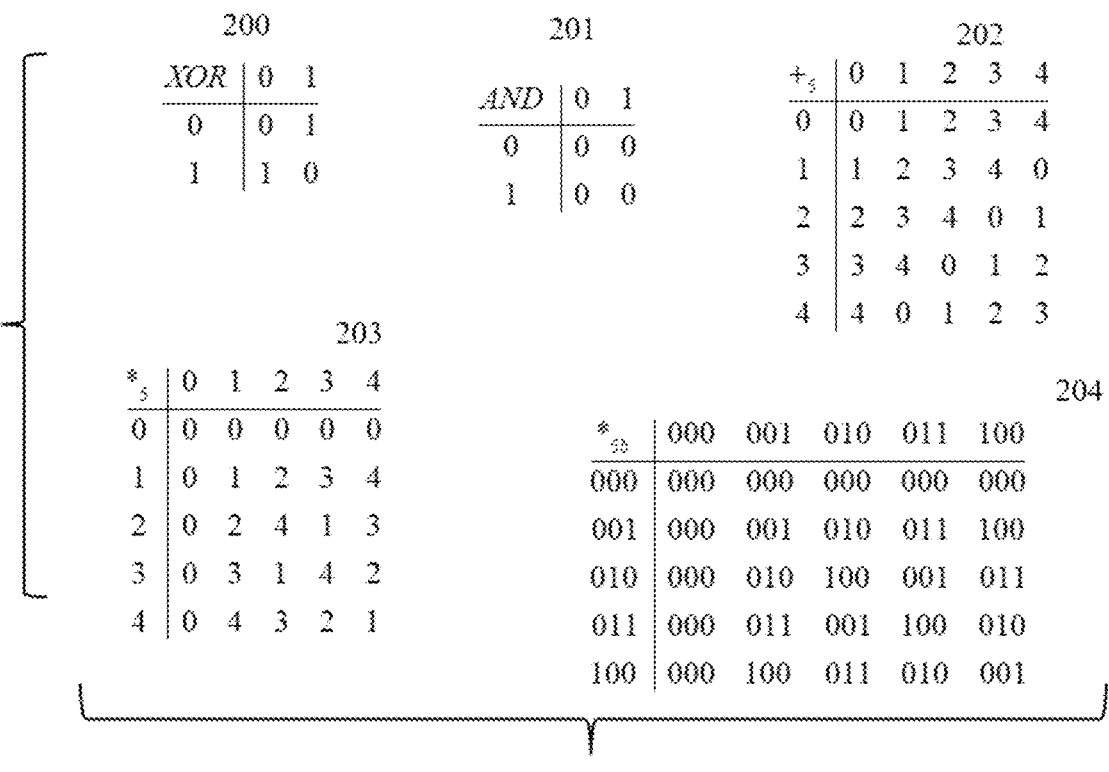

FIG. 2 shows switching tables or switching function tables representing known switching devices. Table 200 of FIG. 2 shows the switching table representing the XOR switching table. A XOR function in a computer is fully intended to be a XOR device herein. For convenience origin 0 representation is used. From the description above, one should realize that the states used in the table are not the actual signal values. Table 201 shows the switching table of the binary AND switching function. Table 202 shows the switching table representing the mod-5 addition and table 203 shows the switching table representing the mod-5 multiplication.

FIG. 2 table 204 shows the table 203 in binary representation of states as they may appear to one using a digital probe in a memory. One of ordinary skill may use a Karnaugh map to design a digital combinational circuit from table 203. One may also store the table in a memory such as a non-transitory memory or storage device. The tables as shown are thus not only representations of a function but of a physical device that performs the function and is fully intended to be so.

Figures 3, 4:
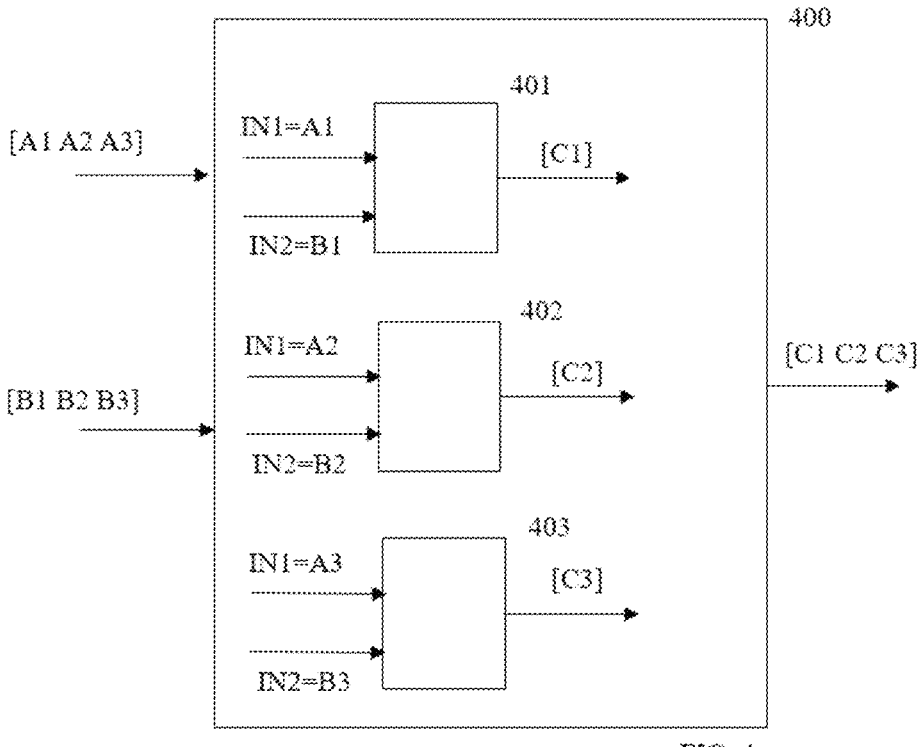
FIG. 3 illustrates 8-state switching tables.
FIG. 4 illustrates an implementation of a symbol wise realization of a switching function.

FIG. 3 shows 8-state switching tables 301 and 302 of a switching device, now without the input states surrounding it, but they are easily determined using origin 0. Again, this is a representation of a switching device which operates on 8-state input signals, for instance words of 3 bits. For the general public this table does likely not represent anything special. For one of ordinary skill this may represent a switching table representing an addition over a finite field GF(n=$2^3$=8).

A detailed combinational circuit for this table is a bitwise processing of 2 3-bit words by three XOR functions/devices. The device is illustrated in detail as a combinational circuit 400 in FIG. 4. Two binary words with bits [A1 A2 A3] and [B1 B2 B3] respectively are provided bitwise to XOR functions 401, 402 and 403. The results of the bitwise XORing are provided as word [C1 C2 C3]. One can easily check with the table 301 that this table is generated by bitwise XORing.

The table 301 is thus equivalent to a circuit that is represented by what is known as an addition over GF(8). Table 302 is often designated as a switching table of a multiplication over a finite field GF(8). Binary extension fields find application in error-correcting coding and cryptography.

Their advantage is relative easy realization of circuits in binary components and other properties. For instance, additions over GF($2^k$) are self-reversing. Furthermore, multiplications over GF($2^k$) are reversible, except for the zero-elements. One can easily check that modulo-$2^k$ multiplications are non-reversible.

The fortuitous effect of using circuits that can be described by switching tables of operations such as mod-n and GF(k) operations, is that one can design in mathematical terms a useful operation, like a calculation and/or an error-correcting coding and/or a cryptographic operation and realize it easily on a computer, because the computer includes the switching operations that are represented by the mathematical operations. It is again emphasized that the computer operations are themselves switching operations or devices and they do not actually perform mathematics, but strictly physical switching between physical states.

A cryptographic device is a device that generates a cryptographic signal from an input signal. A cryptographic signal is a signal derived from an input signal, but wherein the original input signal cannot be easily reconstructed from the cryptographic signal without undue experimentation and effort.

Cryptographic devices include shift register based scramblers and sequence generators, encryption and decryption devices, hash function and message digest devices, signature generators, private and public key generators, MAC and HMAC devices, CRC devices, etc. This definition can be further expanded to: a cryptographic device operates in accordance with a cryptographic purpose and/or specification. The purpose can be encryption/decryption, hash generation, MAC/HMAC, message digest, private/public key generation, digital signature, scrambler, streaming cipher and the like.

The similarity between mathematical operations and switching operations can be captured as a similarity between meta-properties of the mathematical operation and its representing switching table. For simplicity properties will be based on finite fields. This covers automatically properties that other algebraic structures such as groups and rings have.

There are two operations in a finite field GF(n), operation 1 and operation 2. In applications such as cryptography, these operations are called addition and multiplication. The origin thereof can be found in modulo-n addition and multiplication with n being prime, which both are GF(n) operations. For convenience the terms addition and multiplication over a finite field will be used. However, herein these terms mean the above operation 1 and operation 2, even if no direct similarity with known addition and/or multiplication is found.

The properties of the n-state switching tables are as follows:

both operation 1 and operation 2 are closed and are defined for a set of n different states (an operation on n-state inputs, generates an n-state output);

both operation 1 and operation 2 are associative;

operation 1 ($\oplus$) has a neutral element (or one-element) e and an inverse $a^{-1}$ for every element a in the finite field so that $a \oplus e = a$ and $a \oplus a^{-1} = e$. One may also say that each element in the switching table of GF(n) is reversible;

operation 2 ($\otimes$) has a neutral element (or one-element) e so that $a \otimes e = a$ and inverse $a^{-1}$ for every element a (except a zero-element) so that $a \otimes a^{-1} = e$;

operation 2 ($\otimes$) has a zero-element z so that $a \otimes z = z$;

operation 1 and operation 2 are both commutative; and operation 1 and operation 2 distribute or $a \otimes (b \oplus c) = (a \otimes b) \oplus (a \otimes c)$.

In all published operations over finite fields known to the inventor the zero-element is 0 and the one-element is 1. The use of zero-element 0 and one-element 1 in any kind of arithmetic is well established and explains why no cryptographic operations exist wherein a zero-element is not 0 and/or the one-element is not 1. Operations that are modified in accordance with the FLT are largely mathematically meaningless. For instance an FLT modulo-n operation (addition or multiplication) has no meaning outside the meaning as provided herein. One familiar with modulo-n operations would be unable to place or use FLTed operations. Only after learning about the FLT as disclosed herein or after considerable undue experimentation would one of ordinary skill perhaps be able to assess usefulness of the FLTed switching tables as disclosed herein. At first sight they would merely look as random tables, which is of course very good in the context of cryptography and security. For cryptography, it is beneficial to have circuits that perform like for instance finite field arithmetic while the representing symbols do not comply with known mathematical rules.

Cryptographic computer devices perform currently streaming and block type cryptographic operations. The operations can be divided in encryption/decryption, Public Key Infrastructure (PKI) type key exchange and authentication or message digest related operations. Basic cryptographic operations are explained in for instance Understanding Cryptography, Christof Paar et al., Springer-Verlag, 2010, Berlin, (hereinafter "Paar") which is incorporated herein by reference. Encryption/decryption requires often a keyword against which a message (which may be text, numerical and/or text symbols, audio and or video signals and/or content) is encrypted. This requires at least one reversible switching function that allows encryption and decryption against a keyword or a content of a register. The most popular switching device for encryption may be the XOR device or function, which may be represented as an addition over GF(2). Another function is the binary EQUIVALENT (=) function, which with the XOR form the only two entirely reversible binary switching functions. Also very popular in encryption are devices formed by multiple (k) XOR devices, represented as addition over $GF(2^k)$. One example of an encryption method is the Advanced Encryption Standard (AES), published as Federal Information Processing Standards Publication (FIPS) 197 on Nov. 26, 2001 as FIPS PUB 197, which is incorporated herein by reference. The AES uses a 256-state addition over a finite field $GF(n=2^8)$. Another encryption standard is the NIST Special Publication 800-67 Revision 2: Recommendation for the Triple Data Encryption Algorithm (TDEA) Block Cipher, November 2017 which is incorporated herein by reference. The Data Encryption Standard (DES) was in one version published as FIPS PUB 46-3, Reaffirmed 1999 Oct. 25, which is incorporated herein by reference. In these and other encryption/decryption devices and methods, additions over $GF(2^k)$ are not explicitly specified, but rather bitwise or bit-by-bit XORing of bits of words of bits (for instance words of 32 bits) are specified. These bitwise XORing can be treated as additions over $GF(2^k)$ such as $GF(2^{32})$. One may find $n=2^{32}$ too large. One may break up the words and bitwise XORing of 32-bits words, may be considered 4 additions over $GF(256=2^8)$. Other combinations, such as 2 blocks of 16 bits or 2 blocks of 12 bits and 1 block of 8 bits or other combinations are possible.

In general any reversible n-state switching function device may be used for encryption/decryption. If an n-state addition over GF(n) is selected with n being prime and not 2 or $GF(n=q^k)$ with q being prime and not 2, then a reversing device/function exists. The advantage of an addition GF(n) with n being a power of 2 is that the addition function/device is self-reversing and the same device/function can be used for decryption. This has certain advantages.

Elliptic Curve Cryptography (ECC) applies elliptic curves over finite fields to generate pairs of keywords being the public key and a matching private key. Details of theory behind ECC can be found in Paar. Keywords in ECC are generated by using devices/functions over finite field GF(n) which may be binary finite field $GF(n=2^k)$. ECC is further described in Working Draft American National Standard X9.62-1998 by Accredited Standard Committee X9 published Sep. 20, 1998 which is incorporated herein by reference. Elliptic Curves are recommended for generation of digital signatures in Digital Signature Standard (DSS) in Federal Information Processing Standards Publication 186-4, July 2013 which is incorporated herein by reference.
Digital Signatures One way to generate public and private keys is the RSA (Rivest, Shamir, Adleman) method which is described in patent U.S. Pat. No. 4,405,829 issued on Sep. 20, 1983 which is incorporated herein by reference. Diffie-Hellman (hereinafter "DH") is one of the earliest key exchange methods and is described in patent U.S. Pat. No. 4,200,770 which is incorporated herein by reference. Both RSA and DH apply functions/devices that are represented as modulo-n multiplications. However, one may also use modulo-n additions, which are generally considered to be less secure.

One cryptography method is authentication which generates a message digest of data which may be in a message. Authentication methods are also used in crypto money such as BitCoin. One method of generating a message digest is using a shift register based device to generate a hash value or cyclic redundancy check (CRC).

One drawback to the above cryptographic devices and methods is that the used devices/functions are known and are represented by either modulo-n arithmetic operations or by operations over a finite field GF(n). Furthermore, almost all applied functions/devices have 0 as the zero-element and 1 as the one-element. While a successful attack on cryptographic methods may still be difficult, security of cryptography is continually diminished by increasing power of attacking machines and improved attack methods.

In accordance with one or more aspects of the present invention, a computer is improved by modifying an n-state switching function/device into a novel never used before n-state switching device. In accordance with one or more aspects of the present invention the modified n-state switching function/device is applied in a cryptographic device and/or operation. In accordance with one or more aspects of the present invention the cryptographic device and/or method is at least one of: an encryption, a decryption, a signature, an authentication, a generation of cryptocurrency, a generation of a public/private keyword, a Public Key Infrastructure, Elliptic Curve Cryptography methods and/or devices.

Many of cryptographic methods rely on the intractability of resolving or cracking a received symbol, message or keyword or cryptographic parameters into a solution that defies the cryptographic method. Because it is well documented what used n-state switching functions or primitive switching functions/devices are in computers are, the number of possible solutions is large but still finite. Attacks become better and faster, putting pressure on security of existing methods. Furthermore, many cryptographic methods may be cracked by quantum computers.

Modifying existing primitive n-state switching functions/devices will improve security dramatically. In certain cases it may allow to make keywords smaller and/or use smaller values of n in n-state switching functions and devices.

In order to secure proper working of existing cryptographic methods/devices with the modified or novel primitive n-state switching functions/devices, these modified devices must preferably have the same properties as the n-state switching functions that they depend from.

In accordance with an aspect of the present invention, an existing n-state switching function/device is modified in accordance with the Finite Lab-Transform or FLT. The FLT applies n-state reversible inverters. An n-state inverter is a one input/output n-state device. The input is provided with one or more discrete signals that assume one of n states. For convenience these states may be named [0, 1, 2, . . . n–1] in origin 0 or [1, 2, 3, . . . n] in origin 1. The n-state inverter is expressed as a transformation of a vector, inv: [i(0) i(1) i(2) . . . i(n–1)]→[u(0) u(1) u(2) . . . u(n–1)] in origin 0 and [i(1) i(2) i(3) . . . i(n)]→[u(1) u(2) u(3) . . . u(n)] in origin 1. For convenience the states i(0), i(2) etc. are provided in their position order. So: [0 1 2 . . . n–1]→[u(0) u(1) u(2) . . . u(n–1)] in origin 0 and: [1 2 3 . . . n]→[u(1) u(2) u(3) . . . u(n)] in origin 1. Reversible n-state inverters have a unique transformation, and [u(0) u(1) . . . u(n–1)] and [u(1) u(2) . . . u(n)] show no repeat of states. In origin 0, the Identity is [0 1 2 . . . n–1]→[0 1 2 3 . . . n–1], as each state is transformed to itself. A reversible 4-state inverter may be [0 1 2 3]→[0 1 3 2]. In this case the states 0 and 1 are not modified. Another reversible inverter is [0 1 2 3]→[3 2 0 1]. Because the left sequence is always [0 1 2 3] (or generally [0 1 2 . . . n–1]), the inverter may be called reversible 4-state inverter [3 2 0 1], by dropping the right side of the arrow and the arrow.

An n-state inverter may be realized in a combinational circuit, which may be a binary circuit, a memory or a computer implemented inverter.

The following table shows the above 4-state inverter's binary input and output.

| input$_{dec}$ | input$_{bin}$ | output$_{bin}$ | output$_{dec}$ |
|---|---|---|---|
| 0 | 00 | 11 | 3 |
| 1 | 01 | 10 | 2 |
| 2 | 10 | 00 | 0 |
| 3 | 11 | 01 | 1 |

FIG. 5, FIG. 6 and FIG. 7 illustrate different ways to implement/realize the example inverter. Using a Karnaugh map one may realize the circuit 500. For convenience a 4-state symbol 'in' is represented as an origin 0 representation in 2 bit 'xy'. So symbol 3 at the input has binary representation '11'. The output of the inverter is represented as binary 'uv'. One can see that bit 'u' is the opposite of bit 'x'. So bit 'u' in FIG. 5 is realized by a simple binary inverter 501 ([0 1]→[1 0].) Bit 'v' is realized by an AND operation on the 'x' and 'y' bit. One can see in the above table that bit 'v' in output is 1 when 'x' and 'y' are 0, as realized by AND circuit 502 and when both 'x' and 'y' are 1, as realized by AND circuit 504. The 0 output of 'v' is implied when 'x' and 'y' have different states. An OR circuit 505 provides binary output 'v'. This is a combinational realization of an inverter, in this case a 4-state inverter. Conversion circuitry, required for converting from non-binary input and to non-binary output, has been omitted to prevent crowding of the figure but should be assumed.

FIG. 6 schematically illustrates the 4-state inverter in memory realization. The binary input signals represented by 'x' and 'y' are provided to inputs 601 and 602 of address decoder 603. The address decoder, based on the inputs, activates a memory line or address line 604, related to the actual states of 'x' and 'y' and outputs the content of the memory content 605 at address 604 to outputs 606 and 607 as signals with states 'u' and 'v'. This is a schematic diagram of a memory based inverter. Additional circuitry may be involved to manage relative addressing and the size of addresses and memory content may be different (for instance 64 bits). FIG. 6 provides how a memory based n-state inverter works.

FIG. 7 provides a listing 700 of a Matlab program that performs the 4-state inverter. Matlab works in origin 1. To implement an origin 0 inverter statement on line 4 adds 1 to the elements of the inverter 'inverter4' and adds 1 to input 'x' in statement 5. Statement 6 determines the output of the inverter and brings it to origin 0 by subtracting 1.

Superfluously, in light of the above, it is pointed out that even though the program statements look like mathematical operations, when the program is run on a computer, actual physical devices operate on signals. One may provide the signal generated by statement 6 to an oscilloscope or a digital analyzer and detect that a signal representing 'y' was generated, proving that the computer implemented 4-state inverter is a physical device.

A reversible n-state inverter has itself a corresponding reversing n-state inverter, wherein applying the n-state inverter on an input to generate an output and inverting the output with the reversing inverter will establish identity, which means the original input. The revering 4-state inverter of inv4=[3 2 0 1] is rinv4=[2 3 0 1]. One can check that inv4(2)=0 and rinv4(0)=2, etc.

Reversing inverters can be realized in the same manner as n-state inverters, because that is what they are. In computer implemented form one can generate the reversing n-state inverter from the original n-state inverter. This is illustrated in FIG. 8 in Matlab program listing 800.

In some cases an inverter is self-reversing in that applying the inverter twice generates the original input. For instance the 4-state inverter [2 3 0 1] is self-reversing.

U.S. patent application Ser. No. 12/952,482 filed on Nov. 23, 2010 which is incorporated herein by reference and to which priority is claimed, teaches how certain n-state switching functions have properties of finite field operations, but are different from known operations. This disclosure provides ways to modify n-state switching functions with inverters at inputs and output.

Figures 8, 9:
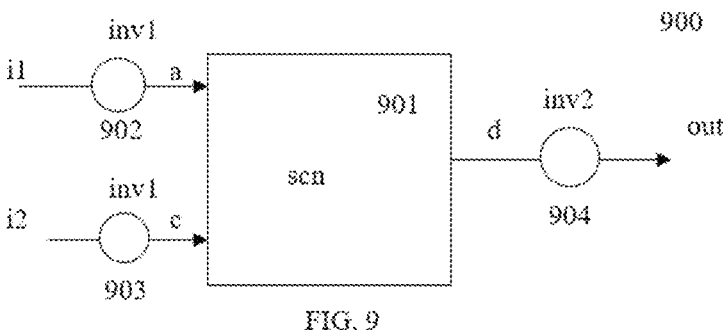
FIG. 8 is a screenshot of a program to generate a reversing n-state inverter.
FIG. 9 illustrates a Finite Lab-Transform (FLT) of an n-state switching device.

A modification of a switching table and thus of a switching circuit or device 900 is recapitulated in FIG. 9. A device 901 is characterized by a first 2-input/1-output n-state switching table and has 2 inputs that are provided with signals i1 and i2 represented each by one of n states. The inputs have n-state inverters 902 and 903, which preferably are identical and named inv1. The output has an n-state inverter 904 called inv2 which preferably is the inverse of [inv1 so that the combination of inv1 and inv2 is identity. The device 901 is characterized by an n-state switching function with an n-state switching table called "scn".

The signal 'i1' is inverted by 902 to 'a', or symbolically described as a=inv1(i1). The signal 'i2' is inverted by 903 to 'c', or symbolically described as c=inv1(i2). Device 901 generates an output signal 'd' which can be symbolically represented as d=scn(a,c). Signal d is inverted by 904 in accordance with out=inv2(d). Or: out=inv2{scn (inv1(i1), (inv1(i2)} or out=smodn(i1,i2). That is: the operation performed by device 900 can be characterized by the n-state switching function table 'smodn.'

This processing of signals in accordance with FIG. 9 is called herein the Finite Lab-Transform (FLT) and pertains in particular to cases wherein 'scn' is an n-state switching table that is either an operation of a finite field GF(n) or of a modulo-n addition or modulo-n multiplication. When inv1 and inv2 are n-state reversible inverters and in combination form identity, the meta properties of the n-state switching function table 'scn' are preserved in 'smodn." That means that if 'scn' is commutative, associative, is reversible, has a zero element and a one-element then 'smodn' is also commutative, associative, reversible, has a zero element and a one-element, though the zero-element and one-element of 'smodn' may be different from 'scn.'

The FLT in one embodiment is realized as a computer implemented device, using for instance the Matlab programming language. FIG. 10 shows a Matlab listing 1000 that performs a computer implemented realization of the device of FIG. 9. As an illustrative example FIG. 11 shows the switching table 1100 of a modulo-7 addition and 1101 of a modulo-7 multiplication that characterizes a switching device. The zero-element is 0 and the one element is 1. The operations are commutative and associative and the two operations are distributive. The FLT with inv7=[6 1 4 0 5 2 3] is applied to the tables and generate the computer implemented realization of FIGS. 12, 1200 and 1201. A test will show that these tables are also commutative and associative and are distribute. However, the zero-element is now 3 and the one-element is 2. The reversing inverter of inv7 is rinv7=[3 1 5 6 2 4 0]. It is possible to find a replacement for rinv7 that also implements the FLT as desired. There is a rule for that. However, no additional modified tables can be found on top of the combination (invn, rinvn) that generate modified tables.

Preservation of meta-properties does not only apply to devices that are characterized by operations over GF(n). For instance an n-state switching table represented by a modulo-n multiplication with n having different factors like having a factor 2 (for instance n=$2^k$*q) is not reversible, which can easily be checked for n=8. For n=8(2*3)mod-8 is 6 and (2*7)mod-8 is also 6 and thus the operations are not reversible. However, the operation *mod-8 is still associative. An FLT of the switching table of *mod-8 with for instance inv8=[1 4 0 7 5 2 3 6] will generate an n-state switching table that is also associative.

Figures 13, 14, 15:
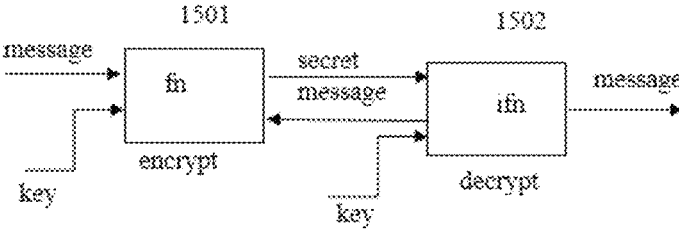

One interesting n-state switching function is the one generated by k bitwise XOR operations called the addition over finite field GF($2^k$). FIG. 13 shows the 8-state switching table 1301 of an addition over GF(8) formed from 3 bitwise XOR operations and 1302 is a multiplication over GF(8). The operations characterized by 1301 and 1302 meet with the requirements of a finite field. One advantageous property of 1301 is that it is self-reversing. Call 1301 'sc8'. The operation of 'sc8' on input states 'a' and 'b' can be represented as: c=sc8(a,b). Because 'sc8' is self-reversing b=sc8 (a,c) and a=sc8(c,b). This means that in cryptography the self-reversing function 'sc8' (or more general 'scn') can be used for both encryption and decryption. The self-reversing property is preserved under the FLT and FLT n-state self-reversing switching tables will also be self-reversing.

Another self-reversing n-state switching function is characterized by the expression scr(i1,i2)=(n−i1−i2−1−offset) modulo-n, wherein offset is a number between 0 and n−1, for representation in origin 0. The self-reversing property is preserved under the FLT. However, the n-state switching tables are not associative. This means that multiple consecutive applications of these switching functions in encryption/ decryption require maintaining a proper order, due to lack of associativity. These self-reversing n-state switching functions and their FLTs find good application in message digest and hash function applications, for instance in one of the Secure Hash Standard (SHS) as published in FIPS 180, 1993 May 11; FIPS 180-1, 1995 Apr. 17; FIPS 180-2, Aug. 1, 2002; FIPS 180-3, October 2008 and FIPS 180-4, August 2015 and include SHA-1, SHA-2 and SHA-3 which may include SHA-224, SHA-256, SHA-384, SHA-512, SHA-512/224, SHA-512/256, SHA3-224, SHA3-256, SHA3-384, SHA3-512 and all of the above are incorporated by reference.

Authentication devices usually have multiple XOR devices to enter or capture the initial message or later at least part of processed signals. The multiple XOR devices used in authentication, encryption or other cryptographic operations can be replaced by FLTed n-state additions over GF(n) or FLTed n-state self-reversing functions.

One benefit of applying the FLT is that for n being substantial, for instance being greater than 15, preferably being greater than 50, more preferably being greater than 100, most preferably being greater than 255 is that the number of different FLTed n-state switching tables is large and may successfully attacking cryptographic methods using an FLTed n-state switching function very difficult or impossible thus making the modified cryptographic methods much more secure. The number of n-state reversible inverters is factorial n (n!) and includes the identity n-state inverter [0 1 2 3 . . . n−1]. Using the identity inverter does not change the FLTed n-state switching function. Preferably an n-state inverter is selected from n! reversible n-state inverters and more preferably is selected from n!-1 reversible n-state inverters by excluding the identity inverter from being selected. Even more preferably the n-state inverter in the FLT is selected from those reversible inverters that have in no position a symbol in common with the identity inverter. In Matlab an n-state identity inverter may be called 'invident' and another n-state inverter is called 'invn.' The condition of no coinciding elements in Matlab is test= (invident==invn). For test=0 there are no common symbols in corresponding positions. There are comb(n)=(n−1)* (comb(n−1)+comb(n−2)) different n-state inverters that have no symbols in common with symbols in corresponding positions in the n-state identity inverter. This is a recursive expression that can be easily evaluated in a computer program. For instance, there are 40,320 different reversible 8-state inverters of which 14,833 are combinations with duplicates with identity in corresponding positions. The value of (n−1)! or 7! is 5040. So there are more than (n−1)! n-state inverters with no duplicates in corresponding positions with the identity inverter. There are many way to generate non-duplicate n-state inverters or even low duplicates n-state inverters. Preferably, one would like to have the n-state inverter appear random in symbols, with few duplicates with an identity n-state inverter. One way to do that is to select a multiplier 'mr' mod-n wherein 'mr' is co-prime with 'n' which guarantees that the selected multiplier is reversible. The multiplier has at least 1 term in common with identity, which is the first symbol 0. For instance a 32-state selected inverter may be multiplier 15 which, as a vector, is [0 15 30 13 28 11 26 9 24 7 22 5 20 3 18 1 16 31 14 29 12 27 10 25 8 6 21 4 19 2 17]. This inverter has only the symbol in the first position (being 0) in common with identity. One may further modify the inverter by adding a number not equal to 0 to each term of the inverter. For instance add 3 modulo-32 to each term. This generates 32-state reversible inverter inv32m=[3 18 1 16 31 14 29 12 27 10 25 8 23 6 21 4 19 2 17 0 15 30 13 28 11 26 9 24 7 22 5 20] which looks pretty much random and has not the zero and one element in common with the identity. This scheme (and other schemes) can easily be expanded to automatically generate a huge list of different and desirable n-state inverters, wherein the list of desirable n-inverters is at least $n^2/2$ and preferably at least $(n-3)!$ long.

Often, operations of a binary finite field GF($n=2^k$) are used in cryptographic operations. AES encryption is an example of that. The finite field GF($n=2^k$) in mathematics is generated with the help of irreducible polynomials with coefficients over GF(2) and of a degree n. The number of irreducible polynomials is limited and thus the number of finite fields GF($n=2^k$) is limited. For instance the book Sequence Design for Communications Applications, by Pingzhi Fan and Michael Darnell, John Wiley and Sons, New York, NY, 1996 ("Fan"), which is incorporated herein by reference, lists the irreducible polynomials over GF(2) at page 424. For m=3 or $n=2^3=8$ there are two irreducible polynomials of degree 3: $x^3+x+1$ and $x^3+x^2+1$. A multiplication over finite field GF(8) can be determined by a multiplication over GF(2) modulo the polynomial as is known in the art. This is already a labor intensive effort, which becomes much more involved for large values of n. The 8-state switching tables represented by the two multiplications over GF($2^3$) derived in this classical manner are provided as table 1302 in FIG. 13 and table 1401 in FIG. 14.

It turns out that the finite field operations in GF($2^k$) or more general in GF($q^k$) defined by one irreducible polynomial can easily be transformed to operation defined by another irreducible polynomial. For instance the FLT with inv8x=[0 1 7 6 3 2 4 5] on the tables of 1301 and 1302 of FIG. 13 achieves this. It will generate the table 1401 from 1302. It will also generate an exact an unchanged copy of 1301. One can check that 1301 and 1401 define the finite field of $x^3+x^2+1$, while 1301 and 1302 define the finite field of $x^3+x^2+1$.

The range of FLTs is much greater than only the finite field operations by irreducible polynomials. In fact a great number of for instance additions over a finite field GF(8) with zero-element 0 are generated by the FLT, much greater than possible with irreducible polynomials. In accordance with an aspect of the present invention all finite fields generated by irreducible polynomials may be excluded from FLT generated operations making one assumption that these may be known by an attacker. This would apply for instance in the case of n=256 or GF($2^8$). There are about 30 irreducible polynomials of degree 8 documented in Fan. Preferably, these operations should be excluded from FLT generated n-state switching tables in cryptographic applications as assumed of being known. However for large numbers of k in $2^k$, for instance k greater than 50 or preferably k greater than 100, it becomes irrelevant as even the total number of irreducible polynomials become too great to evaluate. One can thus generate a novel FLT based operation and check if it can be generated by an irreducible polynomial. If so, that operation may be dropped.

There is a much simpler way to select an FLTed operation that cannot be generated by an irreducible polynomial. One aspect of a finite field generated by an irreducible polynomial is that it applies to extension fields and not to finite fields GF(n) with n being prime. In that case there is only one set of operations, the modulo-n addition and multiplication, and each FLT that generates a different set of operations from the original set is novel. In case of extension fields, all operations have zero-element 0 and one-element 1. So if a unique addition over GF($q^k$) is required one should select an n-state inverter that transforms the zero-element from 0 to not 0. In case of a multiplication one may select an n-state inverter that modifies either the zero-element from 0 to not 0 or the one-element from 1 to not 1, or does both, as that will generate operations that cannot be generated by irreducible polynomials. RSA applies modulo-n multiplications that are not necessarily defined over a finite field. In that case any FLT that will not generate the original modulo-n multiplication will be unique. Modifying zero-element and/or one-element may assist in further confusing attackers.

One application of using FLTed n-state switching functions/devices is in encryption and decryption. One aspect of encryption, also called symmetric encryption, is that a common key (which is held secret) is used for both encryption and decryption. This is illustrated in FIG. 15. A first computing device 1501 is provided with a message and a key and the message is encrypted wherein at least a reversible 2 input/1-output n-state switching function/device is used, which is called 'fn.' A message may contain series of bits or is presented as series of bits and the message may be broken up in chunks or words of bits. Processing words bits of 8 bits for instance with bitwise XOR is common. The processing by k bitwise XORing is characterized herein as and by a $2^k$-state switching function table. While the use of binary elements is common, other representations such as $n=3^k$-state or $n=5^k$-state or any other state is possible and is fully contemplated. In accordance with an aspect of the present invention a switching operation/device in computing device 1501 performs encryption on elements by a device that is characterized by an n-state switching function 'fn.' A message is provided or initiated, by a user for instance, but may also be generated autonomously by a device. A keyword 'key' may be provided or may be generated, for instance by a sequence generator. An encrypted 'secret message' is generated and provided to a communication channel to another device 1502. A device 1502 may be a storage device that stores the encrypted message. A device 1502 may also be a decryption device that receives and decrypts the encrypted message. Device 1502 requires access to the same key 'key' that is used to process the received encrypted message with an n-state switching function/device characterized as 'ifn' that reverses function 'fn'. An encryption device may be a shift-register based scrambler, which generally operates as a streaming cipher. The device may also perform a block-cipher. There is further a distinction between symmetric and asymmetric encryption. In symmetric encryption, as shown in FIG. 15, both parties require the same key. Asymmetric encryption requires a pair of keys, a public key and a private key.

The Data Encryption Standard (DES) is a symmetric encryption on words of bits, of which one version was published as a Federal Information Processing Standards (FIPS PUB 46-1) Publication, reaffirmed on 1988 Jan. 22 ("DES"), which is incorporated herein by reference. One operation in DES is a bitwise XORing of 48 bits as illustrated in FIG. 2 in the DES specification. FIG. 1 of DES illustrates a data flow in encryption, which is also decryption. A function 'f' is required that operates bitwise on words of 32 and 48 bits. In accordance with an aspect of the present invention, the function 'f' is modified by an FLT. One may consider a wordlength of 32-bits to be FLTed. However, this may require extreme length inverters. It is more convenient to split a 48-bit word in 6 words of 8 bits, for instance, and treat each 8-bits word as 256-state variable. Other splits are also possible, for instance 3 16-bits words wherein each word is represented as a 65536-state variable to be processed by a 65536-state switching function device. When required the individually processed words can be combined to a 48-bit word. As an illustrative example, take a 32-bit word [1 1 1 1 0 0 0 0 1 1 1 1 0 0 0 0 1 1 1 1 0 0 0 0 1 1 1 1 0

0 0 0] that is bitwise XORed with a 32-bit key [1 0 1 0 0 0 1 0 1 1 1 0 1 0 0 0 0 1 0 1 1 1 0 1 1 1 1 0 1 1 0 1]. The result of such an XOR is [0 1 0 1 0 0 1 0 0 0 0 1 1 0 0 0 1 0 1 0 1 1 0 1 0 0 0 1 1 1 1 0 1]. The 256-state switching function that describes bitwise XORing of 8-bit words is called sc256 and is FLTed with a multiplication 17 modulo-256 (which is co-prime with 256) followed by an addition with 22 modulo-256. This creates the reversible 256-state inverter inv256= [22 39 56 73 90 107 124 141 158 175 192 209 226 243 242 3 20 37 54 71 88 105 122 139 156 173 190 207 224 241 2 19 36 53 70 87 104 121 138 155 172 189 206 223 240 1 18 35 52 69 86 103 120 137 154 171 188 205 222 239 0 17 34 51 68 85 102 119 136 153 170 187 204 221 238 255 16 33 50 67 84 101 118 135 152 169 186 203 220 237 254 15 32 49 66 83 100 117 134 151 168 185 202 219 236 253 14 31 48 65 82 99 116 133 150 167 184 201 218 235 252 13 30 47 64 81 98 115 132 149 166 183 200 217 234 251 12 29 46 63 80 97 114 131 148 165 182 199 216 233 250 11 28 45 62 79 96 113 130 147 164 181 198 215 232 249 10 27 44 61 78 95 112 129 146 163 180 197 214 231 248 9 26 43 60 77 94 111 128 145 162 179 196 213 230 247 8 25 42 59 76 93 110 127 144 161 178 195 212 229 246 7 24 41 58 75 92 109 126 143 160 177 194 211 228 245 6 23 40 57 74 91 108 125 142 159 176 193 210 227 244 5]. This generates the 256-state switching function sc256 mod. The result of modifying 4 words of 8 bits of 'sigin' with words of 8 bits of 'key' generates the combined result: [0 1 0 0 1 0 0 0 0 1 0 0 0 0 1 0 0 0 1 1 1 1 1 1 1 1 0 0 1 1 1 1]. A quick test will show that decryption of this result with the key using sc256 mod provides the original signal 'sigin'. For convenience all 8-bit words use the same function sc256 mod in the example. It is to be understood that this not required and preferably different modified functions are used. Operations like DES and AES and others, always apply additional operations like transposition or other operations. For instance DES applies a Feistel network structure. However, by changing the reversible n-state switching operation in an encryption by an FLT, the intermediate results and the final encryption result will be different from using the unmodified n-state switching function. Because the FLT is preferably kept confidential, the whole encryption using the FLT becomes even more unpredictable than it already was. Because of the enormous number of possible n-state inverters, successfully attacking the encryption becomes unlikely. Accordingly, the modified encryption is more secure than the unmodified encryption. Furthermore, it is believed that circuits applying the FLT as in FIG. 1 were unknown before being disclosed by the inventor. Furthermore, devices designed and realized according to novel n-state switching functions/devices or operations enabled by the FLT improve the working of a computer as it provides the computer with structures that make the computer more secure to operate, for instance to generate more secure data to be stored on a device or to be exchanged with a second device. The original DES standard has been replaced by 3DES or tripleDES or TDEA, published a NIST Special Publication 800-67 Revision 2: Recommendation for the Triple Data Encryption Standard (TDEA) Block Cipher, November 2017, which is incorporated herein by reference.

Another example of a symmetric encryption is AES, as recited above. AES in FIPS-197 specifically teaches arithmetic over finite fields and that all bytes are interpreted and processed as elements of a finite field. AES is limited to multiplication over irreducible polynomial $m(x)=x^8+x^4+x^3+x+1$ (see expression 4.1 on page 10 of FIPS-197). AES uses byte multiplications and addition, for instance in the MixColumns( ) transformation. An addition is performed in AddRoundKey( ). These operations all may be FLTed as described herein to change final and intermediate results of AES encryption, without changing the fundamental (and strong) structure of AES.

Other popular symmetric encryption includes Pretty Good Privacy (PGP) as defined in for instance RFC 4880, which is incorporated herein by reference. PGP is a mix of symmetric encryption and public key exchange. PGP also applies bitwise XORing, and calls the words octets. Thus PGP can also be modified as described above. Twofish is another symmetric encryption that applies bitwise XORing of blocks of bits and can be modified as described above. In fact any encryption that applies a circuit that can be characterized by a reversible n-state switching table can be modified by the FLT as described herein. Encryption that includes a one-way, non-reversible structure such as Feistel networks can also be successfully modified by applying the FLT to non-reversible n-state switching devices.

Encryption methods known as RSA (named after inventors Ron Rivest, Adi Shamir and Leonard Adleman) relate to public/private key methods. A number n is formed from the product of two prime numbers p and q: n=p*q. The Euler totient function $\phi(n)=(p-1)*(q-1)$ is determined and a public key e that is coprime to $\phi(n)$. Also a private key d that is the multiplicative inverse of e to $\phi(n)$ is determined and kept private. The number n and public key e are shared with an encrypting machine which encrypts a message m as $m^e$ mod(n). A receiving machine decrypts the received message $m^e$ mod(n) by determining $(m^e)^d$ mod(n). The RSA method is used for encryption, message signing and key distribution. The RSA method has known enhancements and conditions such a padding schemes, selection of prime numbers. etc. In accordance with an aspect of the present invention the RSA method is modified by applying one or more n-state reversible inverters with n>2 wherein the n-state inverter is preferably kept secret. In accordance with an aspect of the present invention, one or both of the shared key numbers (n,e) are modified with the n-state inverter and are restored at the encrypting machine which also has the (secret) n-state inverter. Because n is presumably very large (greater than 100 bits, more likely to be 1024 bits or greater or 2048 bits or greater) the possible size of modifications is also very large. One possible modification is to XOR the binary representation of n with a large modification word, which is kept secret and is known to the encrypting and decrypting machine. One may add (XOR) a binary word with the decimal value x to the binary representation of n (and/or e). The original number n or e can be restored by again adding (XOR) x to the received number. In accordance with a further aspect of the present invention the message to be encrypted is modified by XORing with x and/or the generated encrypted message is modified by XORing with x.

The modifications as provided above are already effective, but are subject to fairly simple but hopefully time consuming attacks. The modification does not change the RSA method itself fundamentally. In accordance with an aspect of the present invention, the fundamental operation in the RSA method which is exponentiation, (which in RSA is repeated multiplication) is Lab-transformed in accordance with the method illustrated in FIG. 9. That is: for a multiplication input data are modified with n-state inverter 'invn' and the output (product) of the multiplication, which may be a standard mod-n multiplication, is modified with the reversing inverter 'rinv' of 'invn.' The inversion is closed in the sense that each inversion (in origin 0) generates a number smaller than n. The Lab-transformed switching operation remains a group or ring or finite field as needed. The inversions do not change the defining meta-properties of RSA but change the outputs. Which means that the RSA methods can be applied using the modified multiplication as the operational function.

A much higher level of security is achieved by applying confidential n-state inverters to FLT the operational function of RSA. As a result, one may use smaller numbers for n that are commonly required 1024 or 2048 bits and still achieve a high level of security.

The method as provided above will be illustrated with examples of small numbers. One of ordinary skill can easily check that this works for large and very large numbers. Assume RSA for p=5; q=11 and n=55 with $\phi(55)=(5-1)*(11-1)=4*10=40$. Select e=7, which is coprime with 40 and has multiplicative inverse d=23. The public key is (e,n)=(7, 55). One can easily check that a message $m^7$ mod-55 is decrypted to m from $(m^7)^{23}$ mod-55. Apply a 55-state inverter, for instance, inv55=[12 13 14 15 16 17 18 19 20 21 22 23 24 25 26 27 28 29 30 31 32 33 34 35 36 37 38 39 40 41 42 43 44 45 46 47 48 49 50 51 52 53 54 0 1 2 3 4 5 6 7 8 9 10 11]. This inverter is a shift (or rotation) of all elements of a 55-state identity inverter of 12 positions to the left. Many other different reversible 55-state inverters are possible (in fact 55!-1 reversible 55-state inverters which excludes identity). This inversion changes the elements 0 and 1 to 44 and 45, respectively. The order (0,1) and (43,44) is maintained for simplicity and illustrative purposes but can also be broken up. One is cautioned that these numbers (43 and 44) or states are then not a candidate for being public or private keys.

The reversing inverter of 'inv55' is rinv55=[43 44 45 46 47 48 49 50 51 52 53 54 0 1 2 3 4 5 6 7 8 9 10 11 12 13 14 15 16 17 18 19 20 21 22 23 24 25 26 27 28 29 30 31 32 33 34 35 36 37 38 39 40 41 42]. The inverters inv55 and rinv55 are applied to perform exponentiation by repeated multiplication for encryption and decryption. Reduction such as baby-step/giant step can be applied. The same keys 'e' and 'd' as in the unmodified operation can be used. However, the same modified operation applied in the encryption has to be applied in the decryption. For instance public key e=3 (corresponding to private key d=27) applied to the modified operation on a message m=38 generates encrypted message $e^m$=28 and decrypts correctly with d=27 to m=38. However, trying to decrypt $e^m$=28 with d=27 with the standard, unmodified, mod-55 multiplication leads to decrypted message md=52, which is incorrect of course. Accordingly, modifying the multiplication circuit in accordance with an FLT, makes RSA generate different encrypted messages compared to the currently used modulo-n operation. RSA is often used to encrypt a session key which is used in a symmetric encryption and can be recovered by the receiving computer. The size of these keywords is now often 4096 bits. Using the FLT make the RSA encrypted message (keyword) more secure and in many cases can be kept smaller than 4096 bits.

For illustrative purposes another example is provided for p=7, q=13, n=91 and $\phi(91)=(7-1)*(13-1)=6*12=72$. The inverter inv91 is the 91-state identity inverter of which all elements are rotated 7 positions to the left. The reversing inverted rinv91 is a sequence mod-91 of 91 consecutive elements starting with [84 85 . . . 83] and is the identity 91-state inverter rotated 7 positions to the right. The public key e=11 corresponds to private key d=59 in this example. A message m=82 is encrypted into em=38 and correctly decrypted into dm=82 by using the modified operation both for encryption and decryption. Using the unmodified operation with d=59 will generate the incorrectly decrypted message dm=12.

Diffie-Hellman Modified

Diffie Hellman key exchange is directed to information exchange between at least two parties of data to form a common keyword. Each party, being a computing device connected through a communication channel, uses a common operation over a field, group or ring using a common generator. The operation may be a p-state operator such as a mod-p multiplication and a common generator g is applied. Each device selects (preferably at random) a private key from the set over which the operation is defined, for instance a private key a by the first device which generates public key $g^a$-mod-p and sends it to a second device. The second device selects a private key b from the set and generates public key $g^b$-mod-p and sends it to the first device. The first device generates common key $(g^b)^a$-mod-p and applies it for encryption and/or decryption and the second device generates key $(g^a)^b$-mod-p and applies it for encryption and/or decryption. The keys $(g^b)^a$-mod-p and $(g^a)^b$-mod-p are identical when the same prime p and generator g are used. This is known as Diffie Hellman key exchange.

Security of Diffie-Hellman key exchange can be increased by changing some of the parameters or keeping parameters confidential. In accordance with an aspect of the present invention aspects of the public key are modified in accordance with a reversible modification which is kept confidential. In one embodiment of the present invention at least one of $g^a$-mod-p and $g^b$-mod-p is modified. A receiving device is programmed to change the modified public key back with the known modification. In general p is a prime number. Accordingly, if p is modified it should be modified so that the modified version of p is also a prime number.

In accordance with an aspect of the present invention a reversible p-state inverter is applied to the p-state operation of the Diffie-Hellman method, which is generally a mod-p multiplication, but may also be a mod-p addition or a mod-p subtraction, by applying a Lab-transform with a reversible p-state inverter and its reversing inverter as illustrated in FIG. 9. The p-state inverter is kept confidential and may be distributed in accordance with the unmodified Diffie Hellman method. The determination of the discrete logarithm for large numbers is held to be intractable. Large numbers are generally accepted to be numbers represented by more than 512 bits or 1024 bits or 2048 bits. By modifying the p-state operation in accordance with a Lab-transform the fundamental (or meta) properties are preserved but the results are unpredictable because of the incredibly large numbers of possible p-state inverters. For instance the Lab-transformed mod-n or $GF(n=p^q)$ multiplication still defines a group, closed, associative and with a multiplicative inverse, though the state of the multiplicative inverse is modified by the Lab-transform.

Preferably a "rule based" p-state inverter is used, for instance as provided in illustrative examples herein earlier. Other rules are possible and contemplated and include rotation with modification of 0 and 1 element; interleaving of preset partial inverters, reverse order inverters and other schemes. One benefit of these modifications is that attacks on the generated public keys to determine the private keys or common key will be ineffective within a limited time. By modifying the inverters on a regular basis, for instance after one or more uses, or on a timed basis, makes the modified Diffie Hellman method more secure and enables a reduction in the size of the required public keywords.

In an illustrative example p=29 and g=8. The private keys are a=4 and b=20. The public key $g^a$-mod-p=$8^4$-mod-29=27 and $g^b$-mod-p=$8^{20}$-mod-29=12. The common key is 26. Select a 29-state inverter inv29=[8 9 10 11 12 13 14 15 16 17 18 19 20 21 22 23 24 25 26 27 28 0 1 2 3 4 5 6 7] which is created by a rotation left of 8 positions of the corresponding 29-state identity inverter.

The reversing inverter can easily be determined and is rinv29=[21 22 23 24 25 26 27 28 0 1 2 3 4 5 6 7 8 9 10 11 12 13 14 15 16 17 18 19 20] and is of course a right rotation of the 29-state identity inverter with 7 positions and can be applied rule based for every instance. Using the modified operation with the same private keys will generate $g^a$-mod-p=84-mod-29=15 and $g^b$-mod-p=820-mod-29=22 and common key is 17. Because 0 and 1 are no longer the zero and one element of the operation, common keys 0 and 1 may be generated. In accordance with an aspect of the present invention a provision is included to not use the specific inverters and or private keys that generate undesirable private keys. For instance an undesirable common key may cause a signal to be exchanged that forces the devices to generate other private keys.

Figures 16, 17:
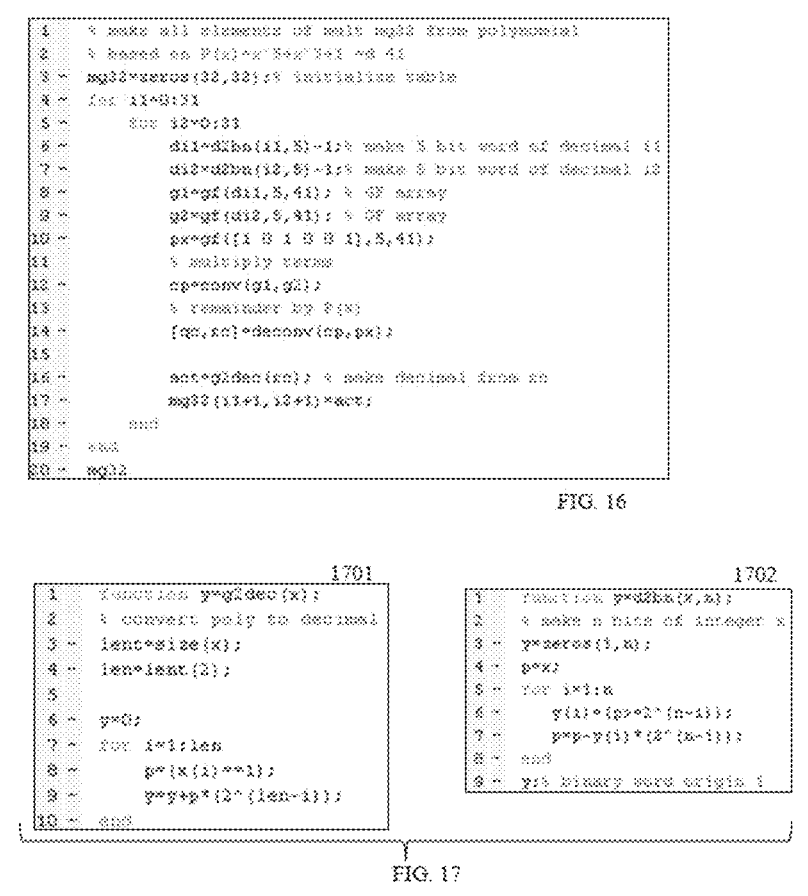

In accordance with an aspect of the present invention the operation is defined over an extension field GF(p=$2^m$). This means that the operation is defined modulo-pol_p wherein pol_p is an irreducible polynomial over GF(2) of degree m. This approach is applied as an illustrative example to generate the multiplicative table of GF(p=$2^5$=32). FIG. 16 is a screenshot of a Matlab program listing that uses polynomial representation to create a decimal table m32. FIG. 17 is a screenshot of Matlab program listings 1701 and 1702 that uses the binary coefficients of the generated polynomial presentation of the elements of a table to generate a decimal presentation and to generate a binary word from an integer, respectively. A combinational binary circuit can perform the actual polynomial multiplication and a conversion to decimal representation is not needed.

Figures 18, 19, 20:
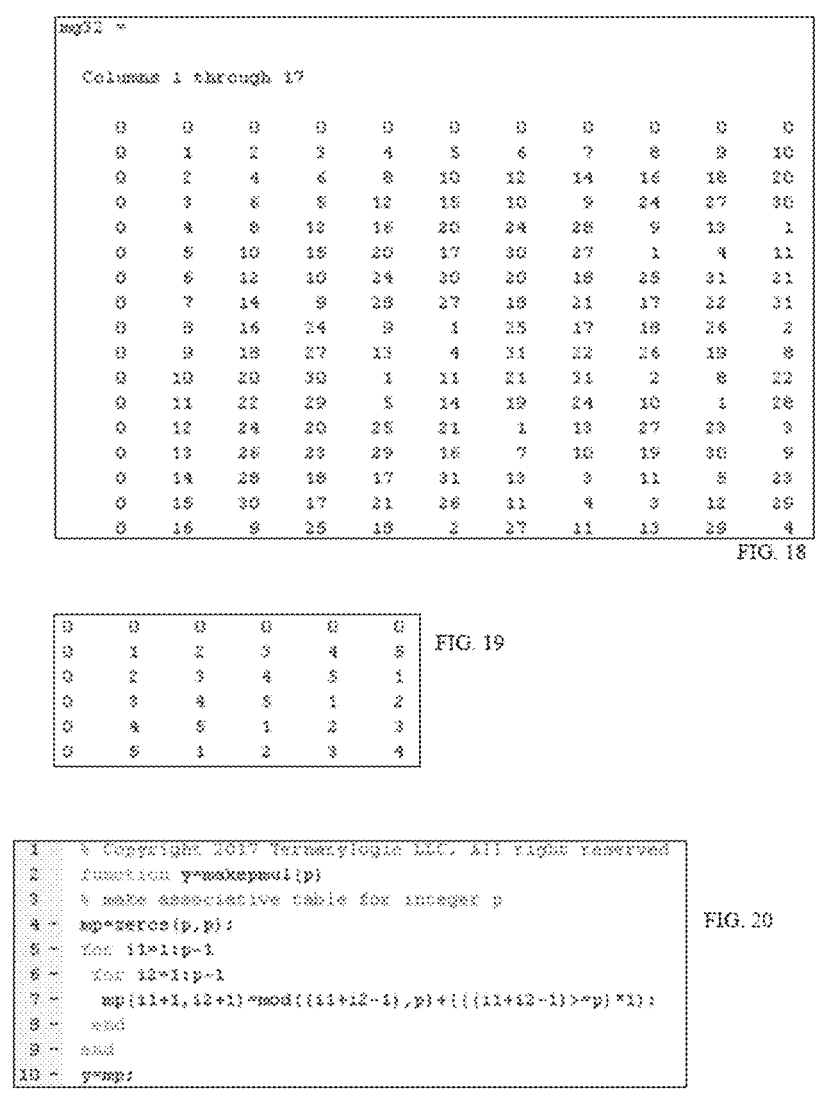

FIG. 18 is a partial screen capture of the decimal representation of the polynomial multiplication over GF(32). Only part of the table is shown for illustrative purposes. The table (32 rows by 32 columns) is too large for adequate print out on a single page.

The multiplication over GF(32) is modified in accordance with the method illustrated by FIG. 9 with the inverter inv32 which in an illustrative example is the 32-state identity inverter left rotated by 8 elements. The reversing inverter rinv32 in the illustrative example is the 32-state identity inverter right rotated by 8 elements.

Thus p=32 and take g=8 as in the previous example for a DH private/public key generation. The private keys are a=4 and b=20. The public key $g^a$-mod-p=$8^4$-mod-32pol=6 and $g^b$-mod-p=$8^{20}$-mod-32pol=2. The common key is 21. The numbers for the inverter modified operation (multiplication) become: The private keys still are a=4 and b=20. The public key $g^a$-mod-p=$8^4$-mod-32 mod=23 and $g^b$-mod-p=$8^{20}$-mod-32 mod=31. The common key is 5. Accordingly, application of FLTed switching functions modifies the generated public key as well as application of the private key.

This approach can be extended to very large numbers of p=$q^m$ with q being prime and m being an integer and many different inverters, which preferably are rule based, but also may be stored in their entirety when appropriate.

In accordance with an aspect of the present invention the Diffie Hellman key exchange method is used for any value of p for which a standard operation is defined that is modified with an inverter per the FLT method and device as illustrated in FIG. 9. The operation is defined by a regular shift in columns of a table as illustrated in FIG. 19 for p=6 in mod-6. The rule for generating elements of this table is illustrated in FIG. 20 as a screen shot of a program that generates table n-state switching table mp which has the properties of a multiplication. This operation can be used as an operation defining a multiplicative group for any integer number (not only prime or extension fields) by using the general expression as represented in Matlab script: mp(i1+1,i2+1)=mod((i1+i2−1),p)+(((i1+i2−1)>=p)*1); with i1 and i2 ranging from 1 to (p−1).

A disadvantage of this type of operation or multiplication is that it is of course very predictable, especially when generator g and number p are provided. In accordance with an aspect of the present invention the operation of generating elements of mp is modified with an inverter in accordance with the FLT method and device illustrated by FIG. 9. Preferably a rule based inverter is used so that individual elements of the inverter can be determined. For illustrative purpose, an operation m30 (p=30) generated in accordance with the above rule is used to create a common keyword. The operation is modified in accordance with inv30=[21 6 20 5 19 4 18 3 17 2 16 1 15 0 14 29 13 28 12 27 11 26 10 25 9 24 8 23 7 22]. This inverter is created by a) a left rotation of 8 elements of a reversed 30-state identity inverter, followed by a splitting of the inverter in two equal parts and interleaving the two parts. This inverter can be applied rule based on each individual state. The reversing inverter is rinv30=[13 11 9 7 5 3 1 28 26 24 22 20 18 16 14 12 10 8 6 4 2 0 29 27 25 23 21 19 17 15]. For large numbers the reversing inverter rinv30 is also applied based on a rule on each state to which the reversing inverter has to be applied. The rules for inversion and reversal of inversion can be programmed in a processor or realized in a combinational circuit.

The rule for inversion reversal in the above example is determined from the inversion rule applied to the rule that: If "inv(i)=y" then "rinv(y)=i." The inversion rule is that for even indices i (using origin 0 and mod-30) including 0, inv30(i)=(21−(i)/2)mod-30, wherein (21−(i/2)) is in the range [21 20 . . . 8 7] and for i is odd starting from 1 origin inv30(i)=6−(i−1)/2)mod-30 with the inverter value is in the range: [6 5 4 3 2 1 0 29 . . . 23 22]. Manual calculation easily confirms that inv30(0)=21, inv30(28)=(21−14)mod-30=7 and inv30(1)=6 and inv30(29)=(6−14)mod-30=−8 mod-30=22. The rule for rinv30(k) is then: rinv30(k)=(42−2k)mod-30 for k in [21 20 . . . 8 7] and rinv(k)=(13−2k)mod-30 for k in [6 5 4 3 2 1 0 29 . . . 23 22]. These rules are easy to program.

The results for the inverter modified operation (multiplication) become: The private keys still are a=4 and b=20 and g=8. The public key $g^a$-mod-p=$8^4$-mod-30 mod=27 and $g^b$-mod-p=$8^{20}$-mod-30 mod=6. The common key is 25.

One is reminded that there are two parallel sets of finite fields GF(n=$q^k$) that can be developed from irreducible polynomials and that can be applied in cryptography and other finite field characterized applications. The first one, and that appears to dominate cryptography, especially in binary fields GF($2^k$) is where the addition is formed from bitwise XORing of words of k bits. The multiplication is then determined modulo-(irreducible polynomial). This is explained in: Reed-Solomon error correction, C. K. P. Clarke, BBC R&D White Paper WHP 031, July 2002, available on-line, which is incorporated herein by reference. Sections 2 and 3 explain the process and the related hardware. Another approach is wherein elements of a finite field such as GF($2^k$) are generated in order by the irreducible polynomial. In the binary case, one may use an LFSR characterized by the irreducible polynomial to generate the field elements. The ordering of elements is determined by the consecutive states of the shift register. This is explained in for instance in Reed-Solomon Codes, Bernard Sklar, 2002, Pearson, ("Sklar") available on-line, and which is incorporated by reference. Sklar explains the forming of the finite field in the section 'Finite Fields' and 'Addition in the Extension Field GF($2^m$)'. Sklar is limited to primitive polynomials.

The inverter based modifications with inverters that are kept confidential allow for high security generation of secret keywords both in RSA and Diffie Hellman based encryption. The inverter based approach requires that both the first and second device have access to the specific inverter, which should preferably be kept secret.

In accordance with an aspect of the present invention n-state inverters and/or the rules to generate inverters and their reversing inverters are stored in a memory. The memory may be in the first and second device or may be on a remote server. Each rule or inverter is provided with a unique ID number that identifies the rule, but does not teach anything about the rule. For instance a rule may have ID 12436. The ID on the memory refers to a specific rule: for instance inverter rule 12436=[30 | Reverse | Left7 | Split 15/15 and Interleave high/low]. This rule says apply an identity inverter of 30 elements | in reverse order | left rotate by 7 elements | split in 2 halves and interleave the halves with a high number followed by a low number. Each element of the inverter 12436 can be calculated individually and by reversing the rule also the elements of the reversing inverter can be determined. The reversing rule, as illustrated earlier, is determined and programmed or embedded in the memory for use by the processor.

A public key thus can include ($g^a$, ID) from one device and ($g^b$) from the other device wherein ID is an ID of and inverter rule which also refers to a corresponding reversing rule. The use of a specific IDed inverter may be determined by pre-programmed conditions that both devices are provided with, such as a date or time of day. In accordance with an aspect of the present invention, both the first and second device contain one or more IDed n-state inverter rules. The private keys a and b of the two devices may be pre-set or may be generated at random. However a check may be performed to make sure that not a non-desirable key will be formed. In many cases two devices need to apply a keyword wherein the two devices are both intended to uniquely communicate with each other. In that sense the two devices are not unknown to each other and they do not need to comply with general public/private key exchange but may assume to share pre-programmed confidential information about message exchange (such as from which n and g and inverter ID to select). In accordance with an aspect of the present invention at least one, preferably at least 2, more preferably at least 5, and more preferably at least 1000 and most preferably at least 1 million different configurations that include at least an inverter rule and may include a value for g and/or a value for n, are provided with a unique ID and stored on a memory. The use of a specific configuration may depend on a condition. A configuration may also be a limited time use configuration, which may be one time or multiple times after which a used configuration is removed or disabled in the list of configurations on a device. A specific configuration ID refers to the same configuration on the first and the second device.

Other exponentiation cryptographic methods and apparatus are known, such as the ElGamal, the Rabin and the Naccache-Stern system. In fact, cryptography devices, systems and methods that rely on exponentiation as repeated multiplication and/or addition either over a finite field or modulo-n, and/or single operations of an addition or multiplication may successfully apply the FLT as provided herein to improve security and increase unpredictability of generated signals. The methods and apparatus provided in accordance with one or more aspects of the present invention are applied to cryptographic exponentiation that is modified with an n-state inverter in accordance with a method as illustrated in FIG. 9.

Exponentiation as a repeated application of an operation is also used in machines for generating and checking digital signatures and for Message Authentication Codes (MACs). In accordance with an aspect of the present invention one or more methods provided herein are applied in digital signatures and MACs generation and checking, such as described in the above recited FIPS 186-4 (DSS) standard, which teaches private key/public key generation.

Elliptic Curve Cryptography

In the following sections it will be shown how Lab-transformed n-state switching operations and/or switching tables can be used in cryptographic devices such as for Elliptic Curve Cryptography and public key cryptography.

Elliptic Curve Cryptography (ECC) is known and is used in different configurations, for instance in public key cryptography and includes but is not limited to elliptic curve Diffie-Hellman (ECDH), Elliptic Curve Integrated Encryption Scheme (ECIES), The Elliptic Curve Digital Signature Algorithm (ECDSA), The Edwards-curve Digital Signature Algorithm (EdDSA), The ECMQV key agreement scheme and others. Different types of fields are used to calculate points on a curve and different types of curves have been and are defined over finite fields. The usefulness of ECC is derived from the Elliptic Curve Discrete Logarithm Problem (ECDLP) and the intractability to solve the ECDLP problem over a finite field Fp faster than $O(\sqrt{p})$.

In U.S. patent application Ser. No. 17/240,635 filed on Apr. 26, 2021 which is incorporated herein by reference, it is disclosed how one may use Elliptic Curve Cryptography (ECC) in general, and isogeny based ECC in particular, if desired modified with an FLT, to activate a remote device.

The known literature on elliptic curves provides the formulas for point addition and point doubling on an elliptic curve. The following formulas provides point addition and point doubling for elliptic curves over GF($2^m$) which may be defined by an irreducible or primitive polynomial of degree m.

Curve: $y^2+y\cdot x=x^3+ax^2+b$ for finite field GF($2^m$) with points P(x1,y1) and Q(x2,y2) on the curve for R=P+Q wherein R has coordinates (x3,y3). The following expressions provide points addition and point doubling (R=2P with P=Q).

The following equations describe the representation of operations of addition of elliptic curve points.

$$x_3 = \begin{cases} \left(\dfrac{y_1 + y_2}{x_1 + x_2}\right)^2 + \dfrac{y_1 + y_2}{x_1 + x_2} + x_1 + x_2 + a; P \neq Q \\ x_1^2 + \dfrac{b}{x_1^2}; P = Q \end{cases}$$

$$y_3 = \begin{cases} \left(\dfrac{y_1 + y_2}{x_1 + x_2}\right)(x_1 + x_3) + x_3 + y_1; P \neq Q \\ x_1^2 + \left(x_1 + \dfrac{y_1}{x_1}\right)x_3 + x_3; P = Q \end{cases}$$

The operations '+' and '.' are performed in accordance with the addition and multiplication over finite field $GF(2^4)$. An m-bit word may be represented by a symbol as explained earlier above and the '+' and '*' operation have then to be performed in accordance with the corresponding switching tables and/or operations. One may also perform the operations on m-bit words wherein each word is considered to represent a polynomial and all operations have to be performed in accordance with modulo-'the generating polynomial.' A generalized equation for an elliptic curve is $y^2+a1xy+a3y=x^3+a2x^2+a4x+a6$. The determining field has a characteristic 2, hence the curve $y^2+y\cdot x=x^3+ax^2+b$. The determination of (x3,y3) requires addition, multiplication and squaring and division or inversion. A division by an element is the same as multiplication with its inverse. The mentioned 16-state operations switching tables 2300 and 2400 are provided in FIGS. 23 and 24, respectively.

FIG. 25 table 2500 shows a screenshot of a list of points on the curve $y^2+yx=x^3+6x^2+1$ over the field GF(16) generated by generating polynomial $x^4+x+1$ starting with initial content [0 0 0 1]. The first 2 columns show the elements in GF(16) that comply with the curve. The fourth column shows (x1+y1) of (5,2) which is 6 and so (5,6) is the inverse of (5,2). All points are represented in Matlab origin 1, and thus a 1 should be subtracted for an origin 0 representation. The use of switching tables has considerable advantages. A processor does not have to perform polynomial multiplications which are time consuming. Furthermore, the multiplicative inverse of the multiplication which is needed for the point addition and doubling does not need to be calculated but is stored in a table. Commonly, the extended Euclidean algorithm is applied to determine an individual multiplicative inverse.

Figures 21, 22, 23:
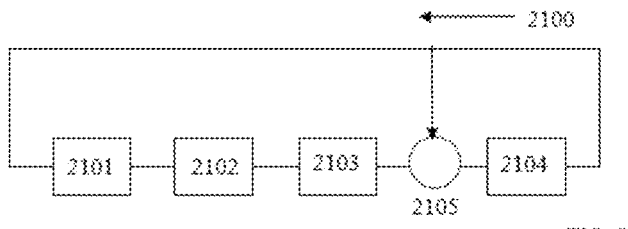

As an example a device characterized by a finite field GF(16) will be used. For instance in a 16-state case, each element is generated by a feedback shift register defined by a primitive polynomial which is irreducible of degree 4. One such polynomial is: $m(x)=x^4+x+1$ over GF(2). A corresponding binary feedback shift register is shown in FIG. 21. Starting from an initial shift register state (for instance [0 0 0 1]) feedback shift register 2100 with register elements 2101, 2102, 2103 and 2104 and XOR device 2105 generates 15 different contents of the shift register after which it repeats. The state [0 0 0 0] in this case is the forbidden state and can be designated as the 0 element of the generated field. The corresponding states are shown in FIG. 22. The states are numbered in consecutive order as they appear in the shift register. This causes the assigned state to be different from the decimal representation of the shift register states. The multiplication table over GF(16) is shown in FIG. 24. In accordance with an aspect of the present invention the multiplicative inverses of the 'logarithmic' presentation of the multiplication over $GF(2^m)$ illustrated for GF(16) in FIG. 24, the multiplicative inverse is easily determined in accordance with an aspect of the present invention. The multiplicative inverse pair of the multiplication $(x*x^{-1})=1$ enables in accordance with an aspect of the present invention to determine an multiplicative inverse. The row and column index (x,y) of the table of FIG. 24 for which the output is 1 in origin 0 forms a multiplicative inverse pair. Per definition the inverse of 0 is 0. The inverse of 1 is 1. From the table one can read that the inverse of 5 is 12 in GF(16).

The inverse has a regular form that is calculated in a program, for instance in Matlab. The script of such a program is shown in a screenshot 2600 in FIG. 26 for origin 1. The formula that is applied is minv16(i)=16−i+3. This approach can be applied for multiplicative inverses of all $GF(n=2^m)$ using the 'logarithmic' representation through: 'minvn(i)=n−i+3' wherein i is the column (or row) index and minv is the corresponding row (or column) index so that i*minvn(i)=2 in origin 1. The first 2 inverses (for 1 and 2 in origin 1) are always 1 and 2. When GF(n) is not too large, for instance m=20, the inverses can be stored in a memory. For the 16-state case: minv16=[1 2 16 15 14 13 12 11 10 9 8 7 6 5 4 3].

In order to perform the above n-state multiplication inversion rule with tables, it is required to apply the element 'value' substitution as affected by a generating polynomial. As an illustrative example, a modification vector for this field is el16d=[0 1 9 13 15 14 7 10 5 11 12 6 3 8 4 2]. This vector is determined by positions of elements (0 . . . 15 in origin 0 and 1 . . . 16 in origin 1) and the decimal 'value' or label in that position. For convenience real decimal values are used as these are easier manipulated by a programming language such as Matlab. The vector el16d thus provides a value 2 (position origin 0 in the vector) for the binary word of which the equivalent decimal value is 9. If desired, the bit words are XORed and transformed back to the 'value' presentation by the inverse vector that uses now the value as index and the position as content. This is illustrated in the 16-state case by a decimal inverse vector i16i=[0 1 15 12 14 8 11 6 13 2 7 9 10 3 5 4].

In accordance with an aspect of the present invention, finite field operations over a finite field $GF(q^m)$ including $GF(2^m)$ are performed by using transformation vectors and operational rules, without generating the complete modified addition and multiplication tables. For the n-state case the n-state switching tables are of size n by n, wherein, in for instance the binary case, each element in the table requires up to m bits. This may overwhelm the storage capacity of a computer. The vectors each are only 1 by n elements of for instance m bits. The savings in storage space are countered by a not prohibitive increase in processing time. For instance assume a field over $GF(2^{20})$ which has over 1 million elements. Each operational table (addition and multiplication) may require $20*2^{20}*2^{20}$ bits or about $2^{45}$ bits or about 3,000 Gigabyte memory. A vector for that field requires $20*2^{20}=20$ million bits or about 3 Mbyte, which is very manageable.

How to FLT modify elliptic curve cryptographic methods has been disclosed by the inventor in U.S. patent application Ser. No. 16/532,489 filed on Aug. 6 2019 which is incorporated herein by reference.

Message Digest Methods and Devices

Another important cryptographic method or device relates to the generation of a hash value or message digest. Message digest/hash-functions are used to authenticate a message or check if the message was changed and applications like a digital signature.

A message digest or hash operation or hash function "compacts" a sequence of signals to an output called a message digest. This was shown in the earliest version of the FIPS Secure Hash Standard, published or issued as FIPS 180 on 1993 May 11 which is incorporated herein by reference. This version of the Standard is often called SHA-0 and is no longer considered secure. It was superseded in 1995 by FIPS PUB 180-1, and by FIPS PUBS 180-2, issued on 2002 Aug. 1; and FIPS PUB 180-3 on October 2008, which are all incorporated herein by reference. These standards provide a whole range of secure hashing algorithms, SHA-0; SHA-1; SHA-2 with SHA-224, SHA-224, SHA-256, etc. which are all captured under the name Secure Hashing Algorithms. They all use bitwise XOR functions and composite binary functions that operate bitwise on words of k bits, and thus may all be characterized as an n-state switching function with $n=2^k$. For instance the hash operation as described in FIPS PUB 180-4 entitled Secure Hash Standard and downloadable from http://dx.doi.org/10.6028/NIST.FIPS.180-4 and which is incorporated herein by reference, generates from an electronic message or file a message digest that varies in size between 160 bits (SHA-1) and 512 bits (SHA-512). For illustrative purposes the FIPS SHA standards (including SHA-3) are applied herein. There are many different hash functions or message digest operations of which some are listed on websites https://en.wikipedia.org/wiki/Comparison_of_cryptographic_hash_functions and https://en.wikipedia.org/wiki/List_of_hash_functions which are both incorporated herein by reference. One way to generate a message digest is to use a shift register with feedback that operates like a scrambler with an initial shift register content and when provided with a message ends up with a new content, which is the message digest. These scramblers are known as CRC or Cyclic Redundancy Checks of which a list is provided at https://en.wikipedia.org/wiki/Cyclic_redundancy_check and which is incorporated herein by reference. Variations on message digests are for instance HMACs also called hash-based message authentication code. HMAC: Keyed-Hashing for Message Authentication is described as RFC2014 and is available at https://www.rfc-editor.org/rfc/pdfrfc/rfc2104.txt.pdf which is incorporated herein by reference.

All these hash operations have in common that they need to "engage" with or "enter" the message into a hash operation or hash device. By far the most common way is to combine the message (usually in binary form) with another binary signal (a key or a padding message or a constant) through a bitwise XORing operation. It may be possible to do bitwise EQUALing of signals. One may even apply other bitwise operations like the AND, NAND, OR etc. operations. For instance SHA-224 and SHA-256 (all members of Secure Hash Algorithm 2) operate bitwise on 32-bit words and SHA-512 on 64-bits words. SHA-1, SHA-2 and SHA-3 are all members of the FIPS published Secure Hash Algorithm (SHA) family of standards.

In accordance with an aspect of the present invention a bitwise binary switching function operation of sets of k or more bits is replaced by a Finite Lab-transformed $n=2^k$ state switching function. For instance, SHA message digests use the bitwise operation $Ch(x,y,z)=(x\hat{}y)\oplus(\neg x\hat{}z)$ in expressions (4.1) and (4.2) and (4.8) of FIPS 180-4. Furthermore, the expression $Maj(x,y,z)=(x\hat{}y)\oplus(x\hat{}z)\oplus(y\hat{}z)$ is applied in expressions (4.1), (4.3) and (4.9). Furthermore expressions (4.4)-(4.7) and (4.10)-(4.13) in FIPS 180-4 apply bitwise XOR ($\oplus$) on words of bits. The bitwise AND is represented by $\hat{}$ and the binary inversion NOT is represented by $\neg$. One advantage of the above operations is that it does not modify the overall distribution of symbols. That is, assuming that there is an equal distribution of 0s and 1s in the message, then the output of the function also has an equal distribution of 0s and 1s.

The bitwise operations are performed on words of 32 or 64 bits. In accordance with an aspect of the present invention, the bitwise operation on 32 bits or 64 bits may be replaced by an $2^{32}$ or $2^{64}$ state switching function. However, one may also take parts of binary words, like words of k1, k2, k3, etc. ki bits wherein k1+k2+k3+ . . . ki=n with n=32 or 64. For illustrative purposes a word of n bits is composed of k*4 bits. That is a 32 bit word is divided into 8 words of 4 bits and a word of 64 bits is divided into 16 words of 4 bits. However, other compositions are possible and are fully contemplated.

How to FLT modify hashing methods has been disclosed by the inventor in U.S. patent application Ser. No. 16/532, 489 filed on Aug. 6 2019 which is incorporated herein by reference.

One is reminded that all above and other cryptographic methods run on devices such as custom discrete components, ASICs, FPGAs or programmed processors. Operations like modulo-n multiplications are in effect switching circuits that are formed from instruction sets that are based on physical switches. Accordingly all devices herein that perform cryptographic operations like an encryption, decryption, message digest, hash, CRC, public key/private key, sequence generator, sequence detector, shift register based scramblers and descramblers and sequence detectors and the like are in effect processing circuits and will be named as such. They may be configured in accordance with published rules (such as AES, SHA, RSA, ECC, FIPS rules, ANSI rules, etc.) or with private rules such as customized sequence generators. FIG. 9 further indicates that cryptographic devices may have different configurations by using different n-state inverters. A processing circuit that performs in accordance with a FIPS published standard, such as AES, DES, DSS, a SHA version, or a message digest version, also called a hash function, MAC, HMAC or performs in accordance with a Diffie-Hellman, RSA, Merkle-Hellman or performs any other defined cryptographic operation in written form and/or a modified version as described herein is called a cryptographic circuit.

Security between two computing devices communicating over a not secure communication channel is realized by different cryptographic applications. The HTTPS protocol, based on an Transport Layer Security (TLS). A list of different applications and cryptographic implementations that may be part of TLS is provided in Wikipedia's Transport Layer Security at https://en.wikipedia.org/wiki/Transport_Layer_Security#Key_exchange_or_key_agreement which is incorporated herein by reference. Cryptographic methods mentioned in this article apply a device characterized by an n-state function. Some of these cryptographic methods are labeled as being insecure. In accordance with an aspect of the present invention, the n-state functions are modified by an FLT as explained herein, thus improving a level of security of SSL and TLS and sometimes moving a level of security from insecure to secure.

Figure 27:
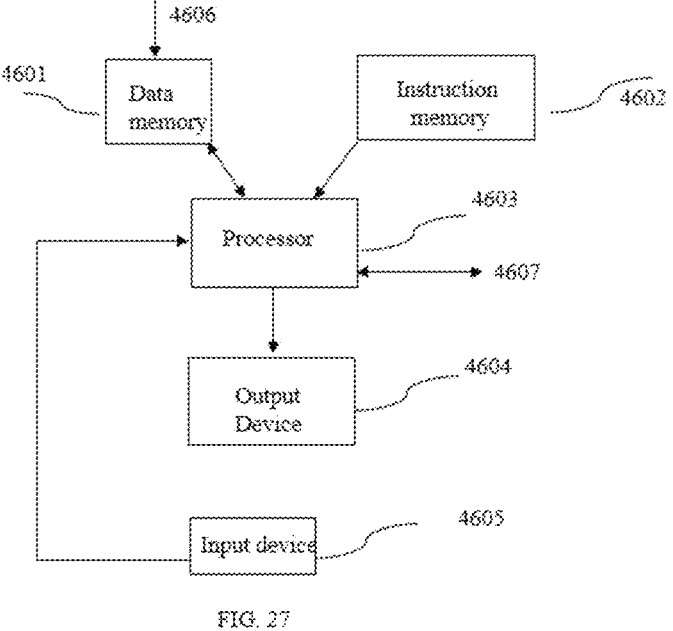
FIG. 27 illustrates a system in accordance with aspects of the present invention.

In a further embodiment of the present invention, steps of the methods as provided herein are programmed and executed on a processor, which is part of a computing device. The methods as provided herein are in one embodiment of the present invention implemented on a system or a computer device. A system illustrated in FIG. 27 and as described herein is enabled for receiving, processing and generating data. The system is provided with data that can be stored on a memory 4601. Data may be obtained from a sensor or may be provided from a data source. Data may be provided on an input 4606. The processor is also provided or programmed with an instruction set or program executing the methods of the present invention is stored on a memory 4602 and is provided to the processor 4603, which executes the instructions of 4602 to process the data from 4601. Data, such as an image or any other signal resulting from the processor can be outputted on an output device 4604, which may be a display to display data or a loudspeaker to provide an acoustic signal. The processor also has a communication channel 4607 to receive external data from a communication device and to transmit data, for instance to an external device. The system in one embodiment of the present invention has an input device 4605, which may be a keyboard, a mouse, a touch pad or any other device that can generated data to be provided to processor 4603. The processor can be dedicated hardware. However, the processor can also be a CPU or any other computing device that can execute the instructions of 4602. Accordingly, the system as illustrated in FIG. 27 provides a system for data processing resulting from a sensor or any other data source and is enabled to execute the steps of the methods as provided herein as an aspect of the present invention.

Figure 28:
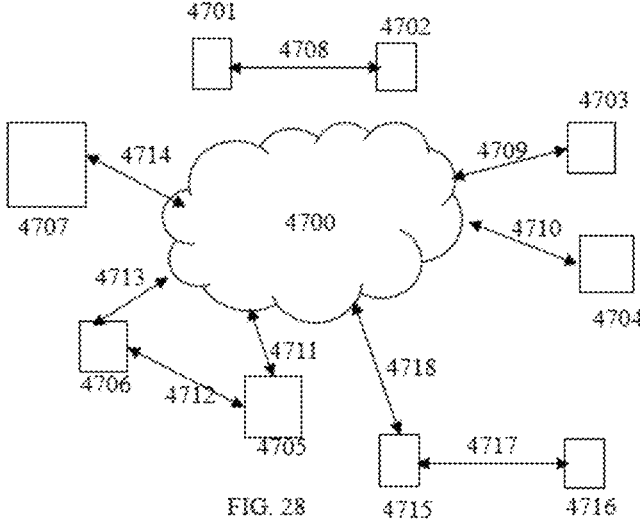
FIG. 28 illustrates networked computers.

Several computing device community configurations are illustrated in FIG. 28. FIG. 28 has a communication network 4700. Network 4700 may be a single network such as a wireless or wired network or a combination of networks such as the Internet. The network may be a switched network or a packet based network, a private network or a public network or a virtual private network or any other communication network that enables connection of 2 computing devices and of 3 or more computing devices. In one configuration two computing devices 4701 and 4702 with communication circuitry to transmit, receive or transmit/ receive signals are provided. The communication circuitry of 4701 and 4702 can transmit signals over a channel 4708. The channel 4708 is identified as a double arrow. This indicates that the channel is bi-directional, but it does not necessarily mean that 4701 and 4702 do both have to transmit and receive, though they may. For instance 4701 is an opening device or a smartcard or any other transmitting device and 4702 is a computing device that is part of an access mechanism that is being activated by one or more signals from 4701. Device 4701 for instance has cryptographic circuitry that generates opening signals that have to be detected and decrypted by 4702. For that application wherein each device has the appropriate instructions and data stored to complete an authenticated transaction, like opening. In one embodiment of the present invention there is thus only one way transmission by 4701 and receiving of data by 4702. The channel is a direct channel, like a wireless or wired or Near Field Communication (NFC) channel, a USB connection, a Bluetooth connection or any other direct connection. For the transaction itself no other channel is required. The devices 4701 and 4702 may have other communication capabilities, such as equipment to connect to network 4700, but are not shown. Devices 4701 and 4702 have different modified n-state switching functions stored on local memory. These may be updated from time to time.

Devices 4701 and 4702 may also perform some mutual authentication or for instance key exchange. In that case 4708 is a dual use (send and receive) channel and the devices 4701 and 4702 both have send a receive equipment. The same applies to devices 4703, 4704, 4705, 4706, 4707 and 4715 and 4716 and communication channels 4709, 4710, 4717, 4718, 4711, 4712, 4713 and 4714.

Computing devices 4703 and 4704 communicate with each other via channels 4708 and 4710 via network 4700. Cryptographic n-state switching functions may be stored locally and may be provided by secure server 4707 which is connected to network 4700 via channel 4714.

Device 4715 and 4716 communicate directly via a channel 4717. Device 4715 is also able to communicate with secure server 4707 via channel 4714. Devices 4705 and 4706 can directly communicate with each other over channel 4712 and with server 4707 via 4700 over channels 4711 and 4713, respectively. As needed 4705 and 4706 can also communicate via 4711 and 4713 via network 4700. Any of the communication channels, even though illustrated by double sided arrows may be single direction as dictated by practical circumstances.

For instance devices 4715 and 4716 communicate directly via 4712 to complete a transaction, such as withdrawing money from an ATM 4715 machine with a smartcard 4716 and 4715 uses 4718 for verification from 4707 via network 4700. Assume 4716 to be a chipcard or smartcard which is connected to 4715. During an established connection 4716 can be updated with additional or replacement modified n-state switching functions.

Computing devices can be mobile or fixed. For instance 4703 and 4704 are two computing devices that are connected to the Internet, for instance 4703 is a computer, such as a PC, a smartphone, a tablet and 4704 for placing an order and 4704 is a server for processing the order. For instance 4703 is a computing device which may be a server, a PC, a smartphone, a tablet and the like to monitor and/or control an IoT (Internet of Things) device 4704 with a processor such as a camera, a medical device, a security device such as a lock or fire monitor, a thermostat, an appliance, a vehicle or any other IoT device.

For n>200, preferably more than 1,000,000 different n-state inverters are identified that enable an FLT of an operation over GF(n) with zero-element 0 and a one-element 1 to generate FLT-ed operations that differ substantially from the original operations. Substantial herein means that fewer than 5 percent of the output states of the resulting operations are the same as the corresponding output states of the original states. More preferably, more than 1,000,000,000 different n-state inverters are identified that enable an FLT of an operation over GF(n) with zero-element 0 and a one-element 1 to generate FLT-ed operations that differ substantially from the original operations. Even more preferably, more than 1,000,000,000,000 different n-state inverters are identified that enable an FLT of an operation over GF(n) with zero-element 0 and a one-element 1 to generate FLT-ed operations that differ substantially from the original operations. Even more preferably, more than 1,000,000,000,000 different n-state inverters are identified or identifiable that enable an FLT of an operation over GF(n) with zero-element 0 and a one-element 1 to generate FLT-ed operations that differ substantially from the original operations. Most preferably, more than $10^{20}$ different n-state inverters are identifiable that enable an FLT of an operation over GF(n) with zero-element 0 and a one-element 1 to generate FLT-ed operations that differ substantially from the original operations. Translating improved security of the FLT to strictly more time required to successfully attack, the improvement puts success outside the lifetime of a single computer or even a cluster of computers. Even, when moving to quantum computers, which is at this time still speculative, breaking FLT modified cryptography strictly by brute force is extremely unlikely.

N-state inverters and especially reversible n-state inverters are an aspect of the FLT as explained herein and as illustrated in FIG. 9. The modification of an n-state switching function makes successful attacks harder without fundamentally changing a structure of a known cryptographic method. In accordance with an aspect of the present invention a cryptographic method is structurally modified by inserting an n-state inverter. In a symmetric operation, like an encryption/decryption the n-state inverter is preferably a self-reversing n-state inverter. As a reminder, a self-reversing inverter is one that inverts itself or, applying a self-reversing inverter twice generates the original input. Or, the equivalence of a combination of two identical n-state self-reversing inverters is identity. For instance the 4-state inverter [0 1 2 3]→[2 3 01] is self-reversing. A rule for generating a self-reversing n-state inverter is: a) select n/2 (if n=even) or n/2−1 (when n=odd) of n states preferably at random, wherein each selected state does preferably not coincide with its position of order, no state may appear twice in a rule. For instance in an 8-state case generate identity is [0 1 2 3 4 5 6 7]. Select 4 states: for instance [4 6 7 5]. Then: $s0 \rightarrow s4$ and $s4 \rightarrow s0$; $s1 \rightarrow s6$ and $s6 \rightarrow s1$; $s2 \rightarrow s7$ and $s7 \rightarrow s2$; and $s3 \rightarrow s5$ and $s5 \rightarrow s3$. This provides the self-reversing 8-state inverter [4 6 7 5 0 3 1 2]. When n is odd, at least one state reverses to itself in a self-reversing n-state inverter.

FIG. 29 illustrates in diagram a cryptographic device 4800. The device has an input that receives data, such as a message or image data or sound data or any relevant data. The device 4800 provides on an output cryptographic data, which may be a message digest, a signature, an encrypted or decrypted signal, or a keyword, or a private or public key. The input data may be pre-processed, like being truncated or scrambled or otherwise processed in a pre-processing unit 4801. In a next device 4802 the data is mixed or XORed or otherwise processed against a keyword provided on 4803. Data may also be processed with padding data or a nonce. This data may be internally generated or may be provided externally. Followed may be additional steps like 4804 and 4805 which may be round steps as defined for instance in SHA or AES protocols. There may be more or fewer steps than indicated by 4804 and 4805. The steps 4804 and 4805 are autonomous in the sense that a 4804 generates a signal/result that is modified by 4805 and preferably not the other way round. So, processes or devices indicated by a block work preferably semi-independent from other blocks as defined in protocols and specifications.

One may change the functionality of the blocks by modifying n-state switching functions in accordance with the FLT as described above. Another change is to insert n-state inverters, preferably before or after a block, as illustrated in FIG. 30 which shows 4900 as a modification of 4800. For instance an input may be inverted with an n-state inverter 4901 before the signal is processed. It may also be inverted with inverter 4902 after pre-processing. Furthermore, an inverter 4903 may be used to invert a keyword/padding or nonce. An inverter 4904 and/or 4905 may be used to invert intermediate results and inverter 4906 may be used to invert an output signal. Insertion of these inverters may not affect one-way processing (as in signature and hash value generation). However, more care has to be taken when the device 4900 is designed to be reversible. In that case a test that operates all units or modules 4805, 4804 4802 and 4801 in reverse, provides proof that the operation is reversible.

As an illustrative example 4802 may provide an n-state operation based on k bitwise XORing between an input signal and a key, which is a simple modification. By inserting 4903 even if an FLT is not imposed on the bitwise XORing, some extra level of security is achieved. In accordance with an aspect of the present invention, higher security of data exchange is achieved by one or two modifications: 1) a modification of an n-state switching function with the FLT by applying n-state inverters that are kept confidential; and/or 2) an insertion of an n-state inverter before or after a semi-independent process or device or input or output thereof. Semi-independent processes or devices have their functionality defined as a separate complete step in its specification. For instance SubBytes, ShiftRows, MixColumns and AddRoundKey transformations are such semi-independent steps in AES.

One may say that with these modifications that are kept secret, security for a considerable part comes from confidentiality of n-state inverters, applied in FLT and/or inde-pendently, even if clear text signals are known. The application of cryptography in certain cases serves a short term or a one-time purpose, wherein it is not important that a successful attack is performed on the cryptographic method. One example of such cryptographic method is one that is immediately discarded or made ineffectual after usage. For instance in U.S. Ser. No. 15/499,849 filed Apr. 27, 2017 to Lablans from which the instant disclosure depends, and which is incorporated by reference herein, teaches opening or activating a mechanism by a sequence generated by a sequence generator and detected by a sequence detector. Because of the use of many, many different configurations of a device that generates and the corresponding device that detects the sequence, a unique configuration for these devices is installed every time an activation takes place. Configurations, which may be determined by n-state inverters for instance in shift register based sequence generators, may be placed in a specific order in a storage or memory in computer devices. A configuration may be identified by a code of which an appearance is meaningless in the sense that it does not reveal a position in an order and it does not reveal the configuration. When activated or "called" either in a transmitting device such as a fob, an opener like a garage door opener, or a chipcard or a smartphone, an access card, an identity card, a bank card, a credit card or any other computing device with processing capability and memory, or in a receiving device such as a computing device in a car to open a door or to start an engine, or a controller for opening a garage door, or for opening any access structure or door, or for allowing access to machines, like an Automatic Teller Machine or any other device that needs a code to be activated or any computer that needs to be activated to get behind a virtual wall like a firewall or a paywall or a protection to access information or place an order, the device de-activates all codes preceding the received code or activated code. De-activating in that sense means making the configuration inaccessible for use for at least a defined period, or removing the code from being used permanently, for instance by overwriting all data related to a configuration with a sequence of symbols that have no meaning as a configuration. Such data will be ignored by a processor searching for a valid configuration. This means that if a code or configuration is activated in the transmitting device and for some reason the receiving side does not respond correctly, that code or configuration is removed from the list of configurations and cannot be reused. For the receiving side it means that when a code is received that has a later position than the previous code that was received, all intervening codes will be de-activated.

Accordingly the first device (the one that may start a transaction) in accordance with an aspect of the present invention may be a computer, a mobile phone, a smart phone, a fob, a car door opener, a garage door opener, an access card to overcome a physical barrier like a door or a gate, a chip card, an Automatic Teller Machine (ATM) card, a credit card. The second or receiving, preferably remote apparatus may be a computer, a car door controller, a garage door controller, an access controller, a server, an Automatic Teller Machine (ATM), a credit card server, a database server, an order management server or transaction server. For instance a transaction server in order to process a request must first provide access to being engaged with transaction data. In a similar manner one may apply aspects of the present invention to access and/or maintain access to a Virtual Private Network (VPN) server.

A locking/unlocking system is applied to lock or unlock for instance a bolt or lock or a motor or other mechanism

5004 that is related to an object or structure 5003. For instance 5004 is a bolt in a door to a building or a room of a car 5003 or a car starting mechanism or to any mechanism. The device 5004 may also be a relays in a starting-motor 5003. The bolt 5004 may also be part of a lock in a door 5003. The device 5004 may also be a motor in a garage door opener 5003 or provides access to an Automatic Teller Machine (ATM). Device 5004 may also be a server or another computing device or processor that controls access to data, subscriber information, an order application, a bank account or any data or computer application that is protected from unauthorized access.

An opening system i illustrated in FIG. 31. The opening system contains a keying or opening/closing instruction transmitting device 5000, which is preferably a mobile and portable device, but may also be a fixed computer, and a receiving device 5002. The transmitting device 5000 and the receiving device 5002 are able to communicate, preferably wirelessly, but wired communication is also possible and communication may be achieved through a network like the Internet. At least device 5000 is able to transmit, for instance via antenna 5012 when wireless, to receiving device 5002, by receiving antenna 5014. In a further embodiment 5002 is enabled to transmit to 5000 and 5000 is enabled to receive and process the received signal. One-way communication is required, but two-way communication may also be possible and enabled.

The device 5000 has a coder 5007 which includes a transmitter and all functions to condition the signal for transmission. In a further embodiment of the present invention 5007 also is a receiver with sufficient receiving and detection capabilities. In one embodiment of the present invention the processor 5007 has access to memories 5005 and 5006. Memory 5005 contains configuration data, such as type of sequence generating operation, for instance AES, SHA-2, shift register based operation, the state 'n' of the operation, and how the operation (if applicable) is modified by FLT and/or n-state inverter insertion and details of the used inverters. Depending on the size of n, the n-state inverter may be described by a rule (like 256-state multiplication by 231-mod 256, followed by an addition mod-256 with 19) or by storing the 256 elements of applied 256-state inverters. Memory 5006 contains a code that determines the required configuration. A configuration in 5005 has a specific address, and is directly associated with a corresponding address of the corresponding configuration stored in 5006. In one embodiment of the present invention there are at least 10,000 different configurations, preferably at least 1,000,000 and most preferably at least 100,000,000 different configurations.

One may say that data stored in devices illustrated in FIG. 31 are sets of parameters, wherein each set is different from other sets in at least one parameter and each set of parameters corresponds to its unique code, which may be part of the set of parameters.

In one embodiment of the present invention different configurations are randomized in order after initially being generated and entered in a memory. Codes, indicating the configuration, have no information indicating their order and are randomly generated. After being generated the codes are randomly assigned to a configuration.

In one embodiment of the present invention, configurations and their order are kept secret. In one embodiment of the present invention, a configuration has a limited lifetime and secrecy after its use is not relevant. For instance, after access has been achieved to a car by opening a car door or access has been achieved to a databased behind a first protective barrier, the access codes or configurations become irrelevant. They cannot be used anymore to create access. In the future the configuration may be assigned to another code, but assigning a code to the same configuration has a very small probability, and is smaller than 0.000001%.

A code may identify a cipher mechanism to be used (AES, SHA-2, DSS signature, HMAC, LFSR, etc) the parameters of the cipher mechanism and the imposed modifications (FLT of certain operations and insertion of n-state inverters).

If two machines "know each other" the protocol may be limited in data exchange because the two machines have shared information. One example may be a wireless cardoor opener and a car based computer that controls the car lock. The cardoor opener is presumably in possession of an authorized user and is assigned or designated to a car. That is the cardoor opener, when activated, can unlock (and lock) one or more doors on a specific car. The car "knows" so to speak the cardoor opener and the cardoor opener "knows" the car and both controlling computing devices may have stored common data and computer instructions. In that case an incidental pass-by device should specifically NOT be able to open or unlock that car. Nor allow a malfeasant who wants to enter the car unauthorized. In that case a door opener and specifically a wireless door opener should provide a unique signal that works only once to instruct a device on the car to unlock the door. Clearly, the signal should only work once so it cannot be picked up and re-used by an attacker. Furthermore, it should be impossible to interfere with a signal, for instance block it and then resend it to gain time to attack. Furthermore, the signals should be of an unspecified format (for instance a varying length) so an attacker cannot be successful in transmitting variants of a known signal format to try at random to influence the car computer to unlock the door. The example is initially directed at a cardoor. However, it is known that hackers are working on hacking autonomously operating vehicles, including cars, trucks aircraft and the like, to influence their performance. Accordingly, security is required for all forms of access to a computing device and not only the part or functional performance of unlocking of a vehicle control device.

A step to increase security is to use a system that does not require public key exchange between computing devices, perhaps after providing initial data. In accordance with an aspect of the present invention, both devices will perform operations on data that may be public but may also be kept private. Private data may be stored in an ordered way at both the Alice and Bob machine for different computations of a secret common keyword. For instance, there may be 3 instances of a keyword computation:

```
Stage 1: n-value:p1 term=term1; factor=k1 generator=G1 code1 active:N];
Stage 2: n-value:p2 term=term2; factor=k2 generator=G2 code2 active:Y];
Stage 3: n-value:p3 term=term3; factor=k3 generator=G3 code3 active:Y];
.........................
Stage v: n-value:pv term=termv; factor=kv generator=Gv codev active:Y];
```

It should be clear that more than 3 parameter sets may be included. For instance there may be 100 or more sets of parameters, 1000 or more sets of parameters or one million or more sets of parameters. An arbitrary order is assumed in the stored set of parameters. Both machines may have the same order of parameters. No order can be derived from the individual parameters. A unique identifying code may be included with the set of parameters. In accordance with an aspect of the present invention, a parameter set is retrieved at each machine in its order of storage. An external event, such as a date, a time, or an external instruction may instruct each of both machines which of the parameter sets to use. One field associated in the parameter set indicates if the set is active. The above example shows that set associated with code1 is no longer active. In a data management step the active code may be changed from Y to N. In a follow on step, the memory elements associated with the parameters marked as Active: N may be further deactivated by overwriting the memory with for instance all 1 or all 0 or any pattern that overwrites the content, or at least the operational parameters term, factor and generator. Once the parameter set is marked as Active: N it cannot be used in an actual computation.

In one embodiment of the present invention a line in a plurality of parameters sets may be activated in one machine. For instance, a computing machine may be a door opener with an activation button or interface. Based on the activation signal, preferably at random, but stepping through a stored order is also contemplated, a specific line or parameter set that is active is activated. The code of the parameter set is retrieved and is transmitted to the other machine and received by the other machine. Based on the received code the other machine retrieves and activates the parameter set associated with the received code. At the appropriate time, the parameter sets in both machines are de-activated and made impossible to be used again. This prevents that a malfeasant steals a signal and surreptitiously applies a parameter set to attack a machine. In one embodiment of the present invention, the code is transmitted but strictly in order of storage. Imagine a user accidentally presses an activation key while being out of contact with the other device or out of reach/distance. This means that a specific parameter set is activated in one device but not in the other device. The next time the first device (let's say the door opener) is activated while being near to the car, appropriate signals are transmitted and received. The receiving device, while checking the order and position of the received codes will determine that one or more intervening codes were not used and will be de-activated from future use.

The secret common keyword as generated above may be used as a keyword in a procedure such as AES encryption. In that case its use will not be revealed in its generated form in a public manner. In another use it will applied as a keyword to unlock a lock, a mechanism or provide access to data in a machine. In that case it is not desired that the unmodified secret common keyword is transmitted from one machine to another one. One may hide the generated keyword by applying for instance a hashing method. By transmitting all or part of the hash, the receiving machine may hash with the same hash procedure the locally generated secret common keyword and compare the thus generated hash value with the received one to determine that both machines have generated the same keyword and the machine or door may be unlocked or a lock unlocked or access may be provided to data.

In addition to the above one may store in the set of parameters an q-state reversible inverter or a q-state reversible inverter rule wherein q matches parameter n-value p. The q-state inverter may be used to invert the secret common keyword before it is further processed, such as hashed. The receiving machine may be provided with the corresponding reversing q-state inverter or inverter rule. Both machines may also apply the reversible k-state inverters that modify the hashing or encryption methods in accordance with an FLT as described and disclosed earlier by the inventor. The receiving machine is preferably provided with the same inverters or reversing operations.

Both machines may also implement a knowledge free exchange such as a modified Fiat Shamir method. This makes the procedure again interactive, but does not reveal any information about local secret and private information.

The above computer procedures use preprogrammed data. Though the machines step through difference configurations, all data is pre-programmed and changes only when a new set of parameters is activated. In accordance with an aspect of the present invention both machines work without exchange of data, but are both provided with initial information. This information may be provided by a third trusted machine on a network. This machine may have at least the codes stored that are associated with parameter set. One of the first two machines transmits the code of an activated set of parameters to the other machines. The third and trusted machine retrieves or computes one or more common parameters, like the factor or the generator or the curve, that allows the first two machines to compute their secret common keyword.

In a variation of the above one of the Alice or Bob machines generates from computations or retrieval an appropriate parameter to be shared with the other machine. In accordance with an aspect of the present invention, a specific reversible inverter is associated with a code and thus with a parameter set. One of the machines inverts the public data with the reversible inverter and publishes it. The other machine receives the inverted data and reverse inverts it to generate data that is used in computations. The term "machine" is used herein. This is intended to mean computing machine, computer, computing device or any device enabled to process signals that represent digital data, unless indicated otherwise.

In case of unlocking a mechanism or activating/unlocking a database or computing device, both machines have created a secret common keyword. An "opening" device or a device that seeks access has to inform the device that needs to be unlocked or accessed that the opener has the same secret common keyword. If so desired a Fiat Shamir zero-knowledge procedure may be used. However, this is usually an interactive process. It may be made non-interactive. But it may take many steps to reduce the chance of having a faking attacker. In one embodiment, a code and possibly enciphered (possibly by inverter) are packaged in a single frame or multiple frames that are transmitted from opener to the to be opened device. The packaging is such that there is realistically no opportunity to separate code from keyword or enciphered keyword. That is, an attacker cannot stop a device from part of a signal that is only the key. The code alerts the receiving device what is coming. If so desired, one may send the code separate from the key or enciphered key. If they are not separated, the receiver may store the entire received frame or frames, separate the code from the key or enciphered key. Using the code, specific parameters are retrieved associated with the code. A public key may be part of the frame. The receiving device generates the key, it may decipher an enciphered key or it may encipher its own generated key, for instance via hashing and for instance compares deciphered received key with generated key or the received enciphered key with the locally enciphered generated key. When they are identical the device is unlocked, a lock is unlocked or access is given to a database or a locked device or protected device.

A receiver may be programmed with instructions to separate a code from one or more public key elements embedded in a message. Such separation may not be clear from a message itself. For instance elements, such as bits or blocks of bits belonging to a specific parameter, code or key, may be embedded in a message by a predetermined interleaving or multiplexing and/or by different encipherments such as using different n-state inverters which as known to the devices.

A device that receives an above type message may store and process the message for processing and as soon as an element is detected that indicates that it is an opening or unlocking message may prevent a processor in the receiving device from storing and/or processing opening/unlocking data at least for a limited time, for instance until authenticity and/or validity or correctness of the message is determined.

If required and if warranted by sufficient lengths of messages, an identifying code and/or a parameter and/or public key may be transmitted by an requesting or opening device within a predetermined interval. It may be like an opening device transmitting to a receiving device a code for a lock, allow a receiving device to initiate and activate the lock and then have the opener transmit the key and allow the receiving device the opportunity to have a valid key to unlock or open the receiving device. In that case a receiving device may only allow a limited time between receiving the code and the key. For instance when a code is received, a to be opened device may allow preferably at most 5 minute, more preferably at most 1 minute, even more preferably at most 30 seconds, even more preferably at most 10 seconds, even more preferably at most 1 second, and most preferably not more than 1 second to receive a key message. This gives an attacker in most circumstances not enough time to prepare an attack. After the time is elapsed, the receiving device de-activates the parameter set associated with the received code and is ready to activate the next code in an ordered set of parameter sets.

In certain cases a very large number of opining or key exchange efforts are expected with public key exchange to make sure that two machines are properly matched by data-exchange and storing of a lot of parameter sets or static data is to be prevented. For instance, an autonomous vehicle may drop connection often and reconnects often with a particular server on a network. In that case, it may not be necessary to do full cryptographic protocols but use for a limited number of times a common parameter that is computed. For instance, if a certain n-state inverter is used in the connection, one may scramble in a predetermined manner the n-state inverter without the need for applying a completely new set of parameters. A simple example illustrates the scrambling. Assume an 8-state inverter inv8=[2 1 4 3 6 5 8 7], then a simple split and move may generate inv8s=[4 3 2 1 8 7 6 5]. This is derived from inv8=[a1 a2 a3 a4 a5 a6 a7 a8] and inv8s=[a3 a4 a1 a2 a7 a8 a5 a6]. This is merely a simple illustrative example as n in practice is greater than 8 preferable n=256 and even greater. And more complicated scrambling rules are of course possible and fully contemplated. In some cases, as little data as possible is desired to be exchanged and the number of possible connects/opening is limited, for instance to less than 100 or less than 1000 or any other secure number. Once the max numbers for reconnect without new parameter exchange is reached, the computing devices may start a new series of exchanges.

Especially in certain cases, for instance wherein at least one device has not a powerful enough processor, it is desirable to avoid complex and/or time consuming computations. In that case it may be desirable to store as much data as possible on a memory, which may be a fixed memory or non-volatile memory from which data is retrieved and transmitted.

Figure 32:
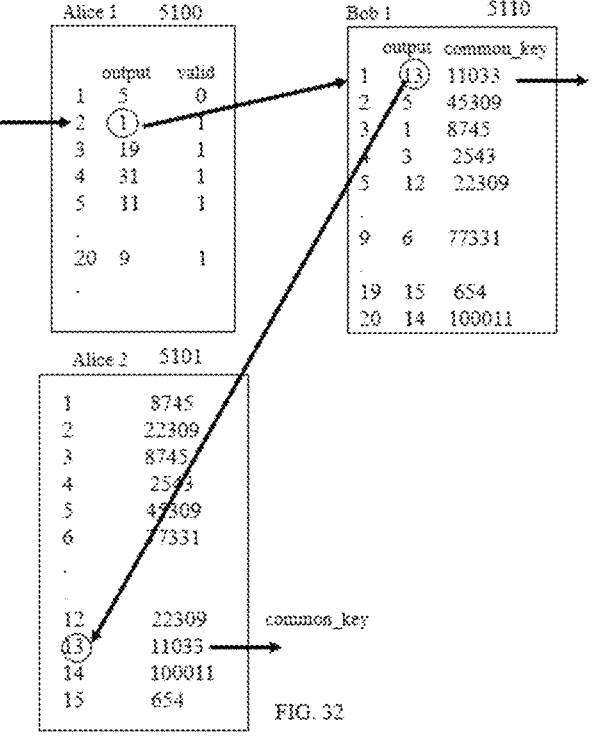
FIG. 32 illustrates in diagram an exchange of data between two machines is accordance with an aspect of the present invention.

One possible embodiment of the commutative property as stored states is illustrated in FIG. 32. There are two machine which are called Alice and Bob to keep in style with general naming in cryptography. Machine Alice has two memories or two parts of one memory or storage 5100 and 5101 while Bob has a memory 5110. The memories are part of computing devices including memory control and management and processing circuitry. The machines have transmission and receiving circuitry, bodies, power supply and other equipment which is familiar to one of ordinary skill in mobile computer technology. In order to not obscure a working of the system these and other circuitry and equipment is not shown but should be assumed to be present.

An initiative for opening or activation starts from the Alice machine. However modifications that allow start from the Bob machine is fully contemplated. An activation step, for instance a user pushing or activating a button or other interface causes a processor to look for a next valid line in memory Alice 1 5100 to be activated. For illustrative purposes validity of a line is indicated by a column named 'valid' that carries a 0 (not valid) or 1 (valid). A processor may overwrite a line with valid indicator 0 so no useful states are present on that line. Line 2 is the first valid line and it has signal '1' in the column output. A signal representing '1' is transmitted to machine Bob and a memory line in 5110 represented by signal '1' is activated. One output signal '13' is associated with line 1 as well as common key '11033.' Machine Bob outputs signal '13' to machine Alice and retrieves a common key identified as '11033' as a common key. The signal represented by '13' is transmitted to the Alice machine. The Alice machine that receives a signal from Bon now activates memory or memory location 5101 and the memory line associated with signal '13'. A processor reads the memory content of line '13' and outputs common key '11033'. The common keys may have any format and any value as long as the they are unique from other common keys. One may further process the common keys. However, it should be clear that both machines Alice and Bob work with the same common keys. After using a line it may be disabled by switching the valid bit from 1 to 0 or by overwriting the line with all 0 or all 1 bits or with a meaningless pattern. Not specifically highlighted, one may check that line 3 in 5100 outputs signal '19' to 5110 where it activates output '15' to 5101 and generates common key '654' at 5110. Memory line associated with '15' in 5101 also output common key '654'. This has been made a 3-step generation. If so desired the number of steps may be expanded by having additional translation memories or memory parts.

Figure 33:
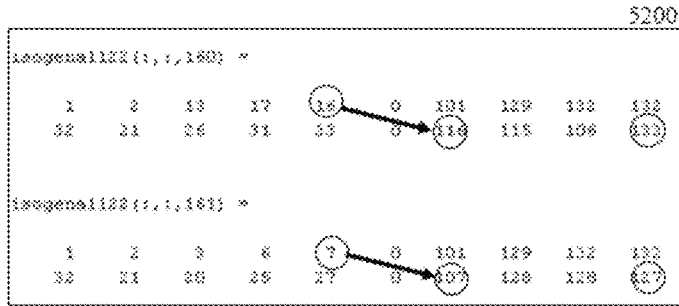
FIG. 33 illustrates a recoding of isogeny SIDH states in accordance with an aspect of the present invention.

In practice it may be useful to have 100,000 or 1,000,000 different and unique memory states to generate unique common keywords. It may be difficult to achieve this manually. One way to fill the memories automatically is to use an isogeny based method. This is illustrated in FIG. 33. FIG. 33 is a screen shot of an output of possible isogeny states as generated by the SIDH protocol. Only 7 values for ka were used (3, 5, 7, 9, 11, 13, 15) and for kb values from 2 to 26. This generates 175 outputs. Costello in his article mentions "the curse of the toy example." Because of the small value of p=431 in the example, the number of different j-invariants and even of curve parameters is small, 37 and much smaller than p. The number of different end-states for p is about p/12. For larger values of p or of eA and eB, the number of possible end states exceeds the number of computed end states. Thus for p≈100,000 and certainly for p≈1,000,000 there is little chance of duplications or collisions in SIDH. However, a program should check and drop any end state that already occurred.

FIG. 33 shows a partial table 5200 which is a small part of 175 outputs. The 2 line table isogenall22(:,:,160) show a recoded output of a complete isogeny SIDH cycle for p=431 and for the generator elements and initial curve as provided in the Costello article. The inventor first did run all possible 175 (ka,kb) SIDH isogenies and stored all generated curves and renamed them. For instance state 1 is the starting curve in Costello indicated as a0=329i+423. The first line shows 5 numbers followed by a zero and then followed by 4 more numbers. The first 5 numbers are the 4 isogenies in Alice ending with 16, which is the public key which is represented by curve now designated as 16. The zero is meaningless and serves as a separation. The next 4 numbers are the Bob isogenies, also starting at 1. To distinguish with Alice it is named 101, but it is the same as Alice curve 1. The first stage public output of Bob is 32 named 132 to distinguish from Alice. The second line shows the second state isogenies in Alice and Bob using the public keys. So Alice starts with 32 (which was first shown as Bob's output 132) and ends as secret common curve 33. Bob enters public curve 16 from Alice as 116 and ends generating as secret curve 133 which is the same as 33. To highlight part of the process the public key of Alice to Bob and the secret key generation of Bob are marked.

The public outputs of Alice are associated with an initial state (for instance index 160 in this case). It generates 16 which may be used as an ID for a memory line in 5110 in Bob and provides an output 33 (or 133) The signal 33 is applied as an identifier in memory 5101. The secret curve or j-invariant associated with 133 or 33 may then be used as a common secret keyword. One may also apply a reversible k-state inverter wherein k may be much greater than p and wherein an additional number may be added to generate a keyword that depends upon the output state 133. By using the SIDH or any other isogeny based protocol and an adequate recoding of all possible or preferably all occurring begin, intermediate and end curves one may create a stored but highly secure key exchange system as illustrated in FIG. 32.

It should be clear to one of ordinary skill that the above may be modified so device 5110 only generates a signal for 5101 but does not provide a common key. A similar but mirrored process, using for instance first the Bob isogeny states or start with the second part of the first line in 5200 (after 0) that starts with 101 (being identical to curve 1) and ends with 132 or curve 32 out of 37. Signal 32 is transmitted from 5110 from Bob to Alice to a memory not shown in FIG. 32 that generates from Alice a signal 33 back to Bob. A separate and not shown memory in Bob then at position identified by 33 identifies a common key that is identical to the one generated by Alice. This is of course the SIDH mirror of the first process as illustrated in FIG. 32. One should take care that the second signals are recoded in a way so they are not identical in both processes. Other ways to increase interactivity are fully contemplated.

After the earlier date of filing the parent patent application U.S. Ser. No. 17/240,635, the SIKE/SIDH isogeny based Diffie Hellman key exchange was broken as described in Castryck et al. An efficient key recovery attack on SIDH in 2022 downloaded from https://eprint.iacr.org/2022/975.pdf which is incorporated herein by reference. It has affected the perceived security of isogeny based cryptography. The successful attack was based on publicly shared data, called an auxiliary isogeny. In accordance with one or more aspects of the present invention no data meaningful to an attacker is publicly shared. A code sent by a first computer to a second computer is meaningless and only a code associated with a set of parameters. However, the code itself does not reveal anything publicly about the parameters it is associated with. A code is part of a set of codes and the codes may be arranged in an ordered fashion. However, the codes themselves preferably appear as being random and do not reveal a place in a ranking. Based on the associated set of parameters, the first computer may use a secret isogeny (either a point and/or, a curve and/or a number of isogeny steps and/or other isogeny based steps) to generate data or a cryptographic message which may be generated by including an FLT in the applied computer functions.

The receiving computer may receive correctly the code from the sending computer and activates a corresponding parameter set. It then either processes the received cryptographic message or uses its parameter data or other data to compute its own message. Based on the result it will then activate a device, a database, a server, or any other relevant access. In that setting no public key data or meaningful data is ever shared in public or interceptable transmission. As such, the Castryck attack does not affect security of using isogeny based cryptographic operations in securely activating a device and/or access.

One may say that the different configurations of the above embodiments transmit two pieces of data: 1) data (code) that determines a lock and 2) a key to unlock the lock. Because the confidentiality of the lock code and the immense variation of possible locks it is practically impossible to determine the lock from either the code or the key. Because preferably each lock/key procedure is used once and in combination with an FLT that for instance for n=256 enables over 10^400 possible configurations, a successful brute force attack on this unlocking system is practically unlikely during the existence of our universe even with super-computers operating on exa-scale or quantum computers.

There is ongoing research into novel cryptographic methods. The focus seems to be mainly on Public Key Infrastructure (PKI) or public key exchange. This relates to methods that are not sensitive to Quantum Computer (QC) attacks, like the discrete logarithm and factorization attacks by quantum computers (QC). However, this research leaves the basic true encryption alone. One may change of course existing encryption like AES and turn to larger variants as explained in the Rijndael specification or larger variants of the ChaCha20 specification, which are all part of the current TLS 1.3 protocol.

So, when it is mentioned the Advanced Encryption Standard or AES it includes all possible modes and variations, as long it includes one of the basic procedures or data-flows even when/if of different size of SubBytes( ), ShiftRows( ), MixColumns( ), AddRoundKey( ) and KeyExpansion( ) In particular AES-GCM (Galois/Counter Mode) is popular and part of TLS 1.3. AES-GCM is an AES mode described in an issued and published NIST (National Institute of Standards and Technology) document, either as Special Publication (SP) or as FIPS Documents (Federal Information Processing Standards documents). Similarly ChaCha20 is part of TLS 1.3 and contains 20 sub-rounds each involving addition of words modulo-2^k and bitwise XORing of words. These words are currently defined as being 32-bits long. One may modify these in different ways with the FLT. These modifications and or modes like XChaCha20 and others that maintain its original data flow may also be modified with the FLT. ChaCha20 and other cryptographic standards or recommendations are often published as RFCs or Request for Comment documents.

It is now possible to use broken and insecure cryptographic methods like MD5 or RC4 and update them with a confidential FLT and make these secure again against brute force and/or collision attacks.

In accordance, the key or key message may be generated from data that is part of a parameter set. One may even use a public or yet another cryptographic message to create the key data. Jamming is a known approach to interfere with a receiving device. Several measures to counter jamming attacks are possible. If a signal of sufficient strength in a receiver bandwidth or spectrum but unintelligible to a device is received a maintained counter is activated that disables a code in a series of codes that have an order of execution so that the expected code, which is interfered with is disabled. Presumably sufficient codes are available to allow loss of codes. Furthermore, repeat of codes may disable the processor of the receiving device for unlocking and some other, presumably physical action, has to be taken to activate the locking/unlocking mechanism again. Furthermore, an attacker may jam and steal an opening sequence, in the desire to use it later. In one embodiment of the present inventions the codes and associated parameters are ordered. When one or more sequences are jammed and a third one works for an authenticated user, all preceding codes and related parameters and instructions are deleted or invalidated, preferably in an unrecoverable way like overwriting that part of the memory with a random or at least for opening purposes meaningless set of data.

The FLT is applicable to any computer operation or function that can be represented by a n by n n-state table or a combination of such tables. Examples are additions over GF(n). Even if not practical, additions over GF(n) can be imagined as an n by n n-state table. In those cases wherein it is not practical one may apply rules of inversions rather than stored inversion tables. For instance the inversion inv(i)=a+b*i mod-n is a reversible n-state inverter that may be applied for any practical representation of n in a computer operation.

In one embodiment of the present invention, a long sequence of bits, like 32 bits or 64 bits or 128 bits or 192 bits or 256 bits or over 256 bits may be used to activate a device or access. Long bit sequences are difficult to quickly attack by brute force especially when there are 256 bits or more. However, it is also known that generating bit sequences that appear to be random in cryptography is a challenge. A simple but powerful way to pseudo-randomly and reversibly invert a long series of bits is by using an n-state Maximum Length Feedback Shift Register (ML-FSR) inverter. A series of p bits is divided in a set of k groups of q bits. For instance a set of 256 bits may be represented as 32 sets of 8 bits, each 8 bit set may be represented as a 256-state element. The word of 256-bit may be represented as a $2^{256}$-state number. To create a $2^{256}$-state reversible inverter is not a simple affair. An ML-FSR based $2^{256}$ state inverter is created using the following steps. As indicated before a large word of bits is divided into smaller binary words, in this example 32 words of 8 bits or 256-state elements. One may consider a word of 32 256-state elements as a radix-256 representation of the $2^{256}$-state number. Each of the 32 256-state elements is then a 256-state digit in the representation of the $2^{256}$ state number. In accordance with an aspect of the present invention, the radix-256 representation will be reversibly modified into another radix-256 representation of the $2^{256}$ state number.

The creation of n-state k-stage ML-FSR is explained in U.S. Provisional Application No. 63/524,125 filed on Jun. 29, 2023 which is incorporated herein by reference. K-stage means the FSR has k n-state shift registers with k>1 or k>2. One approach is to divide a series of p bits into k words of m bits, Each word of m-bits represents a $n=2^m$ state element. One may also use other base elements like $n=q^m$ with q a prime greater than 2. However, for practical purposes $n=2^k$ is efficient and explanation for now will be focused on $n=2^m$. Thus a series of p bits may be represented by a word of k n-state elements/symbols. Rather than do an individual inversion of bits a complete inversion of the p-bit word will be achieved. An n-state k-stage ML-FSR has as property that starting from an initial content of the k-state n-state shift register, after shifting, the initial shift register content will not appear for $n^k-1$ shifts. For n=256 and k=10 that is a very large number. In fact the ML-FSR now works as a reversible n-state inverter of a word of k n-state elements. One may run the ML-FSR in forward and reversing direction. For instance one may enter an initial content in the shift register and run the ML-FSR for h cycles and the new content at that time is the inverted word. By entering the inverted word into the shift register of the ML-FSR and run it in reversing manner one thus recovers the original content.

The n-state k-state ML-FSR is determined by a primitive polynomial of degree K over $GF(n=2^m)$. For instance a set of 32-bit may be represented as a word of 4 256-state elements. To find an adequate 4-stage 256-state ML-FSR one needs a primitive polynomial of degree 4 over GF(256). As it turns out, for large n like n=256 and large k (for instance k>10) finding such polynomials is very difficult as most common available tools and tables do not provide that information. One still needs it, because the feedback tap coefficients of an n-state k-stage ML-FSR are determined by the coefficients of the corresponding primitive polynomials. The inventor tried several approached using online tools like Sagemath, PARI/GP and installed software like Matlab, Mathematica and even Python based packages like Galois. Some of these tools were actually focused on working with pre-determined polynomials, not to generate these polynomials. Also, for the parameters sought for n>127 and k>10 these tools turned out to be inadequate as they (running on a PC and/or laptop) were stuck for hours doing computations and were not considered a viable option for generating the required primitive polynomials.

Fortunately, online Magma Calculator at http://magma.maths.usyd.edu.au/calc is an extremely powerful publicly available online and privately installed Computer Algebra System (CAS) tool. Again unfortunately, Magma, while powerful, is not particularly user friendly for the task of generating the coefficients for the ML-FSR. The approach selected was as follows: define a size n and degree K for a polynomial. Set the base field in Magma, for instance F:=GF(256). Determine the generating polynomial for the base field. Then use g:=RandomIrreduciblePolynomial(F,k) to generate a random irreducible polynomial of degree K over F (GF(256)). Then test if polynomial g is primitive IsPrimitive(g). If yes: Magma has its own notation for a polynomial, generally not in general polynomial notation with indeterminate x as commonly used, but as a set of coefficients belonging to a power (what others may call an indeterminate). However, the coefficients are provided as a power of a primitive element of the base polynomial. For GF(256) such a primitive element is 2.

That is why one needs the base polynomial, to generate the lookup table for multiplication over (in the example) GF(256). The inventor developed a Matlab program using 'conv' and 'deconv' statements to generate the multiplication lookup table. The product of two polynomials herein is the deconvolution of the product of two input polynomials modulo the generating polynomial. The numerical value of the coefficients generated by Magma is then $2^{\wedge}ci$ with ci being the Magma generated exponents. The inventor designed this for large sequences of bits and tested it for k=400. But manually extracting 400 coefficients from <agma output is nor easy and error-prone, so the inventor created a Matlab program to enter the Magma output as a string and for Matlab to generate a 1D array with the numerical coefficients of the ML-FSR.

It is mentioned herein, because the extraction appears to require a lot of steps. And they do. But these steps are simplified by capturing them in for instance Matlab code. As the required steps have been provided it is believed that one of ordinary skill has been enabled to repeat the steps as it requires mainly simple programming. There are no further undue inventive steps required as the inventive effort has been done and disclosed herein.

One public access limitation may be a public limit of k=400 for public Magma. Still, this represents for GF(256) an inversion of a word of 3200 bits. Larger k can also be processed and much larger primitive polynomials of degree greater than 500 and greater than 600 can be generated by Magma on a dedicated computer. This may require processing time, but ultimately results will be obtained that may be stored as an array of coefficients.

One may represent the ML-FSR in Fibonacci or Galois configuration, and preferably so in a k by k canonical format. FIG. 34 illustrates the canonical form of a 5-stage Fibonacci configuration FSR. The array 3400 represents the FSR based on monic polynomial of degree 5 $x^{\wedge}5+a1^{*}x^{\wedge}4+a2^{*}x^{\wedge}3+a3^{*}x^{\wedge}2+a4^{*}x^{\wedge}1+a5$. The canonical form has as variable in Fibonacci configuration only the first row, being all feedback taps in the FSR from the first element to the last one. The rest of the canonical form is standard for Fibonacci, having the second row being [1 0 0 . . . 0 0] and the last row always [0 0 . . . 1 0] in origin 0, with the one being shifted one position in each next position per next row. The array being Af, the new FSR state is computed as shown in 3401 being new_vec=Af*old_vec with old_vec being the initial content of the FSR. One may also use Af_m=Af^m using multiplication and addition over GF(n).

The Galois canonical array format is illustrated in FIG. 35 3500, using the same polynomial, the Galois array is also a k by k array with the last column being [a5 a4 a3 a2 a1] which are the coefficients of the polynomial represented in column form in reverse order. The last (kth) column is the only variable. In the Galois canonical array the first column is [0 1 . . . 0 0]' and the (k–1)th column is always [0 0 . . . 0 1]' with the one position being shifted one position going from 1 to (k–1)th position of the columns. The computation is then vec_new=Ag*vec_old with Ag the Galois array as illustrated in FIG. 35 3501. One may also apply Ag_m=Ag^m, again using addition and multiplication over GF(n).

Running the FSR in reverse direction requires determining the reversing FSR or computationally the inverse of Afi=Af^–1 and/or Agi=Ag^–1. Computation of the inverse array is fairly simple for small k by k arrays with k=5 for instance. But even for k=10, inverse computation may become time consuming if done in textbook fashion.

One is actually helped by the structure of the reversing Fibonacci FSR. The canonical form of a Fibonacci transition array A (take A is a 4 by 4 array for k=4 FSR) is array A=[a1 a2 a3 a4;1 0 0 0;0 1 0 0;0 0 1 0]. The canonical form of Fibonacci FSR array is: first row of the array is the set of tap coefficients, the next rows indicate the shift of one position of a current shift register element. See FIG. 34 model. Doing a textbook inverse of A to A^–1 generated for k=4 the array A^–1=[0 1 0 0;0 0 1 0;0 0 0 1;b1 b2 b3 b4]. This is also (taking in consideration of the size of the array) the canonical form for a k by k inverting array of a Fibonacci transition array. The rule for Ai=A^–1 is A*Ai=I with I being identity. This allows a very simple solving of the coefficients [b1 b2 b3 b4] from [a1 a2 a3 a4]. For an FSR with k shift register elements one finds: a(k)*b(1)=1 and b(i)=a(i–1)*b(1) for all i not being 1. Thus b(1) in Ai is the multiplicative inverse of a(k) in A. A very simple way to find the multiplicative inverse in mgn or mg256 in GF(256) is the following. Taking into account that Matlab representation is origin–1, the reasoning is that mgn(a,ai)=e with e being the one-element or mg256(a(k),b(1))=2 (in origin–1). Or b(1)=find (mg256(a(k),:)==2). All other terms of fib(i) are computed by b(k)=mg256(a(k–1),b(1)). This is a very fast routine and practically not limited to any size. Herein mg256 is the multiplication over GF(n) or GF(256) in the example and scn is the addition over GF(n) or GF(256) in the example. The above inverse if computed for GF(2^t). For non-binary fields one should take care of the minus operation.

The reversing Fibonacci transition array is illustrated for a 5 by 5 case in FIG. 36 with 3600 the canonical reversing transition array and 3601 illustrating a reversing operation on a shift register content. The reversing array also applies to the powers of arrays. Assume A^m representing the MF-FSR shifted m times and Ai being the reversing array. Then Ai^m reverses A^m and A^m*Ai*m=I with I being identity.

With the above a very powerful method is provided for easily finding the inverse transition array, even if the transition array has hundreds or even thousands of columns and rows. This would not be easily determined if one needed to create textbook array inverses. The need to compute directly and simply only one row as illustrated in 3600 and the rest having a canonical structure makes determining a reversing base transitional array very simple.

A similar approach may be applied to the Galois FSR transition array. For instance using canonical figure FIG. 35, one can easily see that for k=4 gal=[0 0 0 g1;1 0 0 g2;0 1 0 g3;0 0 1 g4] and by computation one finds a generic output gali=[b1 1 0 0;b2 0 1 0;b3 0 0 1;b4 0 0 0]. The found gali may be used as a basis for a canonical form of the inverse of gal, as one knows that gal*gali=I or identity. This leads to the following canonical rule for Galois FSR inverse transition k by k array: g(1)*b(k)=1 or b(last)=g(1)^–1 and b(i)=g(i+1)*b(k) for all i not being k. The same manner as above may be applied to determine the multiplicative inverse over a lookup table mgn or as in the example mg256.

A 5 by 5 inverting array 3700 in Galois configuration is illustrated in FIG. 37 with 3701 illustrating the computation of an initial setting based on an achieved setting using 3700. As an illustrative numerical example use gal5=[0 0 0 0 4;1 0 0 0 6;0 1 0 0 18;0 0 1 0 11;0 0 0 1 3] as the Galois transition over GF(256) using mg256 as multiplication and sc256 as addition. One then gets gal5i=[143 1 0 0 0;138 0 1 0 0;203 0 0 1 0;201 0 0 0 1;71 0 0 0] as its inverse over GF(256). The product of gal5*gal5i over GF(256) is identity.

In accordance with an aspect of the present invention, a set of p bits with p greater than 15, preferably p greater than 31 and more preferably greater than 255 is inverted with an ML-FSR based n-state inverter wherein $n=2^q$ with the FSR having k n-state elements and the n-state inverter has as parameters for instance the transition array, the state n, the number k, the initial starting vector and/or any other relevant ML-FSR determining or $2^p$ state inverter. In the context of the present invention one may use the large bit sequence inverters in different modes. For instance it may be used to modify/invert a commonly agreed upon sequence of bits received by a second computer. The second computer reverse inverts the received bit stream and checks if it is the same as the commonly agreed upon sequence. It may also be operated so that the second computer also inverts the commonly agreed upon sequence and checks if the received sequence is the same as the result of its own inversion.

One may use this in an application to remotely activate a device. For instance two computing devices store each a plurality of different sets of parameters as illustrated in FIG. 31. Each set of parameters is associated with a unique code. And a set of parameters may provide sufficient information to construct an n-state ML-FSR based array, preferably with a power m to compute $ciph=A^m$. At least two sets of different parameters apply different powers of m, such as m1 and m2 as parameters. One may use an agreed upon base vector, which when activated is multiplied with $A^m$. A corresponding unique code is transmitted to the second computing device which enables the corresponding set of parameters. This may include the same base vector and power m so the second computing device will also compute the array-vector product $ciph=A^m*base$. However, alternatively the second device may compute $decryp=A^-m*ciph$. In the first case the second computing device determines if the locally generated $loc=A^m*base$ is identical to received ciph. In the second case the second computing device determine if decryp=base. If requirements are met the second computing device enables an application, activates a mechanism, or provides access to protected data for instance.

In accordance with a further aspect of the present invention, the ML-FSR based reversible inverter is itself FLTed. This takes place by an agreed upon n-state inverter. The elements of a generated transition array of an ML-FSR are inverted with the reversing n-state inverter of the FLT. Furthermore, the addition and multiplication operation over GF(n) in the ML-FSR are FLTed with the n-state inverter. The may create Aflt=rinv256(A) and mn256=labtransform (mg256, inv256) and sn256=labtransform(sc256,inv256) for n=256. The above applies both to the forward and reversing ML-FSR as well as to powers of these operations. It is believed that this creates close to unbreakable security of a first computer unlocking or creating access on or to a second computer or a database, device or server controlled by a second computer.

In present computer technology, all internal data is processed in the form of bits. This is not needed for the aspects of the present invention, but it is a current operational fact. This facilitates the processing of the radix-n words as applied herein. That is, one may invert by way of ML-FSR based y-state inverter with $y=2^p$ or in the example $y=2^{1024}$. The ML-FSR inverter has 128 words of 8 bit words or 256-state elements. The inversion (with or without FLT) will generate 128 256-state elements. By using the 8 bit representation of the 256-state elements one directly has a sequence of 1024 bits again. One may apply the ML-FSR in forward and reverse direction and using any appropriate power of $A^m$ and/or $Ai^m$. One may generate a sequence of bits at a transmitter and check if a receiver can replicate this generation. One may also decrypt an encrypted or generated sequence and check if in decrypted form it matches a preset sequence.

Aspects of the present invention are directed to novel computer functionality implemented in computing devices to open or unlock devices and/or computer data and/or computer applications. This unlocking may be applied with direct connection between devices or remote devices.

In one embodiment of the present invention one may use a shared data file as basic cleartext on which a cryptographic operation is to be performed. Such file may be a book, a random set of bits, an audio file, am image file or any other file with data that may be used as cleartext. One application may be to associate each parameter set or unique code with a section of the file. For instance with sections of 128 bit, or 256 bits or 512 bits or 1024 bits or any section size that is deemed appropriate. By associating each unique code with its own section, no same cleartext data is presumably used. One may simplify the whole process by sticking to one or a limited size of cleartext and/or a limited variation in applied cryptographic methods. For instance one may apply for a number of times the ML-FSR based method, using a similar word size and agreed upon n for n-state, but applying different n-state inverters and/or different base transition arrays or transition arrays selected from a preset number of ML-FSR based transition arrays. The advantage of this is a very fast computation, one way and very secure.

Herein a Maximum Length Feedback Shift Register (ML-FSR)) based reversible inverter is disclosed. The ML-FSR has k n-state shift register elements with k an integer greater than 1 and preferably greater than 2 and n an integer greater than 2 and preferably greater than 127 and n being a power of 2 in certain cases. The ML-FSR is characterized by a primitive and also irreducible polynomial of degree K over GF(n). The coefficients of the irreducible polynomial determine the taps of the ML-FSR. Because the FSR is Maximum-Length, the ML-FSR is cyclic after $n^k-1$ shifts. The content of the shift register is unique compared to other contents during the $n^k-1$ shifts. The content (in origin–1 runs from [1 1 1 . . . 1 2] to [n n n . . . n n], which means in radix-n all radix-n $n^k-1$ possible numbers. The ML-FSR has one degenerative content [1 1 1 . . . 1 1] wherein shifting does not cause a change. The FSR can be created in forward and reverse direction. For instance a content [a1 a2 a3 . . . ak] after m shifts forward may result in [b1 b2 b3 . . . bk] different from the original content. Starting with [b1 b2 b3 . . . bk] and shifting in reverse direction, will result in recovering [a1 a2 a3 . . . ak]. Thus the ML-FSR is a p-state reversible inverter with $p=n^k$.

Applying an FLT to the ML-FSR has also been disclosed. In essence it requires all k by k n-state elements of a transition array A to be inverted with a reversing n-state inverter of an n-state FLT and applying the FLTed n-state addition and multiplication in the vector-array multiplication. The content of the shift register is treated as a word of k n-state elements, which one may call a radix-n representation. Data is usually processed as bits. Thus a word of bits may be represented as a series of words of for instance 8 bits. In that case a word of 800 bits may be considered as a word of 100 bytes. All representations are then 256-state elements. The outcome of the ML-FSR is another word of 100 bytes. One may directly convert each byte into its binary form and thus 100 bytes will become 800 output bits.

Practically there are 1000s primitive polynomials over GF(256) of degree 100 and thus there is already a good level of unpredictability. By applying the FLT to the ML-FSR one may have over $10^{\wedge}400$ different 256-state ML-FSR 100 by 100 arrays.

A first computing apparatus instructs a second apparatus to activate a device. The terms activating a device herein must be considered broadly unless expressly limited. For instance, opening a garage door by activating a motor or opening a vehicle door my activating a lock opening bolt may be considered activating a device. However, herein a device is also considered to be a part of a device that can be isolated or protected or made inaccessible in a computing device, for instance a part of a memory protected by a locking construct such as an application or computer instructions is considered to be a device herein that can be locked and unlocked. The same applies to executing certain computer functionality or data storage devices. For instance, one may buy access to an online newspaper by buying a subscription or other privileged access. In that case the computer or computer part or server running and/or storing data or applications are considered devices.

Security of the locking and unlocking is provided by its unique occurrence. So no attacker can "learn" and opening or activating sequence when applied in accordance with aspects of the present invention. Two machines each have a series of unique sets of corresponding parameters. Each unique set of parameters represents and/or enables and/or configure instructions of a cryptographic method and each correspond to a unique code. A unique code is thus a secret code or representation of a unique set of parameters. By sending the unique code to a receiving apparatus, one may say the receiving apparatus is instructed to find corresponding parameters and implement as it were a unique lock. The transmitting apparatus implements its unique set of parameters, which may include cleartext, a base protocol; for a cryptographic operation and one or parameters to modify the protocol, preferably with a unique FLT and generates a cryptographic message. The receiving apparatus has prepared the "unlocking" or lock and receives at it were the key in form of the cryptographic message. When all is coordinated well the receiving device either deciphers the cryptographic message and/or generates its own cryptographic message and unlocks the device based on what it received and what it constructed, for instance when both are the same.

There is an enormous amount of possible different ML-FSR sequence generators. One may make life more difficult for attackers and thus increase security by using different cryptographic methods for consecutive openings. For instance one may opening with ML-FSR based methods vary by using hashing or encryption or other methods. One may use for instance use a common document, like a text or other file, and use stretches of certain length as shared common data and encrypt pre-agreed stretches of data in the file as shared text. One may hash the text or encrypt it. Each cryptographic operation is determined by its own set of parameters and by its unique code. Well known encryption is for instance the Standard Encryption Standards (AES) and its defined operational modes of which AES-GCM is widely used. One of ordinary skill knows that all operational modes of AES have a common data flow. For instance all modes in AES use procedures SubBytes( ), ShiftRows( ), MixColumns( ), AddRoundKey( ) and for multiple rounds KeyExpansion( ). The dataflow is in AES determined by the functional operations, which on a first scale is on words of 8 bits, words or columns of 4 bytes and on state arrays of 16 bytes. For instance in AddRoundKey ( ) the operation is a bitwise XOR on corresponding bits in a state array. One may call this addition over GF(256) if one considers the bitwise XOR on words of 8 bits. This makes no difference in the end result. However, applying the FLT changes this. On a byte scale, the meta-properties of the operations have not changed. One may say that the dataflow with an FLT of an addition over GF(256) remains the same or substantially the same compared to the non-FLT version. But the numerical appearance changes dramatically. This also applies if one considers the entire state array of 16 bytes or 128 bits as a complete word and apply the ML-FSR inversion in an FLT or partial FLT to the AES state array or part of it. Thus the term dataflow substantially similar or substantially unchanged means that an FLT is applied to words of bit in a cryptographic operation.

The same terminology applies to ChaCha20 and well known hashing such as MD5, SHA-2, SHA-256, SHA384, Sha-512 and SHA-3 for instance. One may also say that computer operations are modified by considering words of bits as n-state entities and the bitwise operations of the cryptographic operations are modified by the FLT to being n-state operations. Somewhat different in MixColumns( ) operation, which is already treated as an n-state operation which may be FLTed as described herein.

A theme herein is novel and nob-obvious modification of computer functionality to process sequences of bits and/or words of n-state elements with n>2 as applied in secure exchange of data, preferably cryptographic data, or data processed in accordance with cryptographic computer functionality. Arguably one of the most widely used standard computer functions in cryptography is the XOR switching function which may be described numerically as $xor2=[1\ 2;2\ 1]$, remembering that the physical execution of an XOR device has physical structure. In general cryptographic computing devices generally perform a bitwise execution of 2 words of k bits. Numerically, this may be represented as an addition over $GF(2^{\wedge}k)$. For $k=3$ or $n=2^{\wedge}3=8$ the numerical representation of an addition over GF(8) is illustrated in computer screen shot 301 in FIG. 3. One may call the function shown in 301 sc8. One may simply check that for $c=sc8(a,b)$ that $a=sc8(b,c)$ and $a=sc8(c,b)$ for all a,b and c in the set of allowed 8-state signals. In fact sc8 is self-reversing and commutative. This is called a commutative n-state involution, wherein the involution applies to all possible n states of operations. All n-state commutative involutions derived from bitwise XORing of k words of bits are additions over $GF(n=2^{\wedge}k)$. This also applies to FLT of these functions. However, the novel n-state commutative involutions are generally NOT derived from bitwise XORing of words of k bits and may for instance not be an associative function.

The inventor has analyzed and described commutative n-state functions for $n=2^{\wedge}k$ and disclosed this in U.S. Provisional Application 63/573,331 to Lablans filed on Apr. 2 2024 which is incorporated by reference and referred to for additional explanation if required. The results of the analysis will be applied here. One aspect found is that all additions over $GF(n=2^{\wedge}k)$ described in a lookup table are commutative, thus rows and columns with the same index are identical, while all rows are different and are self-reversing n-state inverters. Furthermore, all rows arranged in a commutative involution matrix only have columns wherein each n-state element occurs exactly once. Thus, an n-state commutative involution with $k=2^{\wedge}k$ has n different self-reversing n-state inverters as rows and columns. Furthermore, for instance for $n=2^{\wedge}2=4$ there are 10 different 4-state self-reversing inverters. For $n=8$ there are 764 self-reversing 8-state inverters out of 40,320 reversible 8-state inverters. The inventor developed several ways to construct novel n-state commutative involutions from this that may be applied in cryptographic machines.

One way is to use the FLT, of course. But another way is to re-arrange the existing n-state lookup table which already has n self-reversing n-state inverters with the required properties related to columns. Another lookup table of a self-reversing n-state commutative involution is created by selecting one of the n self-reversing n-state inverters in the table as row 1, instead of identity which is in base form the first row. The each next row is selected by going through the elements of the first row, For instance in 4-state involution addition over GF(4) sc4=[0 1 2 3;1 0 3 2;2 3 01 1;3 2 1 0]. Select row 2 for instance as first row in the new involution as sn4=[1 0 3 2; . . . ]. Because each element only occurs once in a column and commutativity, the next row, row 2, starts with element 2 in row 1 which is now 0 and corresponds with [0 1 2 3] element 3 is 3 and corresponds with row [3 2 1 0] and element 4 in row 1 is 2 which corresponds with row [2 3 0 1] and sn4 is: [1 0 3 2;0 1 2 3;3 2 1 0;2 3 0 1]. This is a commutative involution, but is NOT the standard addition over GF(4). However, it is similar to an FLT of an involution. Thus one can rapidly find n different commutative involutions that may also be found by an FLT.

Another way is a sieve program that uses a similar approach as above but rather than selecting from already existing self-reversing rows in a table, selects from the complete set of self-reversing n-state inverters, which is greater than n. However, not all combinations work out as columns and rows are not allowed to have an n-state element more than once. So a loop in a program was created that skips over such a non-valid row/column and selects the next one in the set. As was shown in the related provisional Patent Application, a program was able to generate 184 commutative self-reversing n-state involutions.

One may create, using a set of 10 self-reversing 4-state inverters a set of 4-state commutative involutions, of which one is sp4=[3 2 1 0;2 3 0 1;1 0 2 3;0 1 3 2]. This 4-state function is commutative and self-reversing and is NOT a function that defines a finite field GF(4). The rows are all 4-state self-reversing inverters. And one may create 3 alternate 4-state self-reversing functions using the selection method as explained above. Such as for instance st4=[0 1 3 2;1 0 2 3;3 2 1 0;2 3 0 1]. One can easily see, that this cannot be a function (using the term in general finite field theory) that is a "law of composition" that defines a finite field. While commonly, '+' and '*' or addition and multiplication are terms used, formally these should be named 'laws of composition" that meet certain criteria to determine a finite field. The first law of composition (the + or addition) has a zero-element z, so that scn(a,z)=z for all 'a' (and z) in GF(n). This means that the function represented in an array-like lookup table, should have identity as a row (and a column). Clearly, sp4 and st4 don't have that. So both are n-state commutative involutions that are NOT a law of composition for a finite field and are NOT an addition over GF(4).

The benefit of the above method is that when has identified one n-state commutative involution that does not represent a law of composition, one may create (n−1) additional n-state commutative involutions that are also not laws of composition for GF(n) by selecting the rows of the related function. However, using an FLT would work as well and with a greater number of variations.

The related provisional patent application illustrates several 8-state commutative self-reversing involutions that are not a law of composition for GF(8).

For instance [8 7 6 5 4 3 2 1;7 8 5 6 3 4 1 2;6 5 8 4 2 1 7 3;5 6 4 3 1 2 8 7;4 3 2 1 8 7 6 5;3 4 1 2 7 8 5 6;2 1 7 8

6 5 3 4;1 2 3 7 5 6 4 8] is such an 8-state function. As n gets bigger, it will be more time consuming to generate the n-state commutative self-reversing functions using the sieving method applying all self-reversing n-state inverters. The inventor has developed two methods that allow creating an n2-state self-reversing commutative function from an n1-state self-reversing commutative function, with n2>n1 and n2=k*n1 and k being an integer>1.

The first method is using the n1-state function as a base-function, create n2-state words of k n1-state elements, and create the n2-state function by executing element-wise combination of words of n1-state elements, using all possible n1 state words, and convert the outcome, which will be a set of n1-state words to their n2-state representation.

A Matlab function that does such an extended transformation is st16=elemtabn(16,2,st4,4) or stn2=elemtabn(n2,k, stn1,n1). This Matlab program creates a word of k n1-elements, executes the n1-element wise operation of words of k n1-elements using the function stn1 and converts the output to an n2 by n2 table. Accordingly, $n2=n1^k$. So from an 8-state base involution, one may create a 64-state and/or a 512-state involution, but not a 256-state involution as 256 is not an integer power of 8. Using this method one should use n1=4 and create n2=256 as a word of 4 n1-state elements. In that case one may use the generated 256-state commutative involution, by mixing/transposing the position of 256-state self-reversing inverters to create 255 additional 256-state self-reversing commutative involutions that are not a law of composition of a finite field.

Yet another method of creating an n2-state involution from an n1-state involution is called herein a doubling method. That is, one creates an n2=2*n1 state involution from an n1-state involution. The creation is based on properties of n-state self-reversing inverters. First: a self reversing n-state inverter [a1 a2 a3 . . . an] may be expanded to a 2*n-state self-reversing inverter [a1 a2 a3 . . . an a1+n a2+n . . . an+n]. Second, if [a1 a2 a3 . . . an a1+n a2+n . . . an+n] is a self-reversing inverter then [a1+n a2+n . . . an+n a1 a2 a3 . . . an] is a self-reversing inverter. In this way by "doubling' one may create a 2*n-state self-reversing function. So, from earlier function st4, by this 'doubling', one may create st8=[0 1 3 2 4 5 7 6;1 0 2 3 5 4 6 7;3 2 1 0 7 6 5 4;2 3 0 1 6 7 4 5;4 5 7 6 0 1 3 2; 5 4 6 7 1 0 2 3; 7 6 5 4 3 2 1 0;6 7 4 5 2 3 0 1], which is an 8-state, commutative, self-reversing function, which is not a law of composition for GF(8). In this way by repeated doubling one may create a 256-state self-reversing commutative involution, which is actually different from the earlier generated 256-state involution by element-wise processing. The by doubling generated 256-state involution may be applied to generate an additional (n−1) or 255 involutions which again are not a law of composition for a finite field. Create by doubling 6 time for instance sd256 from above st4. One may then create further modifications by applying an FLT.

The use of the modified n-state involution, which is not a law of composition, also may solve an issue of the ML-FSR based inversion and the FLT of sequences of bits using the same function. So preferably one uses a reversible inverter for a sequence of bits based on an ML-FSR that is based on a common finite field or an FLT of operations over such a finite field. One then FLTs the sequences of bits but applies a function that is different from what was used to create the ML-FSR based inverter. This may be an n-state commutative involution as described above.

As an illustrative example use the 256-state 4-stage based ML-FSR inverter of 32-bit words as disclosed above. Use as input a 256-state represented cleartext seq32n=[152 84 107

131] and as key key32n=[2 3 4 5] in origin−1. Using the above function sd256 which is an involution but not a law of composition in GF(256). Using this function directly on seq32n and key32n will generate [152 81 105 136]. The FLT, using earlier 'gal4' and reversing 'gal4i' will generate inverted seq32i=[153 141 88 190] and key32ni=[212 105 193 233].Performing sd256 on these will generate [75 229 151 86] and inverting with 'gal4i' as per FLT rules will create [100 125 252 122]. This while applying sd256 directly to seq32n and key32n (without FLT) will generate [152 81 105 136]. Thus the FLT completely changes the result. Applying the output against key in the FLTed sd256 operation using the Galois ML-FSR based 256 state inverter will recover seq32n, as expected.

By using a n-state base operation in the FLT of an operation that is different from functions used in generating the ML-FSR based inverter one may circumvent identified issues that may affect security. The bitwise XOR of words of k bits is so ubiquitous that almost no further attention is spent on it. It is used in encryption, like AES and its modes like AES-GCM and ChaCha20 and its modes. In AES it is applied in AddRoundKey( ) as well in generating the Round-Key. In AES the bitwise XOR is applied to words of 8 bits, arranged in columns or rows as the state array. The use of bitwise XOR is a convenient way to mix two words in an involution. A bitwise XOR of words of k bits may be represented as an addition over $GF(2^k)$ and numerically replaced by it when one treats k bits as an $n=2^k$ state element. In that case one may FLT the addition over $GF(2^k)$ and translate the outcome back to a word of k bits, which will be different from the non-FLTed outcome. The FLT is meta-property preserving and when an operation is an addition over GF(n), its FLT is also an addition over GF(n). Be it that zero-elements and one-elements may have changed. Another property of an addition over $GF(n=2^k)$ or addition over GF(n) in general, has an outcome or sum-space that is uniform. That is, using all possible input combinations (a,b) with a and b n-state elements, the outcome of the sum by addition over GF(n) scn is c=scn(a,b) is uniform, or all possible values of c (ranging from 0 to n−1 in origin 0) occur uniformly or exactly n times. So n time 0, n times 1 to n times (n−1). This means that there is no bias or preference to a certain outcome.

In certain operations (like matrix-matrix or matrix-vector operations) it is important that the operations like + and * are defined over a finite field. However, many of the additions over $GF(n=2^k)$ for instance, are used based on its involution property, not on its being an addition over GF(n). For those cases, the bitwise XORing of words of k bits may be replaced by the novel $n=2^k$ state commutative involutions as described above that are expressly NOT additions over $GF(2^k)$, or an FLT thereof. Especially because these involution functions also have a uniform result or sum-space.

Specifically, this replacement may be applied to AES and AES-GCM, to the AddRoundKey( ) and KeyExpansion( ) as defined in section 5.2 of FIPS 197 specifying AES. Similarly, ChaCha20 applies a bitwise XOR to words of 32 bits defined in for instance RFC 8439. Herein the word of 32-bit may be split into 4 words of 8 bits, for instance, and the words of 8 bits may be processed by the 256-state commutative involution in FLT or non-FLT form and not being an addition over GF(256). The result may be transformed back into a word of 32 bit. The result is numerically different from using an addition over GF(n), but the statistical distribution is unchanged.

As observed before, the use of addition over GF(n) in AES-GCM as well as in ChaCha20 may be in generating a key stream, which is used both in encryption and decryption in the same way. Furthermore, AES-GCM and ChaCha20 use bitwise XOR to encrypt a generated keystream with cleartext. Here the bitwise XOR of words of k bits may also be replaced by the $n=2^k$ state commutative involution not being an addition over GF(n) on words of k bits, either in FLT or non-FLT form. It is noted that subtraction c=a−b mod-n is also an n-state involution, as b=a−c mod-n. However, this function is not commutative. In accordance with an aspect of the present invention, it may also be used to replace additions over GF(n), in either FLT or non-FLT form. However care must be taken of correctly recovering encrypted cleartext, as the order of operation is critical.

Bitwise operations on words of k bits are also applied in other cryptographic operations beside encryption and decryption. For instance they are applied in hashing or message digest operations, for instance as defined in FIPS PUB 180-4 Secure Hash Standard (SHS) available from https://nvlpubs.nist.gov/nistpubs/FIPS/NIST.FIPS.180-4.pdf which is incorporated herein by reference. SHS defines words of w bits, for instance w=32. For instance the bitwise XOR is applied in functions Maj(x,y,z) (4.3) and Ch(x,y,z) (4.2) as defined in 4.1.2 of FIPS 180-4 on words of 32-bits. For instance 4.3 may be reformulated as out11=AND256 (x1,y1); out12=AND256(x1,z1); and out31=AND256(y1, z1) and aout1=sc256(out11,out12) and out1=sc256(aout1, out13). Herein x1, y1 and z1 are 8 bits of 32 bits. The function sc256 is the addition over $GF(2^8)$ and AND256 is the 256-state representation of the bitwise AND of words of 8 bits.

One may repeat the above substitution for each of the 8-bit words in w=32. When concatenating the results, one gets the desired result of 4.3. In a similar way one may modify operation 4.2 Ch(x,y,z). One may replace the function sc256 (addition over GF(256)) with the 256-state commutative involution NOT being an addition over GF(256). For Ch(x,y,z) that may be a straightforward replacement as this operation has two components combined by sc256. However, for Maj(x,y,z) there are 3 components for determining each set of 8 bits. Unfortunately the 256-state commutative involution not being an addition over $GF(2^k)$ is not associative. Thus the result of aout1=sd256(out11, out12) and out1=sd256(aout1,out13) and for instance aout1=sd256(out11,out13) and out1=sd256(aout1,out12) may be different. The result is still repeatable, if the same order of execution is observed using non-associative operations on 3 or more operands, such as in (4.4) etc. of FIPS 180-4. Because sd256 is commutative, replacement of sc256 with sd256 in for instance Ch(x,y,z) requires no additional measures.

Furthermore, FIPS 180-4 defines sets of 32-bit and 64-bit word constants, which may be inverted with ML-FSR based inverters. And of course any used n-state commutative involution (being an addition over GF(n) or not) may be FLTed by an ML-FSR based inverter. So for instance in hashing applications one can use the ML-FSR based inverter to invert the input 32-bit or 64-bit words. Because the bitwise XOR is on composite elements modified by an operation different from the one used in generating the ML-FSR inverter, the output of an FLT modified Ch(x,y,z) or Maj(x,y,z) using the ML-FSR will generate a modified output. That may be sufficient to modify the hashing operation. However, one may replace the addition over GF(n) (bitwise XOR) with an n-state commutative involution. One should make sure that this involution (if used without other changes) is sufficiently different from the addition over GF(n). This can be achieved by applying a separate (in this case 256-state) FLT to the involution preferably changing the zero-element and one-element. This all makes successful brute force attacks extremely unlikely. It leaves the basic dataflow of hashing intact and provides a customized and secure and private hashing method. The same applies for applying n-state commutative involutions to encryption/decryption, where an additional FLT of the involution will significantly increase security. For instance sc256 (addition over GF(256) and 256-state involution sd256 NOT being such an addition, created by doubling may have a difference of 56%, while an FLT of sd256 may have a difference of 85% with sc256.

In accordance with an aspect of the present invention a set of parameters may contain a parameter that indicates a use of an n-state commutative involution that is NOT an addition over GF(n) and/or is not derived from a bitwise XORing of 2 words of k bits.

In accordance with an aspect of the present invention each of a plurality of unique codes. for instance stored on a memory and/or translated into a unique memory address, is associated with a unique or different set of parameters. A set of parameters defines at least a processing of a data set, the dataset may be part of the parameter set. When a unique code is activated, the corresponding set of parameters is also activated and applied by a processor to process the dataset. For instance a first parameter may indicate that the dataset is to be processed by an encryption, a second parameter may indicate what type of encryption (like AES-GCM or Cha-Cha20 or the like) is to be applied, a third parameter may refer to an n-state inverter that is to be applied, a fourth parameter may indicate which operation is to be modified (and perhaps how) by the inverter, a fifth parameter may indicate a round number which is to be modified and so forth. One may encode into parameters almost any cryptographic operation, ranging from encryption, decryption, straight enciphering, hashing, signing, ML-FSR based enciphering, n-state reversible enciphering, enciphering with a commutative n-state involution, sequence generation, or any other generation of a sequence of signals.

The unique code and a message based on parameters corresponding to the unique code or derived there from are transmitted to a receiving apparatus. The receiving apparatus, based on the received unique code may generate its own data. Based on its own generated data and the received message the receiving apparatus generates an opening signal. The first apparatus thus sends a code that determines a lock, the second apparatus on that basis installs the lock. The message data is then the key to open the lock and the second apparatus after installing the lock based on the unique code decides if the correct key is applied. Unique code and message data may be part of the same set of data transmitted by the first apparatus over the same channel and may appear as one message. message and unique code may also be transmitted separately over the same channel with a time interval. Unique code and message data may also be transmitted over different communication channels either at the same time or with a time interval.

In accordance with an aspect of the present invention one may limit the size of message data to an equivalent of a certain number of bits, like p=128, or p=192 or p=256 or p>256 or p=512 or any number that is believed to be secure. For instance a time stamp or encoded time stamp may be part of a message and the second apparatus may be instructed to only activate a device if a correct result is generated within a pre-defined time frame after receiving a message. Such a time-frame may be a millisecond, several milliseconds, or less than a second or any other timeframe that is deemed secure without allowing a attacker to interfere with an opening sequence.

In accordance with an aspect of the present invention a set of parameters may contain a parameter that indicates a use of an n-state ML-FSR based inversion of a series of p bits.

In accordance with an aspect of the present invention a set of parameters may contain a parameter that indicates a use of a pre-defined n-state reversible inverter.

In accordance with an aspect of the present invention a set of parameters may contain a parameter that indicates a use of an n-state FLT of an n-state computer function.

In accordance with an aspect of the present invention a set of parameters may contain a parameter that indicates a use of an n-state commutative involution NOT being an addition over GF(n), or if there is discussion about what "an addition over GF(n)' means, wherein the n-state commutative involution is NOT a law of composition for a finite field GF(n).

In accordance with an aspect of the present invention a set of parameters may contain a parameter that indicates a use of a modified computer function in an encryption.

In accordance with an aspect of the present invention a set of parameters may contain a parameter that indicates a use of a modified computer function in a hashing operation.

The following documents are all incorporated herein by reference in their entirety: 1) Federal Information Processing Standards Publication (FIPS) 197, Advanced Encryption Standard (AES), National Institute of Standards and Technology (NIST), 2001, downloaded from https://nvlpubs. nist.gov/nistpubs/FIPS/NIST.FIPS.197-upd1.pdf; 2) NIST Special Publication 800-38D, Recommendation for Block Cipher Modes of Operation: Galois/Counter Mode (GCM) and GMAC, NIST, 2007, downloaded from https://nvl-pubs.nist.gov/nistpubs/legacy/sp/nistspecialpublication800-38d.pdf; 3) FIPS PUB 180-4, Secure from Hash Standard (SHS), NIST, 2015, downloaded from https://nvlpubs. nist.gov/nistpubs/FIPS/NIST.FIPS.180-4.pdf; 4) FIPS PUB 202, SHA-3 Standard: Permutation-Based Hash and Extendable-Output Functions, NIST, 2015, downloaded from https://nvlpubs.nist.gov/nistpubs/FIPS/NIST.FIPS.202.pdf; 5) NIST SP 800-185, SHA-3 Derived Functions: cSHAKE, KMAC, TupleHash, and ParallelHash, 2016, downloaded from https://csrc.nist.gov/pubs/sp/800/185/final; 6) Request for Comments: 1321, The MD5 Message-Digest Algorithm, 1992, downloaded from https://www.ietf.org/rfc/rfc1321.txt; 7) Request for Comments: 7539, ChaCha20 and Poly1305 for IETF Protocols, 2015, downloaded from https://datatracker.ietf.org/doc/html/rfc7539.

The term cryptographic is used herein. It is intended to mean "related to cryptography." Cryptography is the art of hiding content in data such as a message wherein critical content is preferably impossible but at least unlikely to be recovered without having accesses to critical information. Examples of cryptography are encryption, hashing, sequence generation, digital signatures, key exchange and the like. One may still use some aspects from a cryptographic message. For instance, one may validate a message by generating a hash of the message and compare it to a received hash. But presumably one is unlikely to modify the hash value in a structured way. In another example, one presumably is unable to decipher or decrypt an encrypted message without a proper keyword. Cryptography often teaches all the steps of a cryptographic operation in a cryptographic machine or cryptographic computer to generate a cryptographic message. Herein a slightly different approach has been taken, by essentially maintaining a known dataflow, but rather than exclusively relying on private keywords some of the applied computer functions are modified, such as mentioned above. Such modifications do not change the overall data flow and do not change the statistical make-up of a cryptographic message of large enough size.

By keeping modifications secret or confidential, the modified cryptographic devices and/or methods generate modified cryptographic messages from which it is in general not clear that a modification has been applied. An exception herein is a modified hashing method of course. Because a standard (unmodified) hash will NOT generate the same hash as a modified hash. In any case, the modification in general increases security of these modified cryptographic messages and are at least as secure as the unmodified ones. The hiding in cryptography is the "hiding in plain sight" as cryptographic messages are often transmitted over what are called public or semi-public transmission channels where from data may be copied (listened to) or intercepted and sometimes intercepted-changed-and retransmitted in changed form. The cryptographic devices, systems and methods as provided herein prevent successful attacks by brute force above and beyond what standard devices, systems and methods offer.

The article 'a' herein signifies one or more instances of an element, unless specifically intended otherwise. In most cases one may derive from the text which one is intended.

The invention claimed is:

1. A computing device in communication with a receiving computing device, comprising:
a memory configured to store data including instructions;
a processor enabled to retrieve instructions from the memory and execute the instructions to perform the one or more steps of:
executing a computer operation selected from the group consisting of an encryption, a hashing, a sequence generation, wherein the computer operation includes an n-state commutative involution with n=2^k that is a self-reversing 2 input operand n-state computer function for all n states and does not comply with all requirements of an addition over a finite field GF(n=2^k) with n and k both being integers greater than 2;
creating a cryptographic message based on the computer operation; and
transmitting the cryptographic message on a physical transmission channel to the receiving computing device.

2. The computing device of claim 1, further comprising:
the memory configured to store a plurality of different sets of parameters, each set of parameters in the plurality of different sets of parameters determining the computer operation and each set of parameters corresponding to a unique code in a plurality of unique codes; and
the processor configured to activate a first set of parameters in the plurality of different sets of parameters and to perform the computer operation based on the first set of parameters and to transmit the cryptographic message and a first unique code corresponding to the first set of parameters to the receiving computing device.

3. The computing device of claim 2, further comprising:
the receiving computing device having a memory and a processor;
the processor of the receiving computing device configured to retrieve from the memory of the receiving computing device a first set of parameters based on the unique code received from the computing device and to generate data based on the first set of parameters; and the processor of the receiving computing device configured to generate an opening instruction based on processing the cryptographic message received from the computing device and the data generated by the receiving computing device based on the received unique code.

4. The computing device of claim 3, wherein the opening instruction provides access to and/or activates at least one of the group consisting of a computer, a vehicle door controller, a garage door controller, an access controller, a server, an Automatic Teller Machine (ATM), a credit card server, a database, a database server, an order management server, a transaction server, and an Internet-of-Things (IoT) device controller.

5. The computing device of claim 2, wherein the processor of the receiving computing device is configured to disable the first set of parameters in the memory of the receiving computing device after the first set of parameters in the memory of the receiving computing device is activated.

6. The computing device of claim 1, wherein the computing device is selected from the group consisting of a computer, a mobile phone, a smart phone, a fob, an access card, a chipcard and a door opener.

7. The computing device of claim 1, further comprising instructions for the processor to modify the n-state commutative involution with a Finite Lab-Transform (FLT), the n-state commutative involution having at least a first input enabled to receive a first n-state operand and a second input enabled to receive a second n-state operand and an n-state output enabled to provide n-state output data, the FLT being characterized by the first input having an n-state reversible inverter not being identity to invert the first n-state operand and the second input having an n-state inverter identical to the n-state reversible inverter to invert the second n-state operand and the n-state output having a reversing n-state inverter to invert the n-state output data, the reversing n-state inverter in combination with the reversible n-state inverter establishing identity.

8. The computing device of claim 1, wherein the computer operation is an encryption in accordance with a modification of a specification of one of 1) an Advanced Encryption Standard (AES), 2) an Advanced Encryption Standard-Galois Counter Mode (AES-GCM) and 3) ChaCha20.

9. The computing device of claim 1, wherein the n-state commutative involution replaces a bitwise XOR of two words each being words of at least 8 bits.

10. The computing device of claim 1, wherein the n-state commutative involution is modified with an n-state Finite Lab-Transform (FLT), the n-state commutative involution having at least a first input enabled to receive a first n-state operand and a second input enabled to receive a second n-state operand and an n-state output enabled to provide n-state output data, the FLT being characterized by the first input having an n-state reversible inverter not being identity to invert the first n-state operand and the second input having an inverter identical to the n-state reversible inverter to invert the second n-state operand and the n-state output having a reversing n-state inverter to invert the n-state output data, the reversing n-state inverter in combination with the reversible n-state inverter establishing identity and wherein the n-state commutative involution that is modified with an n-state Finite Lab-Transform (FLT) combines a keystream with a plaintext of k bits.

11. The computing device of claim 1, wherein the computer operation is a hashing operation in accordance with a modification of a specification of one of 1) FIPS PUB 180-4, Secure Hash Standard (SHS), 2) FIPS PUB 202, SHA-3 Standard: Permutation-Based Hash and Extendable-Output Functions and 3) the MD5 Message-Digest Algorithm, Request for Comments: 7539; and the n-state commutative involution replaces a bitwise XOR of two words each being words of at least 8 bits.

12. A cryptographic method, comprising:

executing by a processor of a computer operation selected from the group consisting of an encryption, a hashing, a sequence generation, wherein the computer operation includes an n-state commutative involution with n=2^k that is a self-reversing 2 input operand n-state computer function for all n states and does not comply with all requirements of an addition over a finite field GF(n=2^k) with n and k both being integers greater than 2;

creating by the processor of a cryptographic message based on the computer operation; and transmitting the cryptographic message on a physical transmission channel to a receiving computing device.

13. The method of claim 12, further comprising:

storing by a memory of a plurality of different sets of parameters, each set of parameters in the plurality of different sets of parameters determining the computer operation and each set of parameters corresponding to a unique code in a plurality of unique codes; and activating by the processor of a first set of parameters in the plurality of different sets of parameters and performing the computer operation based on the first set of parameters and transmitting the cryptographic message and a first unique code corresponding to the first set of parameters to the receiving computing device.

14. The method of claim 13, wherein the receiving computing device based on the cryptographic message, controls access to and/or activates at least one of the group consisting of a computer, a vehicle door controller, a garage door controller, an access controller, a server, an Automatic Teller Machine (ATM), a credit card server, a database, a database server, an order management server, a transaction server, and an Internet-of-Things (IoT) device controller.

15. The method of claim 12, further comprising instructions for the processor to modify the n-state commutative involution with a Finite Lab-Transform (FLT), the n-state commutative involution having at least a first input enabled to receive a first n-state operand and a second input enabled to receive a second n-state operand and an n-state output enabled to provide n-state output data, the FLT being characterized by the first input having an n-state reversible inverter not being identity to invert the first n-state operand and the second input having an n-state inverter being identical to the n-state reversible inverter to invert the second n-state operand and the n-state output having a reversing n-state inverter to invert the n-state output data, the reversing n-state inverter in combination with the reversible n-state inverter establishing identity.

16. The method of claim 12, wherein the computer operation is an encryption in accordance with a modification of a specification of at least one of: 1) an Advanced Encryption Standard (AES), 2) an Advanced Encryption Standard-Galois Counter Mode (AES-GCM) and 3) ChaCha20.

17. The method of claim 12, wherein the n-state commutative involution replaces in a standard computer implemented cryptographic operation a bitwise XOR of two words each being a word of at least k bits.

18. The method of claim 12, wherein the computer operation is modified with an n-state Finite Lab-Transform (FLT), the computer operation including the n-state commutative involution, and the n-state commutative involution having at least a first input enabled to receive a first n-state operand and a second input enabled to receive a second n-state operand and an n-state output enabled to provide n-state output data, the FLT being characterized by the first input having an n-state reversible inverter not being identity to invert the first n-state operand and the second input having an n-state inverter identical to the n-state reversible inverter to invert the second n-state operand and the n-state output having a reversing n-state inverter to invert the n-state output data, the reversing n-state inverter in combination with the reversible n-state inverter establishing identity and wherein the n-state commutative involution that is modified with an n-state Finite Lab-Transform (FLT) combines a keystream with a plaintext of k bits.

19. The method of claim 12, wherein the computer operation is a hashing operation in accordance with a modification of a specification of at least one: 1) FIPS PUB 180-4, Secure Hash Standard (SHS), FIPS PUB 202, 2) SHA-3 Standard: Permutation-Based Hash and Extendable-Output Functions and 3) the MD5 Message-Digest Algorithm, Request for Comments: 7539; and the n-state commutative involution replaces a bitwise XOR of two words each being a word of at least 8 bits.

20. The method of claim 12, wherein the n-state commutative involution is derived from a p-state commutative involution with p being an integer smaller than n.

* * * * *